United States Patent
Griffin

(10) Patent No.: US 7,938,589 B2
(45) Date of Patent: *May 10, 2011

(54) KEYBOARD ARRANGEMENT

(75) Inventor: Jason T. Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1289 days.

This patent is subject to a terminal disclaimer.

(21) Appl. No.: 11/428,063

(22) Filed: Jun. 30, 2006

(65) Prior Publication Data

US 2007/0166091 A1 Jul. 19, 2007

Related U.S. Application Data

(63) Continuation of application No. 10/785,790, filed on Feb. 24, 2004, now Pat. No. 7,083,342, application No. 11/428,063, which is a continuation of application No. PCT/CA2004/00264, filed on Feb. 24, 2004, and a continuation of application No. 11/217,530, filed on Sep. 1, 2005, now Pat. No. 7,819,598, which is a continuation of application No. PCT/CA2004/02210, filed on Dec. 30, 2004, which is a continuation of application No. 10/785,790.

(60) Provisional application No. 60/533,487, filed on Dec. 31, 2003.

(51) Int. Cl.
*G06F 3/023* (2006.01)
(52) U.S. Cl. .......................... 400/487; 400/486; 400/472
(58) Field of Classification Search .................. 400/487
See application file for complete search history.

(56) References Cited

U.S. PATENT DOCUMENTS

| | | | |
|---|---|---|---|
| 1,319,687 | A | 10/1919 | Bates |
| 3,293,362 | A | 12/1966 | Veldkamp |
| 3,633,724 | A | 1/1972 | Samuel |
| D228,137 | S | 8/1973 | Chadima |
| D237,622 | S | 11/1975 | Oyama |
| 3,967,273 | A | 6/1976 | Knowlton |
| 4,029,915 | A | 6/1977 | Ojima |
| D249,345 | S | 9/1978 | Oliveira et al. |
| D258,956 | S | 4/1981 | Chadima, Jr. |
| D266,855 | S | 11/1982 | Yoshioka et al. |
| 4,449,839 | A | 5/1984 | Bleuer |

(Continued)

FOREIGN PATENT DOCUMENTS

EP 129996 1/1985

(Continued)

OTHER PUBLICATIONS

MacKenzie et al., "Text Entry for Mobile Computing: Models and Methods, Theory and Practice"; Human Computer Interaction, 17(2): 147-198, 2002.

(Continued)

*Primary Examiner* — Daniel J Colilla
(74) *Attorney, Agent, or Firm* — Novak Druce +Quigg LLP

(57) ABSTRACT

A handheld mobile communication device having a physical keyboard with a first set of keys having indicia associated with the letters A-Z arranged in a standard alphabetic keyboard arrangement and a second set of keys having indica for the numerals 0-9. The numerals are arranged in a numeric phone key arrangement which is at least partially overlaid on the standard alphabetic keyboard arrangement. The second set of keys is differentiated from the keys of the first set using color.

37 Claims, 34 Drawing Sheets

U.S. PATENT DOCUMENTS

| | | |
|---|---|---|
| D278,059 S | 3/1985 | Desrochers |
| D278,341 S | 4/1985 | Scheid |
| D291,201 S | 8/1987 | Weisel, Jr. et al. |
| D293,241 S | 12/1987 | Wan et al. |
| D298,546 S | 11/1988 | Yoshioka et al. |
| D298,622 S | 11/1988 | Yubisui et al. |
| D299,251 S | 1/1989 | Endo et al. |
| 4,799,254 A | 1/1989 | Dayton et al. |
| D303,112 S | 8/1989 | Desrochers |
| 4,868,750 A | 9/1989 | Kucera et al. |
| D303,981 S | 10/1989 | Takemata et al. |
| D304,175 S | 10/1989 | Sakaguchi et al. |
| D304,718 S | 11/1989 | Sakaguchi et al. |
| 4,879,557 A | 11/1989 | Roche |
| D307,888 S | 5/1990 | Ishida |
| D307,890 S | 5/1990 | Kim |
| D309,729 S | 8/1990 | Tanabe |
| D312,628 S | 12/1990 | Yokoi et al. |
| D313,224 S | 12/1990 | Yokoi et al. |
| D313,401 S | 1/1991 | Tanabe |
| D313,413 S | 1/1991 | Langton |
| D319,433 S | 8/1991 | Pearce |
| 5,059,048 A | 10/1991 | Sirkin |
| D330,543 S | 10/1992 | Tsuchida et al. |
| D332,604 S | 1/1993 | Miyake et al. |
| 5,184,830 A | 2/1993 | Okada et al. |
| 5,217,295 A | 6/1993 | Tortola et al. |
| D341,825 S | 11/1993 | Hamilton |
| 5,288,158 A | 2/1994 | Matias |
| D348,654 S | 7/1994 | Branck et al. |
| 5,336,001 A | 8/1994 | Lichtenberg |
| 5,336,002 A | 8/1994 | Russo |
| 5,337,346 A | 8/1994 | Uchikura |
| 5,360,280 A | 11/1994 | Camacho et al. |
| 5,367,298 A | 11/1994 | Axthelm |
| D356,563 S | 3/1995 | Berry |
| 5,397,189 A | 3/1995 | Minogue |
| D357,253 S | 4/1995 | Wong |
| 5,410,141 A | 4/1995 | Koenck et al. |
| 5,410,333 A | 4/1995 | Conway |
| 5,426,449 A | 6/1995 | Danziger |
| D359,920 S | 7/1995 | Sakamoto |
| 5,436,954 A | 7/1995 | Nishiyama et al. |
| 5,452,960 A | 9/1995 | Kuhlenschmidt |
| 5,457,454 A | 10/1995 | Sugano |
| D367,043 S | 2/1996 | Ross et al. |
| 5,497,151 A | 3/1996 | Dombroski |
| 5,500,643 A | 3/1996 | Grant |
| D368,708 S | 4/1996 | Maynard et al. |
| 5,536,170 A | 7/1996 | Murphy |
| 5,543,787 A | 8/1996 | Karidis et al. |
| 5,563,631 A | 10/1996 | Masunaga |
| 5,575,576 A | 11/1996 | Roysden, Jr. |
| 5,600,790 A | 2/1997 | Barnstijn et al. |
| 5,606,712 A | 2/1997 | Hidaka |
| 5,611,031 A | 3/1997 | Hertzfeld et al. |
| 5,642,522 A | 6/1997 | Zaenen et al. |
| D381,021 S | 7/1997 | Williams et al. |
| D381,638 S | 7/1997 | Kruse et al. |
| 5,659,307 A | 8/1997 | Karidis et al. |
| 5,661,605 A | 8/1997 | Conway |
| D383,756 S | 9/1997 | Henderson et al. |
| 5,664,896 A | 9/1997 | Blumberg |
| 5,672,108 A | 9/1997 | Lam et al. |
| D385,855 S | 11/1997 | Ronzani |
| D386,497 S | 11/1997 | Huslig et al. |
| 5,689,253 A | 11/1997 | Hargreaves et al. |
| 5,700,097 A | 12/1997 | Kuhlenschmidt |
| D389,139 S | 1/1998 | Oross et al. |
| D389,465 S | 1/1998 | Heiman et al. |
| D390,509 S | 2/1998 | Antzinas et al. |
| 5,729,221 A | 3/1998 | Krolopp et al. |
| 5,737,394 A | 4/1998 | Anderson et al. |
| D396,215 S | 7/1998 | Inukai |
| 5,786,776 A | 7/1998 | Kisaichi et al. |
| D397,369 S | 8/1998 | Rissman |
| 5,790,103 A | 8/1998 | Willner |
| D397,728 S | 9/1998 | Yuen et al. |
| D399,537 S | 10/1998 | Chi et al. |
| 5,818,437 A | 10/1998 | Grover et al. |
| 5,825,353 A | 10/1998 | Will |
| 5,827,082 A | 10/1998 | Laine |
| 5,841,374 A | 11/1998 | Abraham |
| D402,572 S | 12/1998 | Han |
| D403,362 S | 12/1998 | Fai |
| 5,847,697 A | 12/1998 | Sugimoto |
| D403,667 S | 1/1999 | Musha |
| 5,861,821 A | 1/1999 | Kato et al. |
| 5,874,906 A | 2/1999 | Willner |
| D406,839 S | 3/1999 | Forget |
| 5,893,798 A | 4/1999 | Stambolic et al. |
| D409,185 S | 5/1999 | Kawashima |
| D409,601 S | 5/1999 | Wicks et al. |
| D411,528 S | 6/1999 | Tien |
| 5,915,228 A | 6/1999 | Kunihiro et al. |
| 5,920,308 A | 7/1999 | Kim |
| D413,325 S | 8/1999 | Lee |
| 5,931,873 A | 8/1999 | Cisar |
| 5,952,942 A | 9/1999 | Balakrishnan et al. |
| 5,953,541 A | 9/1999 | King et al. |
| 5,954,437 A | 9/1999 | Wen-Hung |
| 5,963,197 A | 10/1999 | Bacon et al. |
| 5,974,238 A | 10/1999 | Chase, Jr. |
| D416,001 S | 11/1999 | Tal et al. |
| D416,253 S | 11/1999 | Hibino |
| D416,256 S | 11/1999 | Griffin et al. |
| 5,982,520 A | 11/1999 | Weiser et al. |
| 5,995,026 A | 11/1999 | Sellers |
| 6,002,390 A | 12/1999 | Masui |
| 6,005,496 A | 12/1999 | Hargreaves et al. |
| 6,006,351 A | 12/1999 | Peretz et al. |
| 6,009,333 A | 12/1999 | Chaco |
| 6,011,554 A | 1/2000 | King et al. |
| 6,014,429 A | 1/2000 | LaPorta et al. |
| 6,014,573 A | 1/2000 | Lehtonen et al. |
| D420,351 S | 2/2000 | Waldner |
| D421,019 S | 2/2000 | Curtis |
| D421,020 S | 2/2000 | Curtis |
| 6,023,779 A | 2/2000 | Fullam et al. |
| D422,271 S | 4/2000 | Kawashima |
| D422,595 S | 4/2000 | Taylor et al. |
| 6,047,047 A | 4/2000 | Aldridge et al. |
| 6,047,196 A | 4/2000 | Makela et al. |
| 6,049,796 A | 4/2000 | Siitonen et al. |
| 6,052,070 A | 4/2000 | Kivela et al. |
| D425,056 S | 5/2000 | Edwards et al. |
| D425,887 S | 5/2000 | Edwards et al. |
| 6,084,576 A | 7/2000 | Leu et al. |
| 6,091,956 A | 7/2000 | Hollenberg |
| 6,094,197 A | 7/2000 | Buxton et al. |
| D429,226 S | 8/2000 | Siddoway et al. |
| 6,102,594 A | 8/2000 | Str.o slashed.m |
| 6,103,979 A | 8/2000 | Motoyama et al. |
| 6,107,997 A | 8/2000 | Ure |
| D432,511 S | 10/2000 | Eckholm |
| D433,017 S | 10/2000 | Martinez |
| D433,460 S | 11/2000 | Griffin et al. |
| D434,016 S | 11/2000 | Hunt |
| D434,034 S | 11/2000 | Burke et al. |
| 6,148,261 A | 11/2000 | Obradovich et al. |
| D434,739 S | 12/2000 | Hanna et al. |
| 6,157,323 A | 12/2000 | Tso et al. |
| D435,844 S | 1/2001 | Yeh |
| D436,583 S | 1/2001 | Newby et al. |
| D436,591 S | 1/2001 | Abston et al. |
| 6,172,625 B1 | 1/2001 | Jin et al. |
| D439,230 S | 3/2001 | Braxton et al. |
| 6,208,876 B1 | 3/2001 | Raussi et al. |
| D439,898 S | 4/2001 | Ober et al. |
| D440,562 S | 4/2001 | Gottlieb et al. |
| 6,212,412 B1 | 4/2001 | Rogers et al. |
| 6,219,694 B1 | 4/2001 | Lazaridis et al. |
| 6,219,731 B1 | 4/2001 | Gutowitz |
| 6,223,059 B1 | 4/2001 | Haestrup |
| D441,357 S | 5/2001 | Kolinen |
| D441,733 S | 5/2001 | Do et al. |
| D442,156 S | 5/2001 | Lee |

| Patent | Date | Inventor |
|---|---|---|
| D442,173 S | 5/2001 | Wang et al. |
| D442,569 S | 5/2001 | Hanna et al. |
| 6,231,252 B1 | 5/2001 | Kitamura |
| D443,612 S | 6/2001 | Evers et al. |
| 6,243,789 B1 | 6/2001 | Hasbun et al. |
| D445,106 S | 7/2001 | Mosgrove et al. |
| 6,259,044 B1 | 7/2001 | Paratore |
| D446,526 S | 8/2001 | Evers et al. |
| 6,278,442 B1 | 8/2001 | Griffin et al. |
| D448,355 S | 9/2001 | Higashi et al. |
| 6,286,064 B1 | 9/2001 | King et al. |
| 6,295,052 B1 | 9/2001 | Kato et al. |
| D448,765 S | 10/2001 | Cohen et al. |
| D449,595 S | 10/2001 | Park et al. |
| D449,596 S | 10/2001 | Park et al. |
| D449,604 S | 10/2001 | Colvin et al. |
| D449,830 S | 10/2001 | Vuolteenaho et al. |
| 6,297,795 B1 | 10/2001 | Kato et al. |
| 6,304,261 B1 | 10/2001 | Shields et al. |
| 6,304,431 B1 | 10/2001 | Kim |
| 6,307,548 B1 | 10/2001 | Flinchem et al. |
| 6,307,549 B1 | 10/2001 | King et al. |
| 6,310,609 B1 | 10/2001 | Morgenthaler |
| D451,079 S | 11/2001 | Ali |
| D451,092 S | 11/2001 | Park et al. |
| D451,502 S | 12/2001 | Vuolteenaho et al. |
| 6,333,734 B1 | 12/2001 | Rein |
| D452,687 S | 1/2002 | Yeh |
| D453,149 S | 1/2002 | Skoger et al. |
| D453,158 S | 1/2002 | Chen |
| D453,332 S | 2/2002 | Herath |
| D454,348 S | 3/2002 | Yeh |
| D454,349 S | 3/2002 | Makidera et al. |
| D454,849 S | 3/2002 | Eckholm |
| 6,356,258 B1 | 3/2002 | Kato et al. |
| 6,374,277 B2 | 4/2002 | Vong et al. |
| 6,378,234 B1 | 4/2002 | Luo |
| D456,794 S | 5/2002 | Laverick et al. |
| D456,804 S | 5/2002 | Fisher et al. |
| D456,805 S | 5/2002 | Ono et al. |
| D456,806 S | 5/2002 | Ahearn et al. |
| 6,385,463 B1 | 5/2002 | Lieberman et al. |
| 6,396,482 B1 | 5/2002 | Griffin et al. |
| D458,239 S | 6/2002 | Shim et al. |
| D459,327 S | 6/2002 | Ali |
| D460,057 S | 7/2002 | Hunt |
| D460,068 S | 7/2002 | Lanzaro et al. |
| D460,493 S | 7/2002 | Griffin et al. |
| D461,803 S | 8/2002 | Griffin et al. |
| 6,437,709 B1 | 8/2002 | Hao |
| D462,357 S | 9/2002 | Jenkins |
| D463,421 S | 9/2002 | Lanzaro et al. |
| D463,425 S | 9/2002 | Jenkins |
| 6,452,588 B2 | 9/2002 | Griffin et al. |
| D464,645 S | 10/2002 | O'Neil |
| D464,962 S | 10/2002 | MacGregor et al. |
| D464,963 S | 10/2002 | Nishida |
| D464,995 S | 10/2002 | Griffin et al. |
| 6,459,968 B1 | 10/2002 | Kochie |
| D465,219 S | 11/2002 | Tamaki et al. |
| D466,116 S | 11/2002 | Bhatia et al. |
| D466,877 S | 12/2002 | Hawkins et al. |
| D466,878 S | 12/2002 | Porter |
| D467,235 S | 12/2002 | Hawkins et al. |
| D467,918 S | 12/2002 | Fitch et al. |
| 6,489,950 B1 | 12/2002 | Griffin et al. |
| D468,307 S | 1/2003 | Chuang |
| D468,714 S | 1/2003 | Maruska et al. |
| D469,367 S | 1/2003 | Mirabelli et al. |
| 6,507,336 B1 | 1/2003 | Lunsford et al. |
| D469,748 S | 2/2003 | Ribeiro et al. |
| D470,137 S | 2/2003 | Everett et al. |
| D470,150 S | 2/2003 | Lewis et al. |
| D470,842 S | 2/2003 | Bhatia et al. |
| D470,843 S | 2/2003 | Horiki |
| D471,904 S | 3/2003 | Majanen |
| D472,225 S | 3/2003 | Griffin |
| 6,535,749 B1 | 3/2003 | Iwata et al. |
| 6,538,651 B1 | 3/2003 | Hayman et al. |
| D472,551 S | 4/2003 | Griffin |
| D473,226 S | 4/2003 | Griffin |
| D474,166 S | 5/2003 | Burns et al. |
| D475,047 S | 5/2003 | Choi et al. |
| D475,998 S | 6/2003 | Salmi |
| D476,317 S | 6/2003 | Lehtonen |
| D476,320 S | 6/2003 | Arbisi et al. |
| D476,330 S | 6/2003 | Ahearn et al. |
| 6,573,733 B2 | 6/2003 | Bohley |
| D476,647 S | 7/2003 | Lehtonen |
| D476,983 S | 7/2003 | Salmi |
| D476,984 S | 7/2003 | Salmi |
| D476,985 S | 7/2003 | Griffin |
| D477,596 S | 7/2003 | Hayes |
| 6,597,345 B2 | 7/2003 | Hirshberg |
| D478,324 S | 8/2003 | O'Neil |
| D478,585 S | 8/2003 | Griffin |
| D478,882 S | 8/2003 | Peng et al. |
| 6,611,254 B1 | 8/2003 | Griffin et al. |
| D479,212 S | 9/2003 | Eckholm |
| D479,216 S | 9/2003 | Ho-Cheun et al. |
| D479,232 S | 9/2003 | Bruno et al. |
| D479,233 S | 9/2003 | Griffin |
| D480,057 S | 9/2003 | Ho-Cheun et al. |
| D480,697 S | 10/2003 | Lee et al. |
| D480,722 S | 10/2003 | Griffin |
| 6,630,924 B1 | 10/2003 | Peck |
| 6,647,367 B2 | 11/2003 | McArthur et al. |
| D484,477 S | 12/2003 | Salmi |
| D484,873 S | 1/2004 | Salmi |
| D487,068 S | 2/2004 | Isaacs et al. |
| D487,438 S | 3/2004 | Sheu |
| D487,572 S | 3/2004 | Munstermann |
| 6,703,963 B2 | 3/2004 | Higginson |
| D488,143 S | 4/2004 | Ting et al. |
| D488,787 S | 4/2004 | Jung |
| D488,789 S | 4/2004 | Lee |
| 6,715,637 B1 | 4/2004 | Ramos |
| D489,368 S | 5/2004 | Yoneda et al. |
| D489,717 S | 5/2004 | Hsieh |
| D490,100 S | 5/2004 | Su et al. |
| D490,119 S | 5/2004 | Griffin et al. |
| D490,421 S | 5/2004 | Everett et al. |
| D490,422 S | 5/2004 | Iwama et al. |
| D491,172 S | 6/2004 | Sheu |
| D491,543 S | 6/2004 | Chang et al. |
| D491,929 S | 6/2004 | Nuovo et al. |
| D492,276 S | 6/2004 | Walliser et al. |
| D492,296 S | 6/2004 | Arbisi |
| D492,305 S | 6/2004 | Choi et al. |
| D492,306 S | 6/2004 | Martin et al. |
| D492,657 S | 7/2004 | Jensfelt |
| D492,659 S | 7/2004 | Medeiros et al. |
| D492,660 S | 7/2004 | Kim et al. |
| D492,681 S | 7/2004 | Ahearn et al. |
| D493,436 S | 7/2004 | Okada et al. |
| D493,457 S | 7/2004 | Hsu |
| 6,765,556 B2 | 7/2004 | Kandogan et al. |
| D493,778 S | 8/2004 | Walliser et al. |
| D493,781 S | 8/2004 | Sheu |
| D494,559 S | 8/2004 | Fuxen |
| D494,561 S | 8/2004 | Kagami et al. |
| D494,949 S | 8/2004 | Arnholt et al. |
| D494,950 S | 8/2004 | Keunecke |
| 6,785,387 B1 | 8/2004 | Albrecht et al. |
| D495,687 S | 9/2004 | Arbisi |
| D496,019 S | 9/2004 | Okada et al. |
| D496,020 S | 9/2004 | Lee |
| D496,343 S | 9/2004 | Lin et al. |
| D496,641 S | 9/2004 | Seo |
| D496,655 S | 9/2004 | Harries et al. |
| 6,799,303 B2 | 9/2004 | Blumberg |
| D496,921 S | 10/2004 | Hwang |
| D496,933 S | 10/2004 | Wu |
| D497,160 S | 10/2004 | Nagao et al. |
| D497,361 S | 10/2004 | Gartrell et al. |
| 6,809,660 B2 | 10/2004 | Bestle |
| 6,810,271 B1 | 10/2004 | Wood et al. |
| D497,892 S | 11/2004 | Peng |

| | | | |
|---|---|---|---|
| D497,907 S | 11/2004 | Griffin | |
| D498,473 S | 11/2004 | Sheu | |
| D498,752 S | 11/2004 | Kagami et al. | |
| D499,088 S | 11/2004 | Sheu | |
| 6,819,529 B2 | 11/2004 | Kiko et al. | |
| D499,723 S | 12/2004 | Kagami et al. | |
| D500,500 S | 1/2005 | Chien | |
| D500,992 S | 1/2005 | Shen et al. | |
| 6,847,310 B1 | 1/2005 | Gill et al. | |
| D502,157 S | 2/2005 | Kim et al. | |
| D502,159 S | 2/2005 | Chan et al. | |
| D502,160 S | 2/2005 | Chen et al. | |
| 6,851,877 B1 | 2/2005 | Liebhold | |
| D502,455 S | 3/2005 | Brandis et al. | |
| D502,933 S | 3/2005 | Munstermann | |
| D503,162 S | 3/2005 | Kagami et al. | |
| D503,163 S | 3/2005 | Chan et al. | |
| 6,867,965 B2 | 3/2005 | Khoo | |
| D503,697 S | 4/2005 | Kim | |
| 6,885,317 B1 | 4/2005 | Gutowitz | |
| 7,048,456 B2 | 5/2006 | Keinonen et al. | |
| 7,083,342 B2 | 8/2006 | Griffin | |
| 7,154,479 B2 * | 12/2006 | Balle et al. | 345/169 |
| 7,206,616 B2 | 4/2007 | Choi | |
| 2001/0006587 A1 | 7/2001 | Keinomen et al. | |
| 2001/0038766 A1 | 11/2001 | Euley et al. | |
| 2001/0044828 A1 | 11/2001 | Kikinis | |
| 2001/0048378 A1 | 12/2001 | Horie | |
| 2002/0027549 A1 | 3/2002 | Hirshberg | |
| 2002/0032011 A1 | 3/2002 | Park | |
| 2002/0050980 A1 | 5/2002 | Furuki et al. | |
| 2002/0149566 A1 | 10/2002 | Sarkissian | |
| 2002/0172538 A1 | 11/2002 | Hwa | |
| 2003/0006956 A1 | 1/2003 | Wu et al. | |
| 2003/0006968 A1 | 1/2003 | Solomon | |
| 2003/0052863 A1 | 3/2003 | Hsia | |
| 2003/0063598 A1 | 4/2003 | Huo | |
| 2003/0067445 A1 | 4/2003 | Hirshberg et al. | |
| 2003/0073414 A1 * | 4/2003 | P. Capps | 455/90 |
| 2003/0073456 A1 | 4/2003 | Griffin et al. | |
| 2003/0083021 A1 | 5/2003 | Hsu et al. | |
| 2003/0107555 A1 | 6/2003 | Williams | |
| 2003/0160712 A1 | 8/2003 | Levy | |
| 2003/0193478 A1 | 10/2003 | Ng et al. | |
| 2004/0108994 A1 | 6/2004 | Kato | |
| 2004/0142734 A1 | 7/2004 | Kim | |
| 2004/0165924 A1 | 8/2004 | Griffin | |
| 2004/0171411 A1 | 9/2004 | Shimoda | |
| 2004/0189607 A1 | 9/2004 | Afanasiev | |
| 2004/0198249 A1 | 10/2004 | Grifffin | |
| 2004/0229663 A1 * | 11/2004 | Tosey et al. | 455/575.1 |
| 2005/0014537 A1 | 1/2005 | Gammon et al. | |
| 2005/0019079 A1 | 1/2005 | Griffin et al. | |
| 2005/0053225 A1 | 3/2005 | Griffin | |
| 2005/0054376 A1 * | 3/2005 | Griffin et al. | 455/553.1 |
| 2005/0073446 A1 * | 4/2005 | Lazaridis et al. | 341/22 |
| 2005/0091431 A1 * | 4/2005 | Olodort et al. | 710/72 |

FOREIGN PATENT DOCUMENTS

| | | | |
|---|---|---|---|
| EP | 267801 | 5/1988 | |
| EP | 278169 | 8/1988 | |
| EP | 538020 | 4/1993 | |
| EP | 540147 | 5/1993 | |
| EP | 685801 | 12/1995 | |
| EP | 732646 | 9/1996 | |
| EP | 760291 | 3/1997 | |
| EP | 00872996 | 10/1998 | |
| EP | 882259 | 12/1998 | |
| EP | 1035712 | 9/2000 | |
| EP | 1143327 | 10/2001 | |
| EP | 1347362 | 9/2003 | |
| EP | 1378817 | 1/2004 | |
| EP | 01881513 | 1/2008 | |
| GB | 2242047 | 9/1991 | |
| JP | 63-113892 | 5/1988 | |
| JP | 64-10830 | 1/1989 | |
| JP | 64002117 | 1/1989 | |
| JP | 235226 | 3/1990 | |
| JP | 06102979 A * | 4/1994 | |
| JP | 06102988 A * | 4/1994 | |
| JP | 2000035857 A * | 2/2000 | |
| JP | 2000-214990 | 8/2000 | |
| JP | 2002222037 | 8/2002 | |
| JP | 2002251253 A * | 9/2002 | |
| JP | 2002297292 | 10/2002 | |
| JP | 2002351599 A * | 12/2002 | |
| JP | 2003258977 | 9/2003 | |
| WO | 9833111 | 7/1998 | |
| WO | 9844631 | 10/1998 | |
| WO | 9937025 | 7/1999 | |
| WO | 9959310 | 11/1999 | |
| WO | 0030381 | 5/2000 | |
| WO | 0038041 | 6/2000 | |
| WO | 0062150 | 10/2000 | |
| WO | 0074240 | 12/2000 | |
| WO | 0150335 | 7/2001 | |
| WO | 0185460 | 11/2001 | |
| WO | 01/95081 | 12/2001 | |
| WO | 0195358 | 12/2001 | |
| WO | 02088920 | 11/2002 | |
| WO | 02100646 | 12/2002 | |
| WO | 03012617 | 2/2003 | |
| WO | 03019519 | 3/2003 | |
| WO | 03041047 | 5/2003 | |
| WO | 03052574 | 6/2003 | |
| WO | 03056784 | 7/2003 | |
| WO | 03/107165 | 12/2003 | |
| WO | 03100804 | 12/2003 | |

OTHER PUBLICATIONS

US 6,011,554, 12/1998, Gutowitz, Howard A. (withdrawn).
Commercial Telecommunication Standards, E-Series ITU-T Recommendations, web page http://www.comm.itsa.disa.mil/itu/r_e0.html Jan. 21, 2004.
Final Office Action dated Jun. 26, 2009., In corresponding U.S. Appl. No. 11/217,530.
Advisory Action dated Aug. 27, 2008., In corresponding U.S. Appl. No. 11/217,530.
Final Office Action dated Jun. 9, 2008., In corresponding U.S. Appl. No. 11/217,530.
Final Office Action dated Mar. 31, 2010., In corresponding U.S. Appl. No. 11/217,530.
Handspring Treo 270, Rough Guide to Pocket Stuff Oct. 2003, 45.
Handspring Treo 600, Stuff Magazine Dec. 2003, 136.
Handspring Treo 90, Rough Guide to Pocket Stuff Oct. 2003, p. 46.
IBM Technical Disclosure Bulletin; vol. 18, No. 12, IBM Technical Disclosure Bulletin; vol. 18, No. 12 May 1976, 4187-90.
Motorola A920, Stuff Magazine Dec. 2003, p. 137.
Motorola A920, Stuff Magazine Dec. 2003, p. 72 (2 pages).
Nokia 7600, Stuff Magazine Jan. 2004, p. 24 (2 pages).
Nokia N-Gage, Stuff Magazine Dec. 2003, p. 65.
Non-Final Office Action dated Aug. 13, 2007., In corresponding application No. GB0615209.4.
Non-Final Office Action dated Dec. 23, 2008, In corresponding U.S. Appl. No. 11/217,530.
Non-Final Office Action dated Jul. 18, 2007., In corresponding U.S. Appl. No. 11/217,530.
Non-Final Office Action dated Nov. 15, 2007., In corresponding U.S. Appl. No. 11/217,530.
Non-Final Office Action dated Nov. 6, 2007., In corresponding application No. GB0615209.4.
Non-Final Office Action dated Sep. 9, 2009., In corresponding U.S. Appl. No. 11/217,530.
Notice of Allowance and Fee(s) Due dated Jun. 16, 2010., In corresponding U.S. Appl. No. 11/217,530.
Office Action dated May 26, 2010, In corresponding application No. 2552263.
Office Action Restriction requirement dated Feb. 21, 2007, In corresponding U.S. Appl. No. 11/217,530.
Orange E100, Rough Guide to Pocket Stuff Oct. 2003, p. 41 (2 pages).
Palm Tungsten C, Rough Guide to Pocket Stuff Oct. 2003, 45 (2 pg).
Palm Tungsten W, Stuff Magazine Dec. 2003, 140.

Phone Key Pads, web page www.dialabc.com/motion/keypads.html Jan. 21, 2004.
Siemens SX1, Stuff Magazine Jan. 2004 , p. 64 (2 pages).
Sony Clie NX70V, Rough Guide to Pocket Stuff Oct. 2003 , 45.
Sony Clie NZ90, Rough Guide to Pocket Stuff Oct. 2003 , p. 47 (2 pages).
Sony Clie PEG-UX50, Stuff Magazine <!Pubdate**> , 74 (2 pg).
Sony Ericsson P800, Stuff Magazine Dec. 2003 , p. 65 (2 pages).
Sony Ericsson P900, Stuff Magazine Jan. 2004 , p. 78 (2 pages).
Stuff Magazine, Stuff Magazine Jan. 2004 , p. 113.
TelMe T919, Rough Guide to Pocket Stuff Oct. 2003 , p. 39.
Triangular Toggle keys for Touch-Tone Phones, IBM Technical Disclosure Bulletin, vol. 31, No. 1, New York, USA Jun. 1, 1988 , 47-49.
Arnott, John L. et al., "Probabilistic Character Disambiguation for Reduced Keyboards Using Small Text Samples", Augumentative and Alternative Communication (AAC) vol. 8 (C) 1992 by Isaac , Department of Mathematics and Computer Science, University of Dundee, Tayside Scotland Sep. 1992 , 215-223.

Hirschberg, David , "Using Numeric Keypad with 4-way keys as New Standard for Text Entry in Compact/Mobile Devices", submitted to a demonstration session in CHI 2003 conference 2003 , 3.
Jannotti, John , "Iconic Text Entry Using a Numeric Keypad", web page www.pdos.lcs.mit.edu/~jj/jannotti, com/ papers/iconic-uist02/ Jan. 22, 2004.
Knodt, Ruediger W. , "Smart Virtual Keyboard System Suitable for Mouse or Stylus Entry", Xerox Disclosure Journal 18, No. 3, Stamford CN May 1993 , 245-46.
Toth, Victor T. , "Programmable Calculators: Hewlett-Packard HP-200LX", web page at www.rskey.org/hp2001x.htm, Ã???Ã??Ã?Â© 2001, 2002 2001.
Examination report issued Aug. 8, 2008 in related application JP 2006-545876.

* cited by examiner

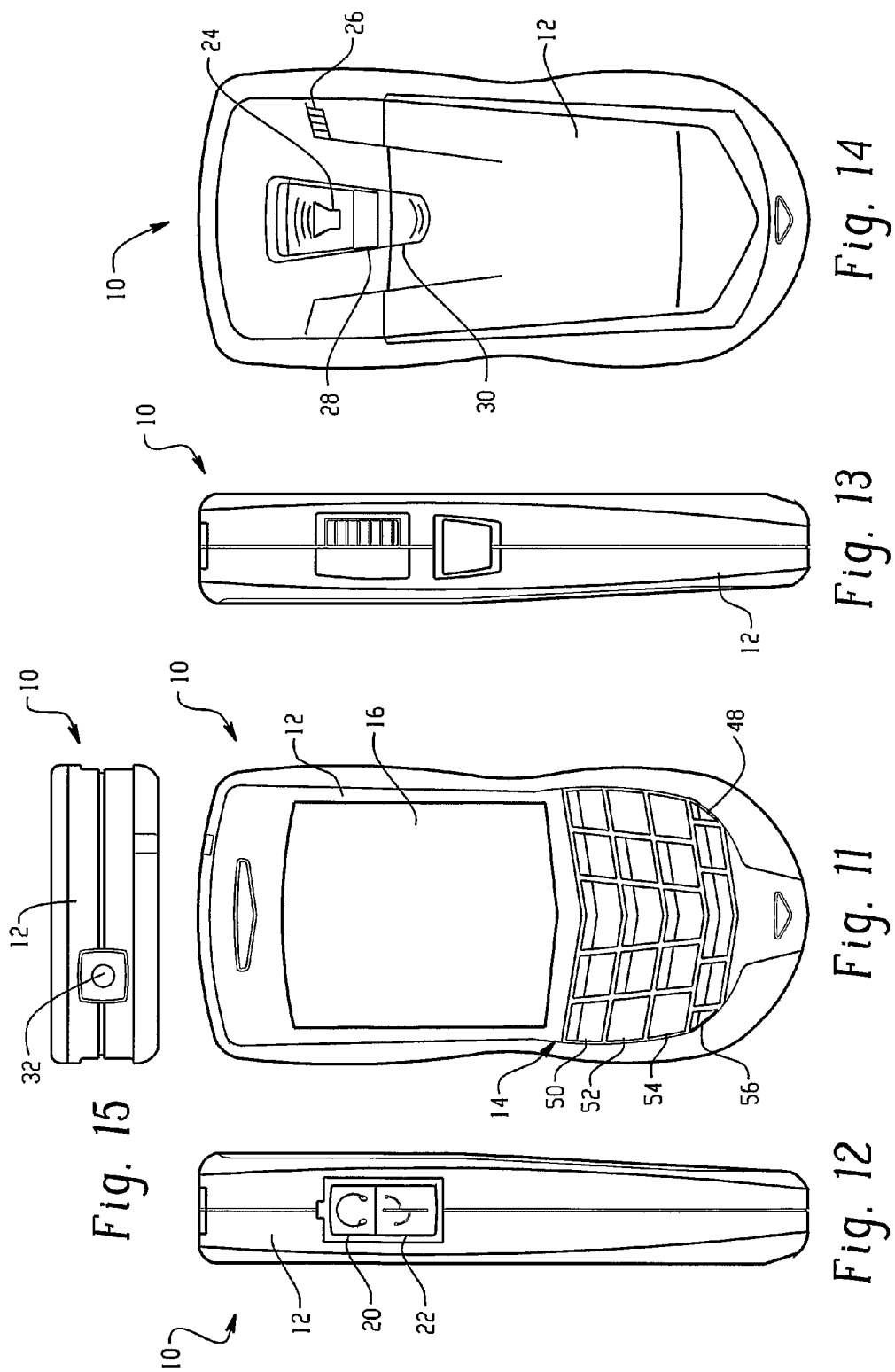

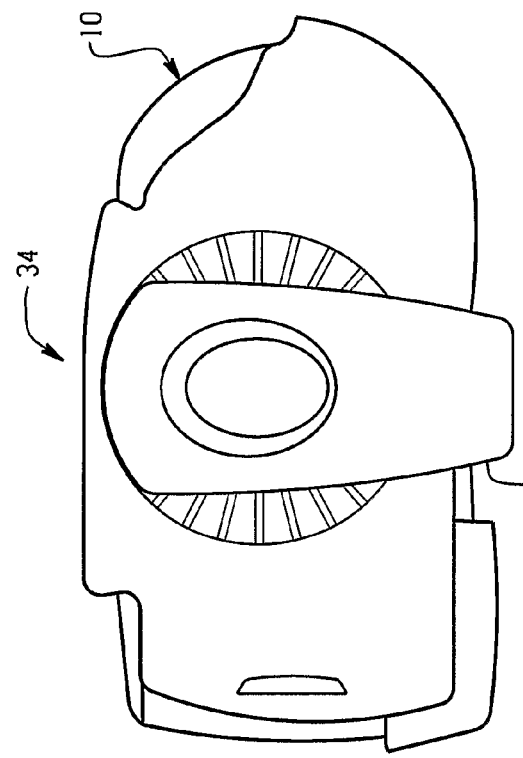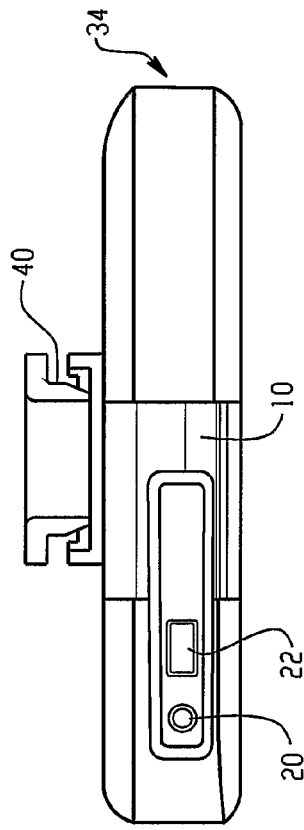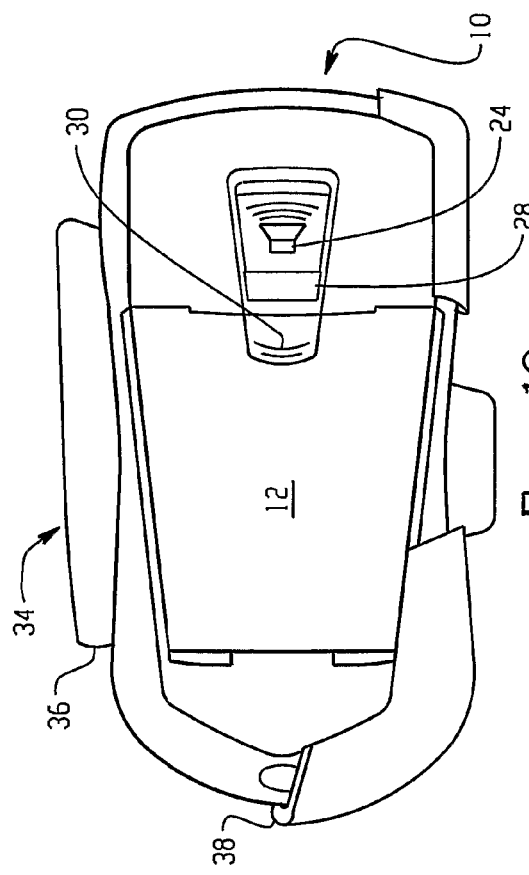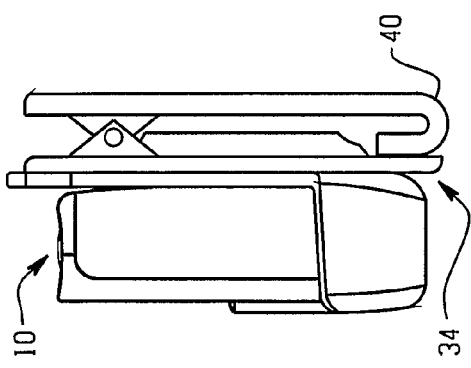

KEYBOARD ARRANGEMENT

FIELD

This technology relates to a keyboard arrangement for an electronic device. In particular, the technology concerns a keyboard arrangement for a handheld mobile communication device.

BACKGROUND

Different standard keyboard arrangements are known. The most widely used English-language alphabetic key arrangement is the QWERTY arrangement, as shown in FIGS. 1 & 5. Other types of standard English-language alphabetic key arrangements include the QWERTZ arrangement, shown in FIG. 2, the AZERTY arrangement, shown in FIG. 3, and the DVORAK arrangement, shown in FIG. 4. Alphabetic key arrangements 44 are often presented along with numeric key arrangements. An exemplary numeric key arrangement is shown in FIGS. 1-4, where the numbers 1-9 and 0 are positioned above the alphabetic keys. In another known numeric key arrangement, numbers share keys with the alphabetic characters, such as the top row of the QWERTY keyboard. Yet another exemplary numeric key arrangement is shown in FIG. 5, where a numeric keypad 46 is spaced from the alphabetic/numeric key arrangement. The numeric keypad 46 includes the numbers "7", "8", "9" arranged in a top row, "4", "5", "6" arranged in a second row, "1", "2", "3" arranged in a third row, and "0" in a bottom row, consistent with what may be found on a known computer keyboard keypad.

A numeric phone key arrangement 42 is also known, as shown in FIG. 6. Phone keypads also often include alphabetic key arrangements overlaying or coinciding with the numeric keys, as shown in FIG. 7. Such alphanumeric phone keypads are used in many traditional hand held mobile communication devices, such as cellular handsets. One standard setting body, the International Telecommunications Union ("ITU"), has established phone standards for the arrangement of alphanumeric keys. The standard phone numeric key arrangement shown in FIGS. 6 and 7 corresponds to ITU Standard E.161, entitled "Arrangement of Digits, Letters, and Symbols on Telephones and Other Devices That Can Be Used for Gaining Access to a Telephone Network." This standard is also known as ANSI T1.703-1995/1999 and ISO/IEC 9995-8:1994.

Mobile communication devices that include a combined text-entry keyboard and a telephony keyboard are also known. Examples of such mobile communication devices include mobile stations, cellular telephones, wireless personal digital assistants (PDAs), two-way paging devices, and others. Combining a traditional-style text-entry keyboard (e.g., a QWERTY-style keyboard) with a traditional-style telephony keyboard on the same mobile communication device typically involves undesirable ergonomic and/or intuitive user interface compromises.

One prior art device that incorporates a combined alphabetic/numeric keyboard is the RIM Blackberry 950 mobile communication device, shown in FIG. 8. In this device, numeric characters share keys with alphabetic characters on the top row of the QWERTY keyboard. Another prior art device that incorporates a combined alphabetic/numeric keyboard is the RIM Blackberry 6210 mobile communication device, shown in FIG. 9. This device utilizes numeric characters in a numeric phone key arrangement consistent with the ITU Standard E.161, discussed above. The numeric characters share keys with alphabetic characters on the left side of the keyboard.

An example of a mobile communication device having a keyboard assembly with a key arrangement is described in U.S. patent application Ser. Nos. 09/967,536 and 10/302,242 and U.S. Pat. No. 6,278,442, the disclosures of which are incorporated herein by reference in their entirety.

U.S. Pat. No. 6,295,052 to Kato et al. and PCT Publication No. WO 02/088920 A1 to Kato et al. teach a data entry device in the form of a screen display key input unit that utilizes a reduced QWERTY arrangement on a touch screen keyboard. Numbers are overlaid on a selective number of alphabetic keys. Keys are selected by touching the screen of the display with a pen, or by utilizing a mouse.

Mobile communication devices currently utilize predictive text technologies to automatically correct common spelling errors and predict the desired word based upon the keystroke input. Predictive text methodologies often include a disambiguation engine and/or a predictive editor application. A number of U.S. and foreign patents discuss predictive text procedures, including: U.S. Pat. Nos. 5,818,437, 5,952,942, 6,002,390, 6,223,059, 6,231,252, and 6,307,548; WO62150A1; WO9959310A2; WO0344650A2; EP1035712B1; EP129621A1; EP1378817A1; EP1347362A1; and EP1347361A1, the disclosures of which are incorporated herein by reference in their entirety. Several mobile communication device manufacturers utilize predictive text technologies, including RIM, Tegic, Motorola, Nokia, Sony, and NEC, among others.

DISCLOSURE OF THE INVENTION

In accordance with the teachings described herein, a physical keyboard comprises a plurality of multi-functional keys and corresponding indicia including keys associated with alphabetic characters corresponding to a QWERTY array of letters A-Z and an overlaid numeric phone key arrangement. The plurality of keys that comprise alphabetic and/or numeric characters total fewer than 26.

In one embodiment, the number of keys that comprise alphabetic and numeric characters is 14. In this embodiment, the total number of keys, including other functional keys, is 20. The plurality of keys may comprise four rows and five columns of keys, with the four rows comprising in order a first, second, third and fourth row, and the five columns comprising in order a first, second, third, fourth, and fifth column. The QWERTY array of letters is associated with three of the four rows and the numeric phone key arrangement is associated with each of the four rows. The numeric phone key arrangement is associated with three of the five columns. Specifically, the numeric phone key arrangement may be associated with the second, third and fourth columns. The numeric phone key arrangement may alternatively be associated with keys in the first, second, third, and fourth rows, with keys in the first row including a number "1" in the second column, a number "2" in the third column, and a number "3" in the fourth column. The numeric phone keys associated with keys in the second row include a number "4" in the second column, a number "5" in the third column, and a number "6" in the fourth column. The numeric phone keys associated with keys in the third row include a number "7" in the second column, a number "8" in the third column, and a number "9" in the fourth column. The numeric phone keys associated with keys in the fourth row may include a "*" in the second column, a number "0" in the third column, and a "#" in the fourth column.

The physical keyboard may also include a function associated with at least one of the plurality of keys. The fourth row of keys may include an "alt" function in the first column, a "next" function in the second column, a "space" function in the third column, a "shift" function in the fourth column, and a "return/enter" function in the fifth column.

The first row of five keys may comprise keys corresponding in order to letters "QW", "ER", "TY", "UI", and "OP". The second row of five keys may comprise keys corresponding in order to letters "AS", "DF", "GH", "JK", and "L". The third row of five keys may comprise keys corresponding in order to letters "ZX", "CV", "BN", and "M".

In another embodiment, the first row of five keys may comprise keys corresponding in order to letters "QW", "ER", "TY", "UI", and "OP". The second row of five keys may comprise keys corresponding in order to letters "AS", "DF", "GH", and "JKL". The third row of five keys may comprise keys corresponding in order to letters "ZXC", "VB", and "NM".

In yet another embodiment, the first row of five keys may comprise keys corresponding in order to letters "QW", "ER", "TY", "UI", and "OP". The second row of five keys may comprise keys corresponding in order to letters "AS", "DF", "GH", "JK", and "L", and the third row of five keys may comprise keys corresponding in order to letters "Z", "XC", "VB", and "NM".

One of the plurality of keys on the physical keyboard is a "return/enter" key associated with a return/enter function. The "return/enter" key may be positioned in the fifth column. The "return/enter" key may be positioned in the fourth row.

In one embodiment, the first row of five keys may comprise keys corresponding in order to letters "QW", "ER", "TY", "UI", and "OP". The second row of five keys may comprise keys corresponding in order to letters "AS", "DF", "GH", "JK", and "L", and the third row of five keys may comprise keys corresponding in order to letters "ZX", "CV", "BN", and "M".

The plurality of keys may be aligned in a plurality of rows and a plurality of columns to form a grid of keys, and, in one embodiment, at least one of the columns and the rows are straight. In another embodiment, one or more of the rows and the columns are non-linear.

The plurality of keys preferably comprise a shape. The shape may be uniform or non-uniform. In one embodiment, the plurality of keys is rectangular. In another embodiment, the keys are oval. In yet another embodiment, the keys are polygonal.

In a further embodiment of the physical keyboard, the number of keys is 24 and the plurality of keys includes a first, second, third and fourth row, and a first, second, third, fourth, fifth, sixth, and seventh column, with the first row including seven keys, the second row including seven keys, the third row including seven keys, and the fourth row including three keys. The three keys of the fourth row may be positioned in the third, fourth, and fifth columns.

The first row of seven keys may comprise keys corresponding in order to letters "Q", "W", "ER", "TY", "UI", "O", and "P". The second row of seven keys may comprise keys corresponding in order to letters "A", "S", "DF", "GH", "JK", and "L", and the third row of seven keys may comprise keys corresponding in order to letters "Z", "XC", "VB", and "NM". The numeric phone arrangement is associated with keys in the first, second, third, and fourth rows, with keys in the first row including a number "1" in the third column, a number "2" in the fourth column, and a number "3" in the fifth column. The numeric phone keys associated with keys in the second row include a number "4" in the third column, a number "5" in the fourth column, and a number "6" in the fifth column. The numeric phone keys associated with keys in the third row include a number "7" in the third column, a number "8" in the fourth column, and a number "9" in the fifth column. The numeric phone keys associated with keys in the fourth row may include a "*" in the third column, a number "0" in the fourth column, and a "#" in the fifth column.

In yet another embodiment, the plurality of keys comprise four rows and six columns of keys, with the four rows comprising a first, second, third and fourth row, and the six columns comprising a first, second, third, fourth, fifth, and sixth column. The numeric phone key arrangement may be associated with the first, second, and third columns and with the first, second, third, and fourth rows.

The first row of six keys may comprise keys corresponding in order to letters "QW", "E", "RT", "YU", "I", and "OP". The second row of six keys may comprise keys corresponding in order to letters "AS", "D", "FG", "HJ", "K", and "L". The third row of six keys may comprise keys corresponding in order to letters "ZX", "BN", and "M". The numeric phone keys may comprise keys in the first row including a number "1" in the first column, a number "2" in the second column, and a number "3" in the third column. The numeric phone keys associated with keys in the second row may include a number "4" in the first column, a number "5" in the second column, and a number "6" in the third column. The numeric phone keys associated with keys in the third row may include a number "7" in the first column, a number "8" in the second column, and a number "9" in the third column. The fourth row may comprise five keys that are misaligned with the first through sixth columns. The fourth row keys comprise a first, second, third, fourth, and fifth key, with the second key of the fourth row comprising the "0" of the numeric phone key arrangement.

In an alternative embodiment, the numeric phone key arrangement is associated with the second, third, and fourth columns and with the first, second, third, and fourth rows. The first row of six keys may comprise keys corresponding in order to letters "QW", "E", "RT", "YU", "I", and "OP". The second row of six keys may comprise keys corresponding in order to letters "AS", "D", "FG", "HJ", and "KL". The third row of six keys may comprise keys corresponding in order to letters "ZX", "CV", "BN", and "M". The numeric phone arrangement may comprise keys in the first row including a number "1" in the second column, a number "2" in the third column, and a number "3" in the fourth column. The numeric phone keys associated with keys in the second row may include a number "4" in the second column, a number "5" in the third column, and a number "6" in the fourth column. The numeric phone keys associated with keys in the third row may include a number "7" in the second column, a number "8" in the third column, and a number "9" in the fourth column. The fourth row may comprise three keys that are misaligned with the first through sixth columns. The fourth row keys may comprise a first, a second, and a third key, with the first key of the fourth row comprising a "*", the second key of the fourth row comprising a "0", and the third key of the fourth row comprising a "#".

In another embodiment, the plurality of keys comprise four rows and four columns of keys, with the four rows comprising a first, second, third and fourth row and the four columns comprising a first, second, third, and fourth column. In this embodiment, the numeric phone key arrangement is associated with the first, second, and third columns and with the first, second, third, and fourth rows. The first row includes four keys comprising keys corresponding in order to letters "QWE", "RT", "YU", and "IOP". The second row includes four keys comprising keys corresponding in order to letters "ASD", "FGH", and "JKL". The third row includes four keys comprising keys corresponding in order to letters "ZXC", "VB", and "NM". The numeric phone key arrangement comprises keys in the first row including a number "1" in the first column, a number "2" in the second column, and a number "3" in the third column. The numeric phone key arrangement comprises keys in the second row including a number "4" in the first column, a number "5" in the second column, and a number "6" in the third column. The numeric phone key arrangement comprises keys in the third row including a number "7" in the first column, a number "8" in the second column, and a number "9" in the third column. The fourth row includes four keys and the numeric phone key arrangement in the fourth row comprises keys in the first column of "*", the second column of "0", and the third column of "#". The fourth key of the second row may be associated with a "backspace" function. The fourth key of the third row may be associated with a "return/enter" function. The first key of the fourth row may be associated with a "txt" function. The second key of the fourth row may be associated with a "space" function. The third key of the fourth row may be associated with a "shift" function and the fourth key of the fourth row may be associated with an "alt" function.

In a further embodiment, the physical keyboard comprises four rows of keys, with the first row of keys including a first number of keys, the second row of keys including the first number minus one number of keys, the third row of keys including the first number minus two number of keys, and the fourth row of keys including the first number minus three number of keys. The plurality of keys may be arranged symmetrically around a center line.

In yet another embodiment, the physical keyboard comprises four rows of keys, with the first row of keys including a first number of keys, the second row of keys including fewer keys than the first row, the third row of keys including fewer keys than the second row, and the fourth row of keys including fewer keys than the third row. The plurality of keys may be arranged symmetrically around a center line.

The indicia associated with the physical keyboard may comprise alphabetic indicia and numeric indicia, with the alphabetic indicia having a first color and the numeric indicia having a second color. The first and second colors may be the same or different. The alphabetic indicia and/or numeric indicia may be positioned on the plurality of keys. The alphabetic indicia and numeric indicia has a font and a font size. The font size of the alphabetic indicia may be the same as or different from the font size of the numeric indicia. The font of the alphabetic indicia may be the same as or different from the numeric indicia. The font size of the alphabetic indicia may be about ⅓ the font size of the numeric indicia. In another embodiment, the numeric indicia may have a font size of 10 mm.

The keyboard may also include a touch identifying portion in the form of a raised bump or a recessed dimple that is associated with one of the keys. In one embodiment, the identifying portion is positioned on a key associated with the number "5".

In another embodiment of the physical keyboard, the keyboard comprises a plurality of multi-functional keys and corresponding indicia includes keys associated with alphabetic characters corresponding to a QWERTY array of letters A-Z. The plurality of keys is overlaid with a numeric phone key arrangement. The numeric phone key arrangement is associated with a subset of the plurality of keys, and the subset of keys is arranged symmetrically about a center line.

The plurality of keys may be arranged in rows and columns, with the "1", "2", and "3" of the numeric phone key arrangement being associated with keys in a first row, the "4", "5", and "6" of the numeric phone key arrangement being associated with keys in a second row, and the "7", "8", and "9" of the numeric phone key arrangement being associated with keys in a third row. The "0" of the numeric phone key arrangement is associated with a key in the fourth row, and the "0" key is centered beneath the remainder of the numeric phone key arrangement. The plurality of keys may also comprise a associated with one of the plurality of keys and a "#" associated with one of the plurality of keys. The "*" key is positioned directly adjacent one side of the "0" key and the "#" key is positioned directly adjacent the other side of the "0" key.

In yet another embodiment, a physical keyboard arrangement comprises a reduced column QWERTY array of letters A-Z overlaid with a numeric phone key array. The numeric phone key array includes at least numbers. The numeric phone key array may also include symbols.

In a further embodiment, a physical keyboard comprises a plurality of multi-functional keys and corresponding indicia including a reduced column QWERTY alphabetic key arrangement. The plurality of keys is overlaid with a numeric phone key arrangement. The number of columns may be an odd number and the numeric phone key arrangement may be centered over the columns. In a preferred embodiment, the number of columns is five and the physical keyboard arrangement further comprises four rows, with the QWERTY key arrangement utilizing keys in three of the four rows and the numeric phone key arrangement utilizing keys in each of the four rows.

In yet another embodiment, a physical keyboard comprises a plurality of multi-functional keys and corresponding indicia including keys associated with alphabetic characters corresponding to a QWERTY array of letters A-Z. The plurality of keys is positioned in seven columns including a first, a second, a third, a fourth, a fifth, a sixth, and a seventh column and at least three rows including a first, a second, and a third row.

The first row may include seven keys that comprise keys corresponding in order to letters "QW", "E", "R", "TY", "U", "I", and "OP". The second row may include seven keys that comprise keys corresponding in order to letters "A", "S", "DF", "G", "H", "JK", and "L". The third row may include seven keys that comprise keys corresponding in order to letters "ZX", "C", "VB", "N", and "M". The physical keyboard may also comprise a fourth row of keys having at least five keys. The at least five keys are associated with the functions of "next", "shift", "space", "shift", and "enter".

The first row of seven keys may comprise keys corresponding in order to letters "QW", "E", "R", "TY", "U", "I", and "OP". The second row of seven keys may comprise keys corresponding in order to letters "A", "S", "DF", "GH", "JK", and "L". The third row of seven keys may comprise keys corresponding in order to letters "ZX", "C", "VB", "N", and "M".

The physical keyboard may include a fourth row with a numeric phone key arrangement overlaying the QWERTY array. In one embodiment, the numeric phone key arrangement is associated with the third, fourth, and fifth columns. In another embodiment, the numeric phone key arrangement is associated with the first, second, and third columns. In yet another embodiment, the numeric phone key arrangement is associated with the second, third, and fourth columns.

In another embodiment, a handheld mobile station comprises a housing, a display, and a physical keyboard comprising a first user interface having a set of keys associated therewith and a second user interface having a set of keys associated therewith. A subset of the set of keys for the second user interface is a subset of the set of keys for the first user interface. The first user interface is selected from the group consisting of QWERTY, QWERTZ, AZERTY, or DVORAK.

The second user interface is a numeric phone key arrangement. The set of keys for the first user interface comprises less than 26 keys.

The second user interface may be centered on a face of the handheld mobile station. Alternatively, the second user interface may be positioned substantially on the left side of the face of the handheld mobile station. The second user interface could also be positioned substantially on the right side of the face of the handheld mobile station.

A "0" indicia for the second user interface may be presented on a key representing a space bar associated with the first user interface. Indicia associated with the first user interface may be presented on the set of keys for the first user interface and indicia associated with the second user interface may be presented on the housing.

Alternatively, indicia associated with the first user interface may be presented on the set of keys for the first user interface and indicia associated with the second user interface may be presented on the set of keys for the second user interface.

A first area of a front surface of the housing may have a first color in and around an area near the set of keys for the second user interface. The first color may be different from a second color in a second area of the front surface contiguous to at least a portion of the first area. A first and a second color on the set of keys may be associated with the first user interface. The first color may dominate a top portion of the set of keys and the second color may dominate a bottom portion of the set of keys. The second color may be associated with the set of keys for the first user interface.

In another embodiment of the physical keyboard, a plurality of keys have one or more indicia on each key, with the plurality of keys forming at least a first user interface on the physical keyboard. The keys and indicia of the first user interface are arranged so as to form a QWERTY alphabetic configuration, with a majority of the keys of the first user interface representing more than one alphabetic letter per key. The physical keyboard also comprises a subset of the plurality of keys, with each key of the subset having indicia representing a number 0-9. The subset forms a second user interface positioned in a numeric phone keypad arrangement on the physical keyboard. The indicia representing numbers is larger in size than any alphabetic indicia on the subset of keys. The subset of keys may further include the symbols "*" and "#".

In yet another embodiment, a physical keyboard comprises a plurality of keys having one or more indicia on each key. The plurality of keys form at least a first user interface on the physical keyboard. The keys and indicia of the first user interface are arranged so as to form a QWERTY alphabetic configuration, with a majority of the keys of the first user interface representing more than one alphabetic letter per key. The plurality of keys on the physical keyboard is less than 26 keys. The physical keyboard also comprises a subset of the plurality of keys. Each key of the subset has indicia representing a character from a numeric phone keypad arrangement. The subset forms a second user interface arranged as a numeric phone keypad on the physical keyboard. The character from a numeric phone keypad may be selected from the group consisting of: "0", "1", "2", "3", "4", "5", "6", "7", "8", "9", "*" and "#".

In a further embodiment, a physical keyboard comprises a plurality of multi-functional keys and corresponding indicia including keys associated with alphabetic characters corresponding to a QWERTY array of letters A-Z, an overlaid numeric key array of numbers 0-9, and a "space" function. The number "0" and the "space" function are associated with the same key.

The numeric key array may be oriented in a numeric phone key arrangement. The plurality of keys may be arranged in at least four rows and at least four columns, with at least some of the keys being associated with more than one alphabetic character.

In yet another embodiment, a physical keyboard comprises a plurality of multi-functional keys and corresponding indicia including keys associated with alphabetic characters corresponding to a QWERTY array of letters A-Z and an overlaid numeric array of numbers 0-9. The overlaid numeric array of numbers comprise greater than 10 keys, such that at least one of the numbers is associated with two or more keys.

The alphabetic characters may each be positioned on a single key and a number of keys utilized for alphabetic characters is 26. Alternatively, a number of keys utilized for alphabetic characters may be less than 26 such that at least two of the alphabetic characters are associated with a single key.

The numeric keys may comprise at least two keys associated with the numbers "1", at least two keys associated with the numbers "3", at least two keys associated with the numbers "4", at least two keys associated with the numbers "6", at least two keys associated with the numbers "7", and at least two keys associated with the numbers "9". In addition, the numeric keys may further comprise at least two keys associated with the numbers "2", at least two keys associated with the numbers "5", and at least two keys associated with the numbers "8".

In another embodiment, a physical keyboard comprises a plurality of multi-functional keys comprising an alphabetic array of keys comprising the alphabetic characters A-Z and a numeric array of keys comprising the numeric characters 0-9 overlaid on the alphabetic array of keys. The alphabetic and numeric characters share at least some of the plurality of keys. The plurality of keys are arranged in a plurality of rows and a plurality of columns, each of which has a column width. The numeric keys are spaced at least one column width from one another.

In another embodiment, a physical keyboard comprises a plurality of multi-functional keys and corresponding indicia including keys associated with alphabetic characters corresponding to a QWERTY array of letters A-Z and an overlaid numeric phone key arrangement. The numeric phone key arrangement is centered on the keys associated with alphabetic characters. The plurality of keys may be arranged in rows and columns, with alphabetic characters being associated with a first row, a second row, and a third row, and numbers being associated with the first row, the second row, the third row, and a fourth row, with a "1", "2", and "3" being associated with the first row, a "4", "5", and "6" being associated with the second row, and a "7", "8", and "9" being associated with the third row. A "0" is associated with the fourth row and is centered beneath the numeric keys in the first, second, and third row.

A mobile communication device having a face may utilize the physical keyboard, described above. The physical keyboard is associated with the face and the numeric array of keys is positioned symmetrically on the face of the device.

In another embodiment, a physical keyboard comprises a plurality of multi-functional keys and corresponding indicia including keys associated with alphabetic characters corresponding to a reduced QWERTY array of letters A-Z and a subset of the plurality of keys corresponding to a numeric phone key arrangement. The numeric phone key arrangement is oriented on the keyboard such that the subset of keys is symmetrical about a common center line.

In a further embodiment, a plurality of multi-functional keys and corresponding indicia includes keys associated with alphabetic characters corresponding to a reduced QWERTY array of letters A-Z and a subset of the plurality of keys corresponding to an numeric phone key arrangement. The plurality of keys are arranged in a first row, a second row, a third row, and a fourth row, and a plurality of columns. The subset of keys comprises a "1", "2", and "3" associated with keys in the first row, a "4", "5", and "6" associated with keys in the second row, a "7", "8", and "9" associated with keys in a third row, and a "0" associated with a key in the fourth row. In addition, the "1", "4", and "7" are aligned in a first column, the "2", "5", "8", and "0" are aligned in a second column, and the "3", "6", and "9" are aligned in a third column. The key associated with "0" is centered beneath the 1-9 keys of the numeric phone key arrangement.

The first, second, and third columns may be a subset of the plurality of columns, and the first, second, and third columns may be centered among the plurality of columns. Alternatively, the first, second, and third columns may be a subset of the plurality of columns, and the first, second, and third columns may be not centered among the plurality of columns.

In another embodiment, a physical keyboard comprises a plurality of multi-functional keys and corresponding indicia including keys associated with alphabetic characters corresponding to a QWERTY array of letters A-Z and a subset of the plurality of keys corresponding to a numeric array of numbers 0-9, "*", and "#". The key associated with "0" is positioned between a key associated with "*" and a key associated with "#". The plurality of keys may comprise rows and columns, and the keys associated with "*", "0", and "#" are all positioned in the same row. The key associated with "*" may be positioned to the left of and adjacent to the key associated with "0", and the key associated with "#" may be positioned to the right of and adjacent to the key associated with "0".

In yet another embodiment, the physical keyboard comprises a plurality of multi-functional keys and corresponding indicia including keys associated with alphabetic characters corresponding to a QWERTY array of letters A-Z, a first subset of the plurality of keys corresponding to a numeric array of numbers 0-9, and a second subset of the plurality of keys corresponding to the symbols "*" and "#". The first subset of keys and the second subset of keys do not overlap.

The physical keyboard or physical keyboard arrangements, described above, may be used with a handheld mobile communication device and a mobile communication device having a telephony mode and a text-entry mode, among other devices.

In yet another embodiment, a method for operating a mobile communication device having the physical keyboard described above comprises inputting numbers into a mobile communication device by striking keys with the fingers of a single hand, and inputting letters into a mobile communication device by striking keys with the fingers of two hands. The method may also include inputting functional commands and symbols by striking keys with fingers from a single hand, or inputting functional commands and symbols by striking keys with the fingers of two hands.

BRIEF DESCRIPTION OF THE DRAWING FIGURES

FIG. 4 is a plan view of a standard DVORAK alphabetic key arrangement with a numeric key arrangement aligned over the alphabetic key arrangement;

FIG. 5 is a plan view of the key arrangement of FIG. 1 positioned beside a numeric keypad;

FIG. 11 is a front view of a handheld mobile communication device having another example keyboard;

FIG. 12 is a left side view of the mobile communication device of FIG. 11;

FIG. 13 is a right side view of the mobile communication device of FIG. 11;

FIG. 14 is a back view of the mobile communication device of FIG. 11;

FIG. 15 is a bottom end view of the mobile communication device of FIG. 11;

FIG. 16 is a back view of the mobile communication device of FIG. 11 positioned in a belt clip carrier;

FIG. 17 is a front view of the mobile communication device of FIG. 11 positioned in the belt clip carrier of FIG. 16;

FIG. 18 is a side view of the mobile communication device of FIG. 11 positioned in the belt clip carrier of FIG. 16;

FIG. 19 is a top view of the mobile communication device of FIG. 11 positioned in a belt clip carrier of FIG. 16;

DETAILED DESCRIPTION

With reference now to the drawings, FIGS. 10-20, 28, and 54 include various views of a mobile communication device 10 having an example keyboard 14. The keyboard 14 is a physical keyboard that includes a plurality of multi-functional keys. The keys are multi-functional in that they may be used to enter alphabetic characters, numbers, touch tones, symbols, and/or functions, or other known entries. The keyboard is a physical keyboard in the sense that it utilizes keys that are movable, rather than a touch screen-type keyboard, which does not utilize movable keys. In a preferred embodiment, the keys are movable to activate switches that are positioned beneath the keys.

The example physical keyboard 14 may be used for text entry and telephony entry and is intended to marry well known keyboards, such as those used on computer or typewriter keyboards, with keypads, such as those used on touch tone phones or cellular phones, into a single arrangement. The example physical keyboard is designed to be readily familiar to a user because of this marriage. The keyboard 14 provides a first user interface that includes alphabetic characters 44 comprising a standard alphabetic format, such as QWERTY, QWERTZ, AZERTY, or DVORAK, among other known formats, for text entry, and a second user interface that includes numeric characters for telephony entry. Current standard alphabetic keyboard formats utilize 26 keys for alphabetic characters, as shown in FIGS. 1-5, with each key representing a single alphabetic character. A preferred embodiment of the example keyboard 14 presents alphabetic characters in a reduced key format, with fewer columns and keys than the standard format. Each of the 26 alphabetic characters are provided, but in a reduced format such that some of the keys of the keyboard represent more than one alphabetic character. The alphabetic characters, numbers, symbols, and functions are represented on the keyboard 14 by indicia, which may be positioned directly on the keys of keyboard 14, or positioned on the housing of the mobile communication device.

The preferred reduced physical keyboard is accomplished by utilizing fewer columns than a standard format keyboard. Because of this, the keyboard 14 is well suited for application on a housing form factor similar to that of a housing associated with a numeric-keypad-based mobile communication device. In particular, the reduced column keyboard 14 provides for reduced size devices without sacrificing speed and convenience to a user. The reduced key keyboard also allows for smaller devices that are more stylish and fashionable.

Figure 1:
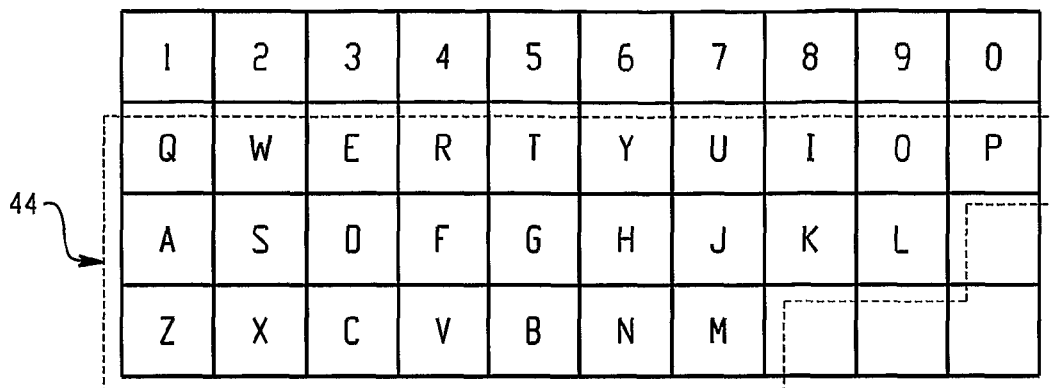
FIG. 1 is a plan view of a standard QWERTY alphabetic key arrangement with a numeric key arrangement aligned over the alphabetic key arrangement.
Figure 2:
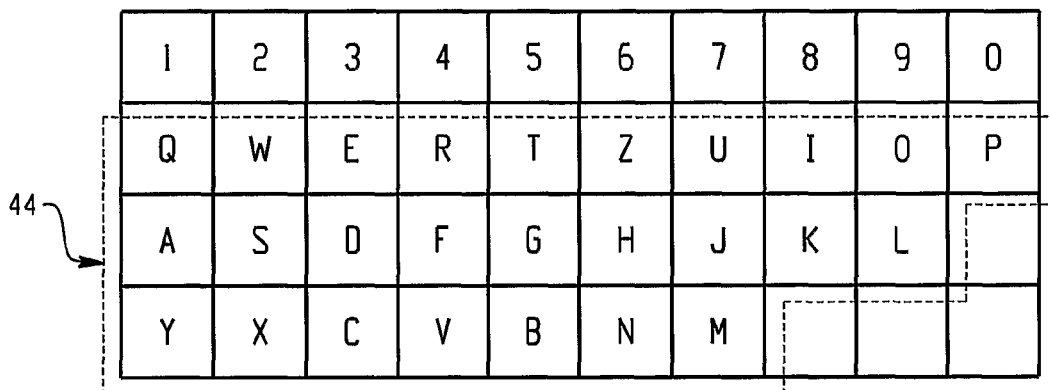
FIG. 2 is a plan view of a standard QWERTZ alphabetic key arrangement with a numeric key arrangement aligned over the alphabetic key arrangement.
Figure 3:
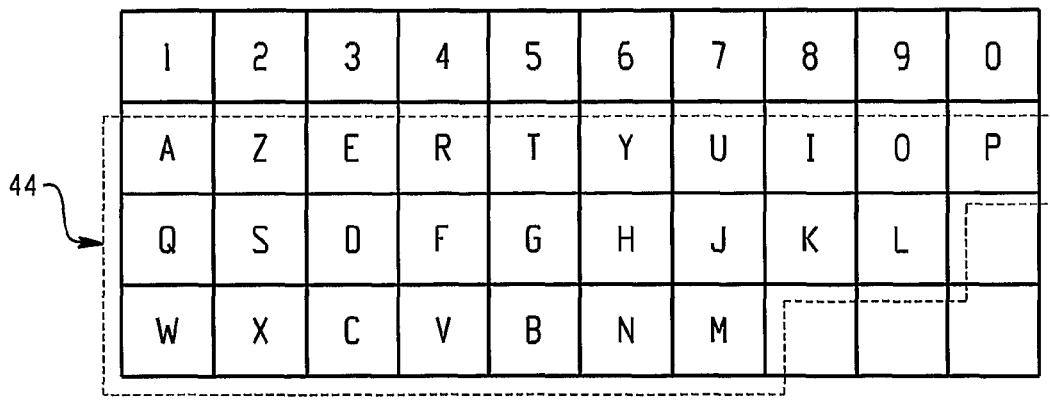
FIG. 3 is a plan view of a standard AZERTY alphabetic key arrangement with a numeric key arrangement aligned over the alphabetic key arrangement.
Figure 6:
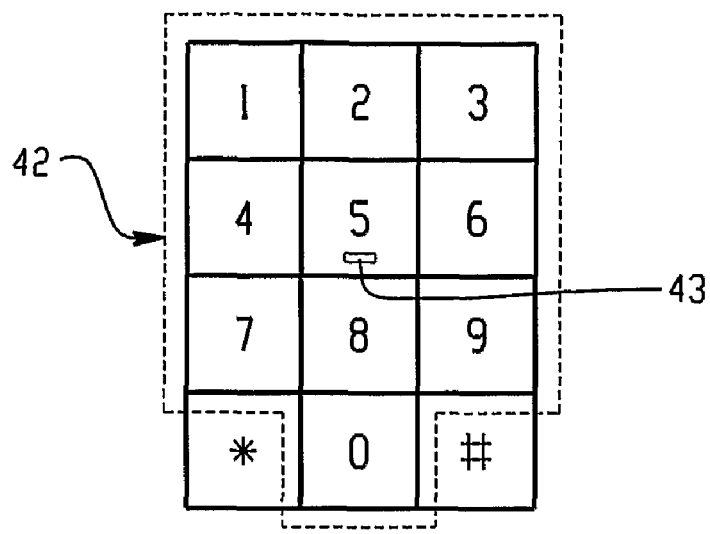
FIG. 6 is a plan view of a standard numeric phone keypad arrangement.
Figure 7:
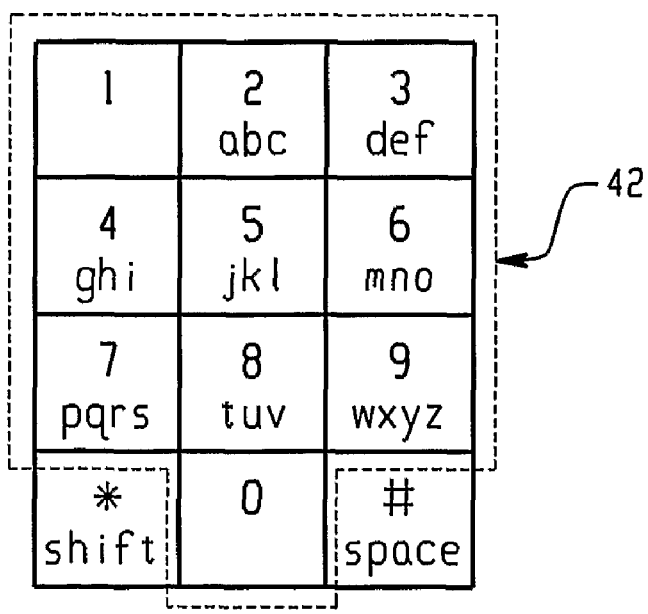
FIG. 7 is plan view of a standard numeric phone/alphabetic keypad arrangement.
Figure 9:
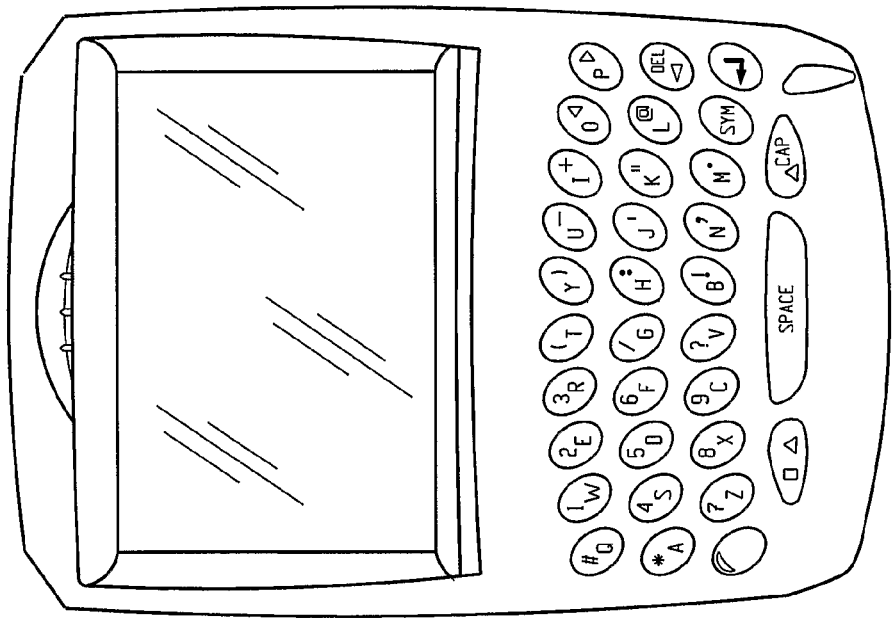
FIG. 9 is an elevated view of a prior art handheld mobile communication device.
Figure 8:
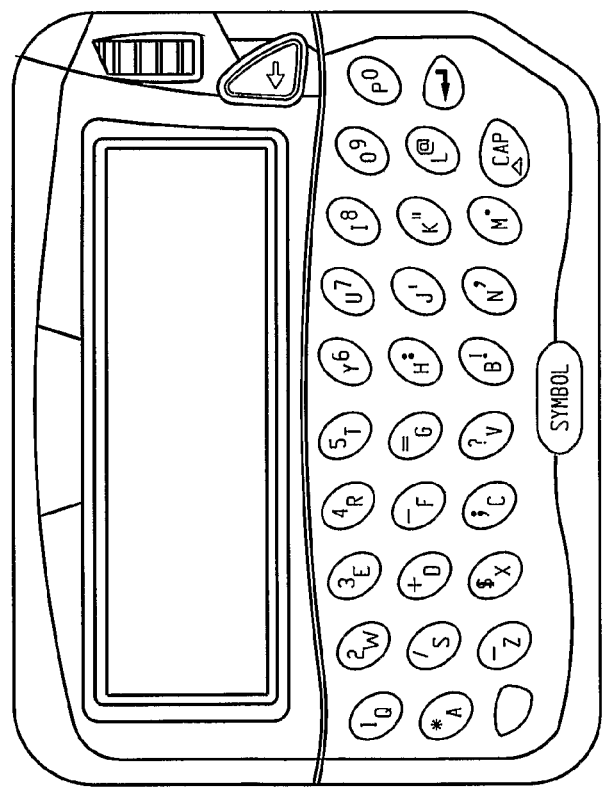
FIG. 8 is an elevated view of a prior art handheld mobile communication device.

The second user interface of the example keyboard 14 includes numeric characters that correspond to a phone pad 42, including the numbers 0-9. It is preferred that the array of numbers be presented on the keyboard in the format of a standard numeric phone key arrangement 42, depicted in FIG. 6, such that the numbers "1, 2, 3" appear in the first row 50, "4, 5, 6" appear in the second row 52, "7, 8, 9" appear in the third row 54, and at least a "0" appears in the fourth, bottom row 56, with each row of numbers being symmetrical about a common center line that runs through the center column of numbers. It is preferred that the "0" be centered beneath the remainder of the numbers 1-9. In addition, each number is positioned on its own key, as with a standard phone key pad. The standard numeric phone key arrangement corresponds to the International Telecommunication Union ("ITU") Standard E.161, entitled "Arrangement of Digits, Letters, and Symbols on Telephones and Other Devices That Can Be Used for Gaining Access to a Telephone Network" (also known as ANSI TI.703-1995/1999 and ISO/IEC 9995-8:1994).

In one embodiment, the numeric phone key arrangement 42 may also utilize a surface treatment on the surface of the center "5" key in the form of a raised bump or recessed dimple 43. This bump or dimple 43 is typically standard on telephones and is used to identify the "5" key through touch alone. Once the user has identified the "5" key, it is possible to identify the remainder of the phone keys through touch alone because of their standard placement. The bump or dimple 43 is depicted in FIGS. 6, 10, 11A and 21, for example. The bump or dimple 43 preferably has a shape and size that is readily evident to a user through touch. An example bump or dimple 43 may be round, rectangular, or have another shape if desired. Alternatively, raised bumps may be positioned on the housing around the "5" key and do not necessarily have to be positioned directly on the key, as known by those of skill in the art.

Figure 40:
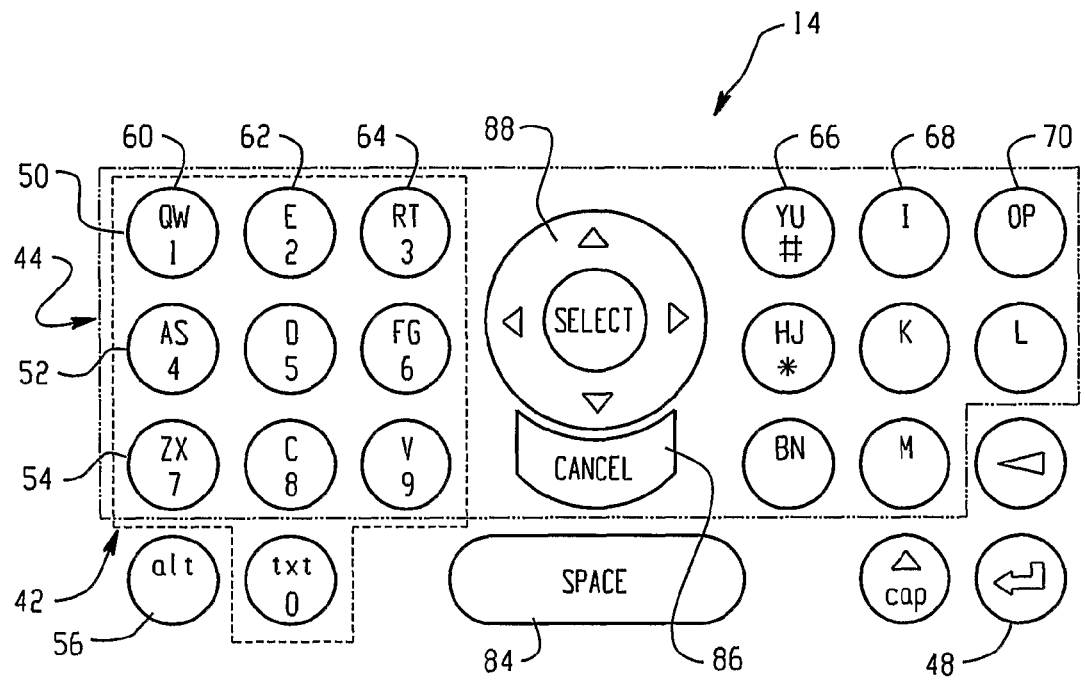
FIG. 40 is yet another example keyboard arrangement for a reduced key QWERTY/numeric keyboard.

The fourth row 56 may also include the symbols "*" and "#", although these symbols may alternatively be positioned at other locations on the keyboard 14, as shown in FIG. 40, or appear on the display of the mobile communication device when invoked by a symbol lookup. In a preferred embodiment, the "*" key is positioned directly to the left of the "0" key and the "#" key is positioned directly to the right of the "0" key. In any case, the "*" and "#" keys preferably do not share keys with any of the numbers 0-9.

Figures 4, 5:
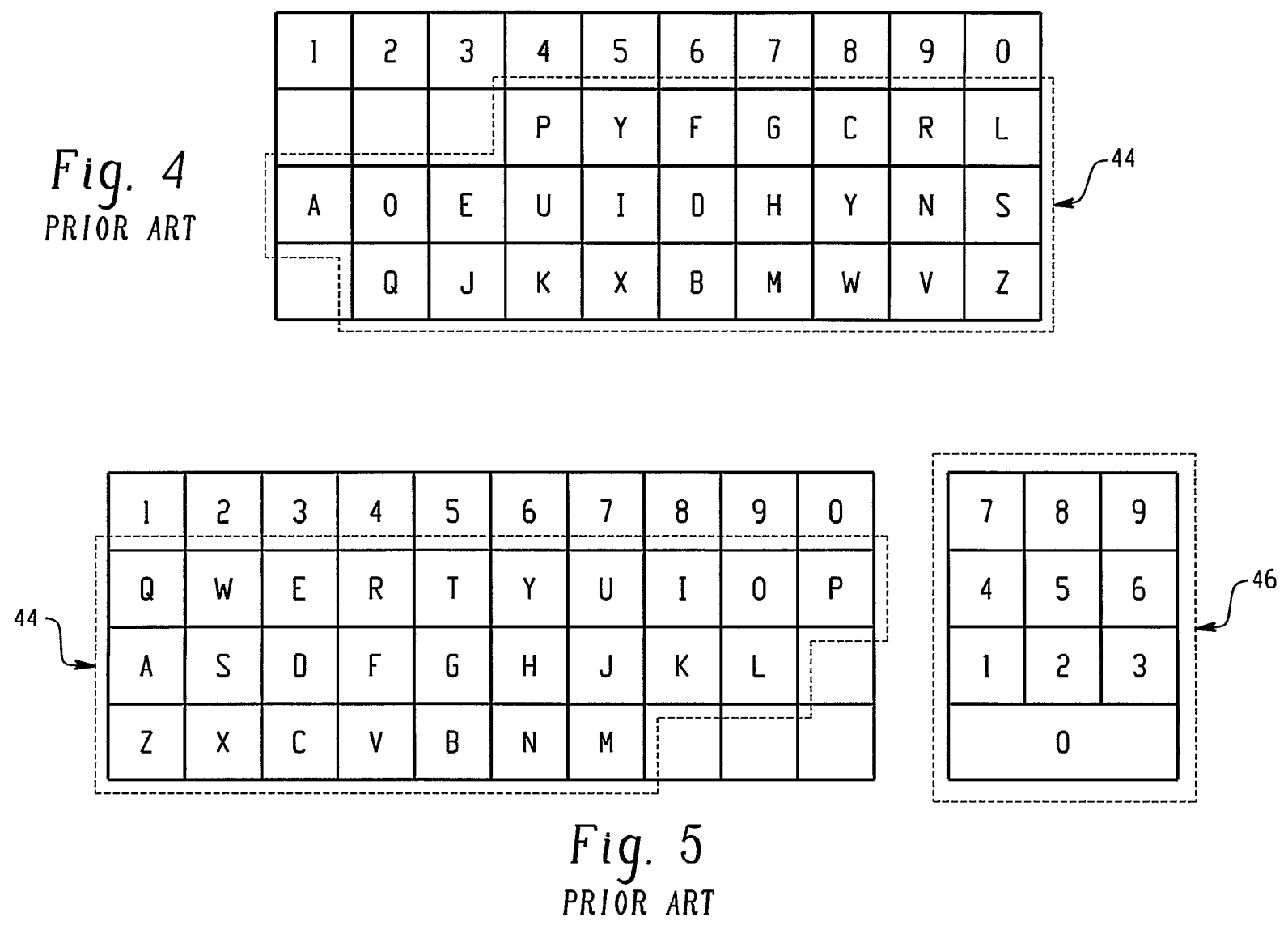
Figure 50:
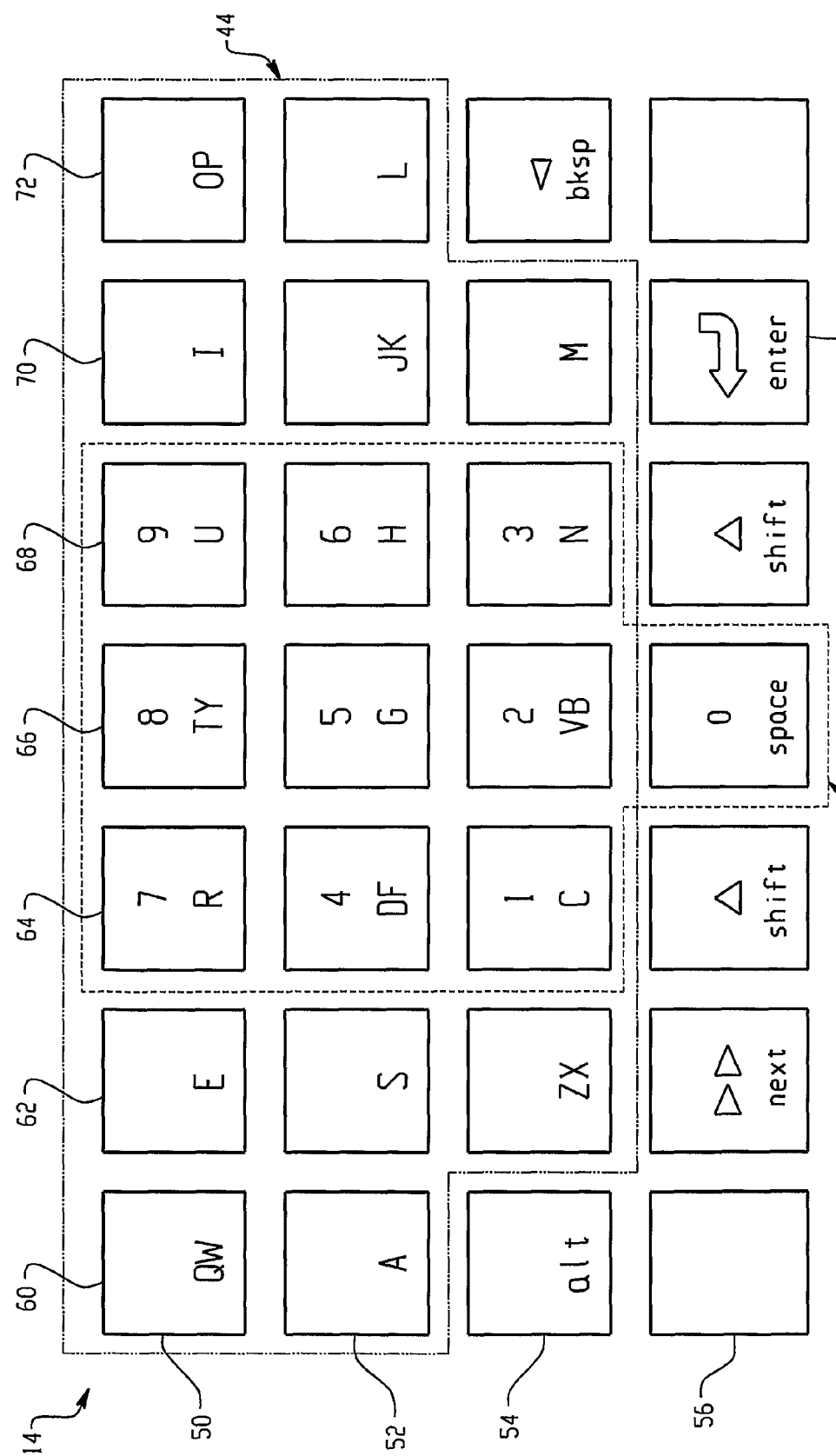
FIG. 50 is a further alternative example keyboard arrangement for a reduced key QWERTY/numeric keyboard.

In an alternative embodiment, shown in FIG. 50, the numeric key arrangement does not correspond to the ITU E.161 standard. In this alternative embodiment, the numbers are arranged as typically arranged on a standard typewriter keyboard that has a numeric keypad 46 spaced from the alphabetic characters, as shown in FIG. 5. The physical keyboard in FIG. 50 depicts a reduced alphabetic configuration 44 that has a numeric arrangement 46 overlaid on the alphabetic characters 44. As with the numeric phone key arrangement 42, each number 0-9 is positioned on a different key and the keys are symmetrical about a common center line, with the "0" being centered beneath the remainder of the number keys 1-9.

The keyboard 14 may further include symbols and functions that are typically utilized with keyboards. Example symbols include ".", ",", ";", """", "''", ":", "?", "/", ">", "<", "!", "@", "~", "$", "%", "^", "&", "(", ")", "_", "-", "+", "=", "[", "]", "{", "}", "|", and "\", among other known symbols. Example functions include "tab", "caps lock", "shift", "control", "alt", "return/enter", "backspace", "insert", "delete", "home", "end", "page up", "page down", "end", "escape", "pause", "break", "send", "end", "txt", "sym", and "scroll lock", among other known functions associated with text entry or telephony entry.

The keys on the physical keyboard 14 that are associated with numbers may be used in both text mode and in telephony (numeric) mode. The keyboard 14 may include a mode selection key, or other hardware or software for switching between text entry (the first user interface) and telephony entry (the second user interface). The telephony characters may be input when the mobile communication device 10 is in telephony or text-entry mode, and the text-entry characters may be input when the mobile communication device 10 is in text-entry mode. The functional keys may also be configured to operate in both the telephony mode and the text-entry mode, or, alternatively, one or more of the functional keys may be operable in only the telephony mode or the text-entry mode. In this manner, the keyboard 14 has at least two distinct ergonomic configurations depending upon the mode of the mobile communication device 10.

In a preferred embodiment, a toggle key is utilized for mode selection between the text-entry and telephony (numeric) modes. Sample toggle keys include the "alt" or "shift" key, where the user selects one of these keys to switch data input from text-entry to telephony mode, or vice versa.

Alternatively, software may be used to determine the mode of entry. If the user is utilizing the telephony application, the default data entry mode will be numbers. If the user is utilizing the text-entry application, such as when composing an email, the default data entry mode will be text. When in each of these modes, the user may switch modes manually by utilizing a toggle key. For example, to enter text in a telephony application, the user selects the "alt" key and then presses the desired alphanumeric key corresponding to the desired letter. Software could also be used to predict whether the user is in telephony or text-entry mode, based upon the keystrokes that are entered by the user.

By providing both a text-entry and a telephony mode, the keyboard design results in at least two distinct, but familiar user interfaces that the user has likely had experience using separately on two distinct devices. In each of the reduced format keyboards 14 discussed herein, the selection of a particular character, number, symbol, or function may be derived from predictive text software residing on the mobile communication device and/or from multiple switches associated with the keys, as discussed in greater detail below.

Figure 10:
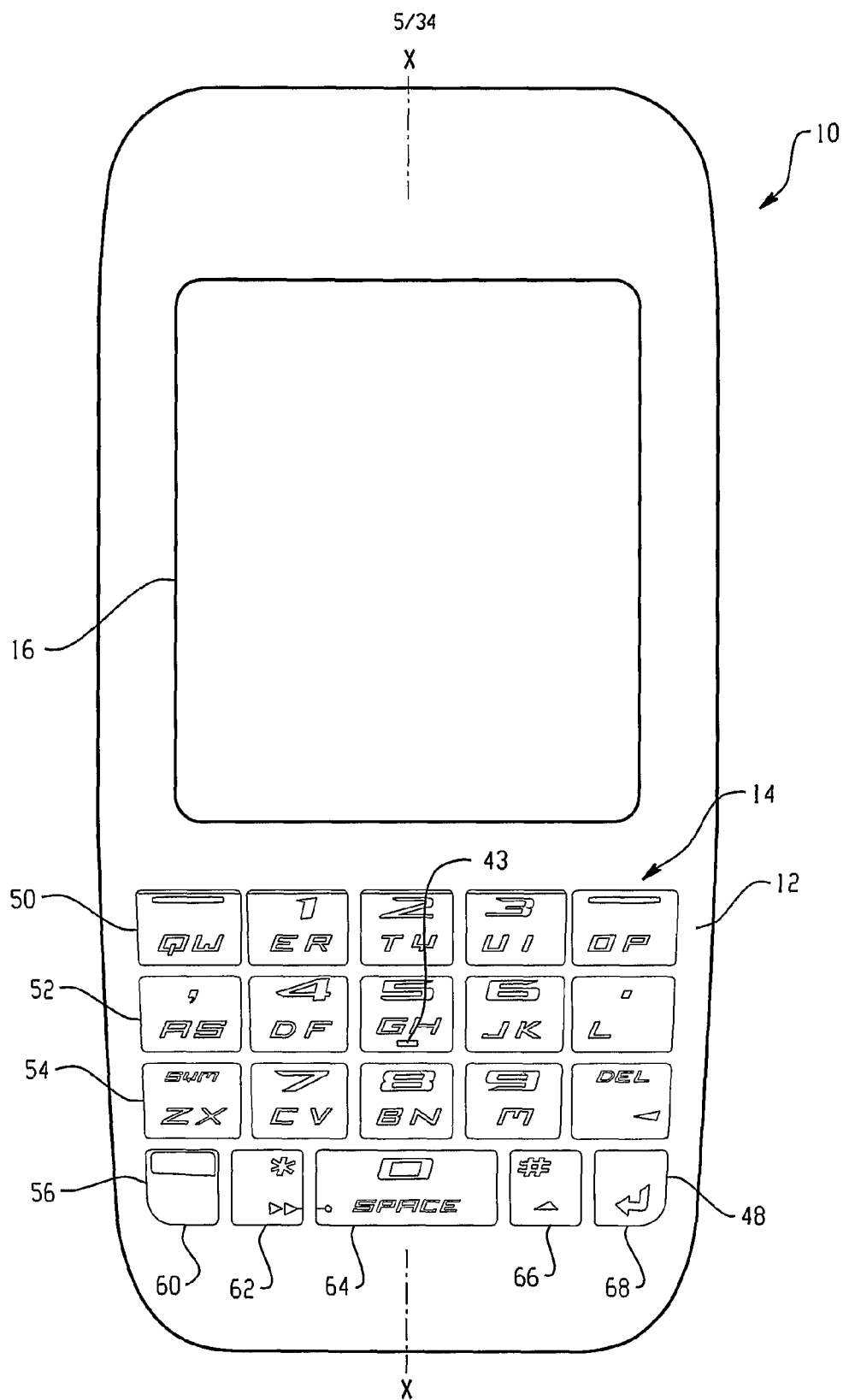
FIG. 10 is an elevated view of a handheld mobile communication device having an example keyboard incorporating a preferred keyboard arrangement.
Figure 11A:
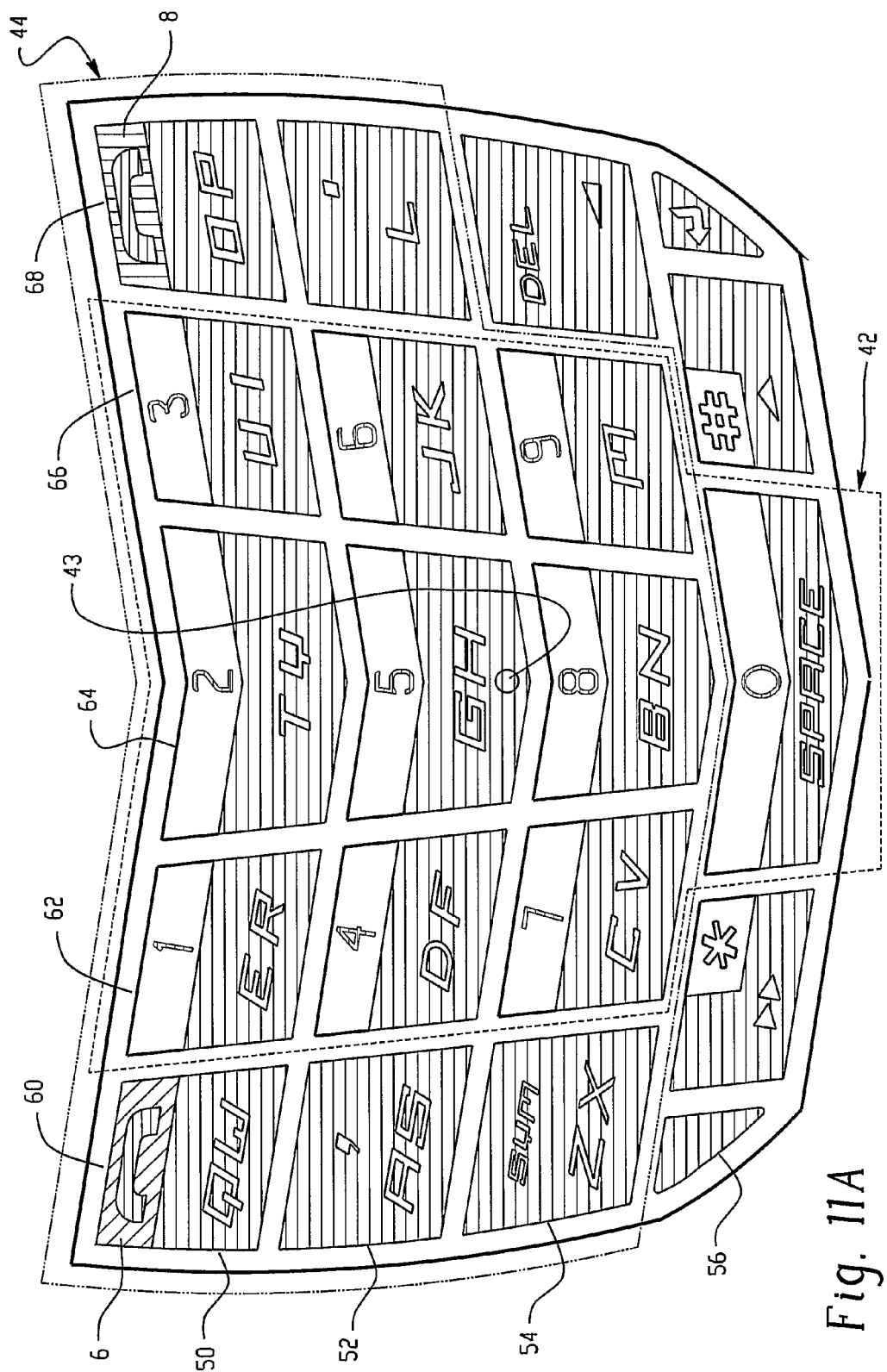
FIG. 11A is an exploded view of the keyboard of FIG. 11.

Referring again to the drawings, FIG. 10 shows a handheld mobile communication device 10 that has an example physical keyboard array of twenty keys, with five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 14. The four rows include a first row 50, a second row 52, a third row 54, and a fourth row 56. The five columns include a first column 60, a second column 62, a third column 64, a fourth column 66, and a fifth column 68. Each of the keys in the first row 50, second row 52, and third row 54 is uniformly sized while the keys in the fourth, bottom row 56 have different sizes relative to one another and to the keys in the first three rows 50, 52, 54. The rows and columns are straight, although the keys in the fourth row 56 do not align completely with the columns because of their differing sizes. The columns substantially align with the longitudinal axis x-x of the device 10. In another embodiment of this example keyboard array, such as that shown in FIGS. 11 and 20, the rows and/or columns need not be straight.

FIG. 11 shows a handheld mobile communication device 10 that has an example physical keyboard array of 20 keys, with five columns and four rows. An exploded view of the keyboard is presented in FIG. 1A. Fourteen keys on the keyboard 14 are associated with alphabetic characters and ten keys are associated with numbers. The four rows include a first row 50, a second row 52, a third row 54, and a fourth row 56. The five columns include a first column 60, a second column 62, a third column 64, a fourth column 66, and a fifth column 68. Many of the keys have different sizes than the other keys, and the rows are non-linear. In particular, the rows are V-shaped, with the middle key in the third column 64 representing the point of the V. The columns are generally straight, but the outer two columns 60, 62, 66, 68 angle inwardly toward the middle column 64. To readily identify the phone user interface (the second user interface), the numeric phone keys 0-9 include a color scheme that is different from that of the remaining keys associated with the QWERTY key arrangement. In this example, the color scheme of the numeric phone keys has a two tone appearance, with the upper portion of the numeric keys being a first color and the lower portion of the numeric keys being a second color. In the example, the upper portion of the keys is white with blue letters and the lower portion of the keys is blue with white letters. Most of the remaining keys associated with the QWERTY key arrangement are predominantly the second, blue color with white lettering. The first color may be lighter than the second color, or darker than the second color. In addition, the keyboard 14 includes a "send" key 6 and an "end" key 8. The "send" key 6 is positioned in the upper left corner of the keyboard 14 and the "end" key 8 is positioned in the upper right corner. The "send" key 6 and "end" key 8 may have different color schemes than the remainder of the keys in order to distinguish them from other keys. In addition, the "send" and "end" keys 6, 8 may have different colors from one another. In the example shown, the "send" key 6 is green and the "end" key 8 is red. Different colors may be utilized, if desired.

FIGS. 12-15 depict various views of the sides, end, and back of the mobile communication device 10. FIG. 12 depicts the headset jack 20 and USB port 22. FIG. 14 depicts a speaker port 24, external charging contacts 26, a speakerphone button 28, and a battery door release 30. FIG. 15 shows the power button 32.

FIGS. 16-19 depict the handheld device 10 of FIG. 11 installed in a belt clip assembly 34. FIG. 16 includes an extended area 36, which makes the belt clip more easily attached to and removed from a belt. FIG. 16 also shows an internal retainer 38 that locks the device 10 in place. FIG. 17 depicts a swivel belt clip 40. FIG. 18 depicts the headset jack 20 and USB port 22, which are accessible through the belt clip assembly 34 when holstered on a belt.

Figure 20:
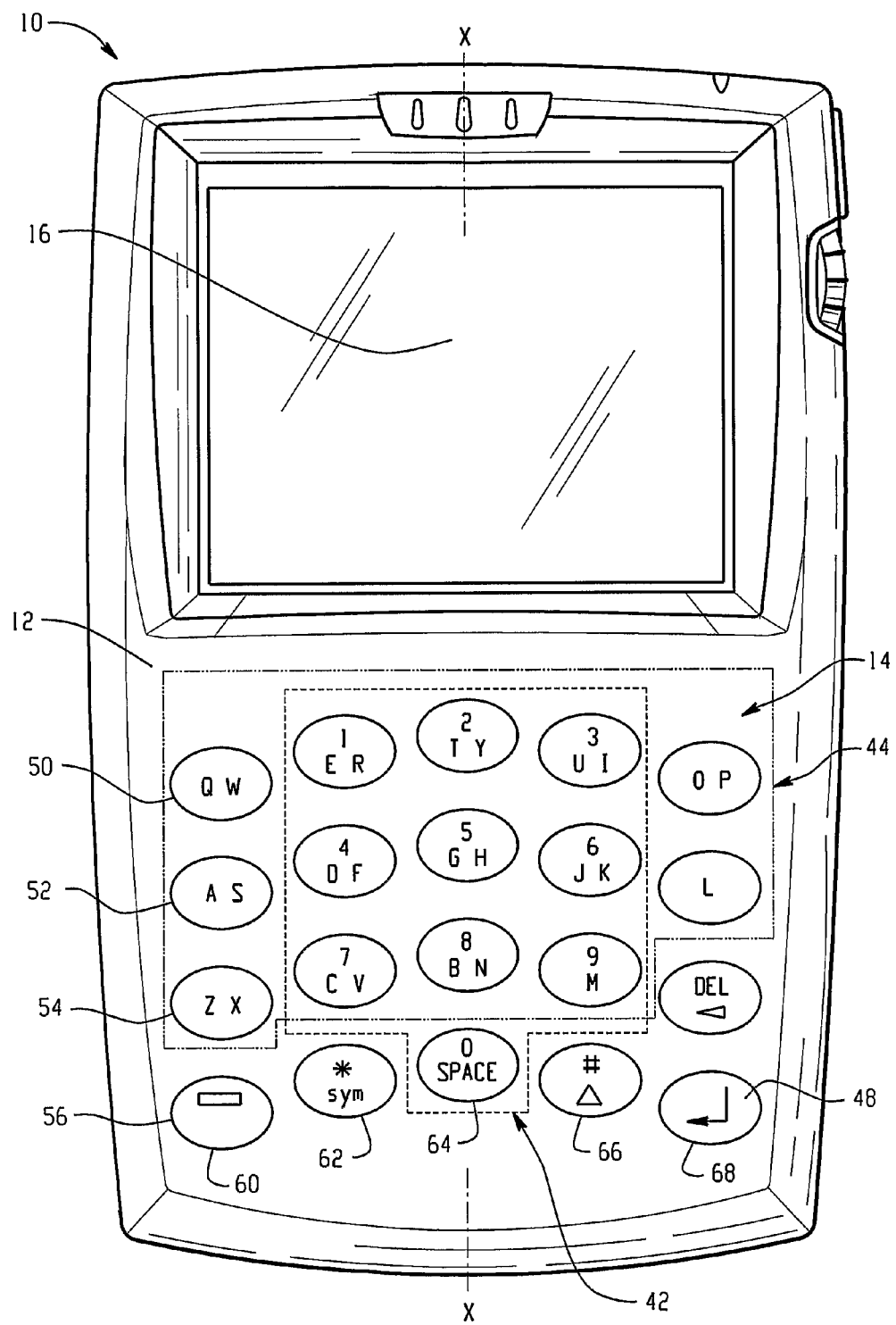
FIG. 20 is a front view of a handheld device incorporating an example keyboard arrangement.

FIG. 20 depicts a handheld mobile communication device 10 similar to FIG. 10, but with a different key arrangement. In this embodiment, a 20 key array is provided in five columns and four rows. Fourteen keys are associated with alphabetic characters 44 and ten keys are associated with numbers 42. The four rows include a first row 50, a second row 52, a third row 54, and a fourth row 56. The five columns include a first column 60, a second column 62, a third column 64, a fourth column 66, and a fifth column 68. The rows are arcuately shaped, with the upper most part of the arc being in the center column 64. Each of the columns is straight and substantially aligned with a longitudinal axis X-X of the device 10. The keys are oval shaped and multi-functional. The phone pad numbers 42 are overlaid on and associated with some of the same keys as keys that are associated with the alphabetic characters 44. Nine of the ten numbers share keys with alphabetic characters. In a preferred embodiment, the phone numbers 0-9 are centered on the alphabetic character key arrangement 44. The "space" bar coincides with the number "0" and is centered in the third column 64 of the fourth row 56.

FIGS. 21-27 depict various key configurations for the physical keyboard array shown in FIG. 20, which utilizes five columns and four rows to represent a reduced column QWERTY keyboard with an overlaid numeric phone key arrangement 42. The four rows include a first row 50, a second row 52, a third row 54, and a fourth row 56. The five columns include a first column 60, a second column 62, a third column 64, a fourth column 66, and a fifth column 68.

Figure 21:
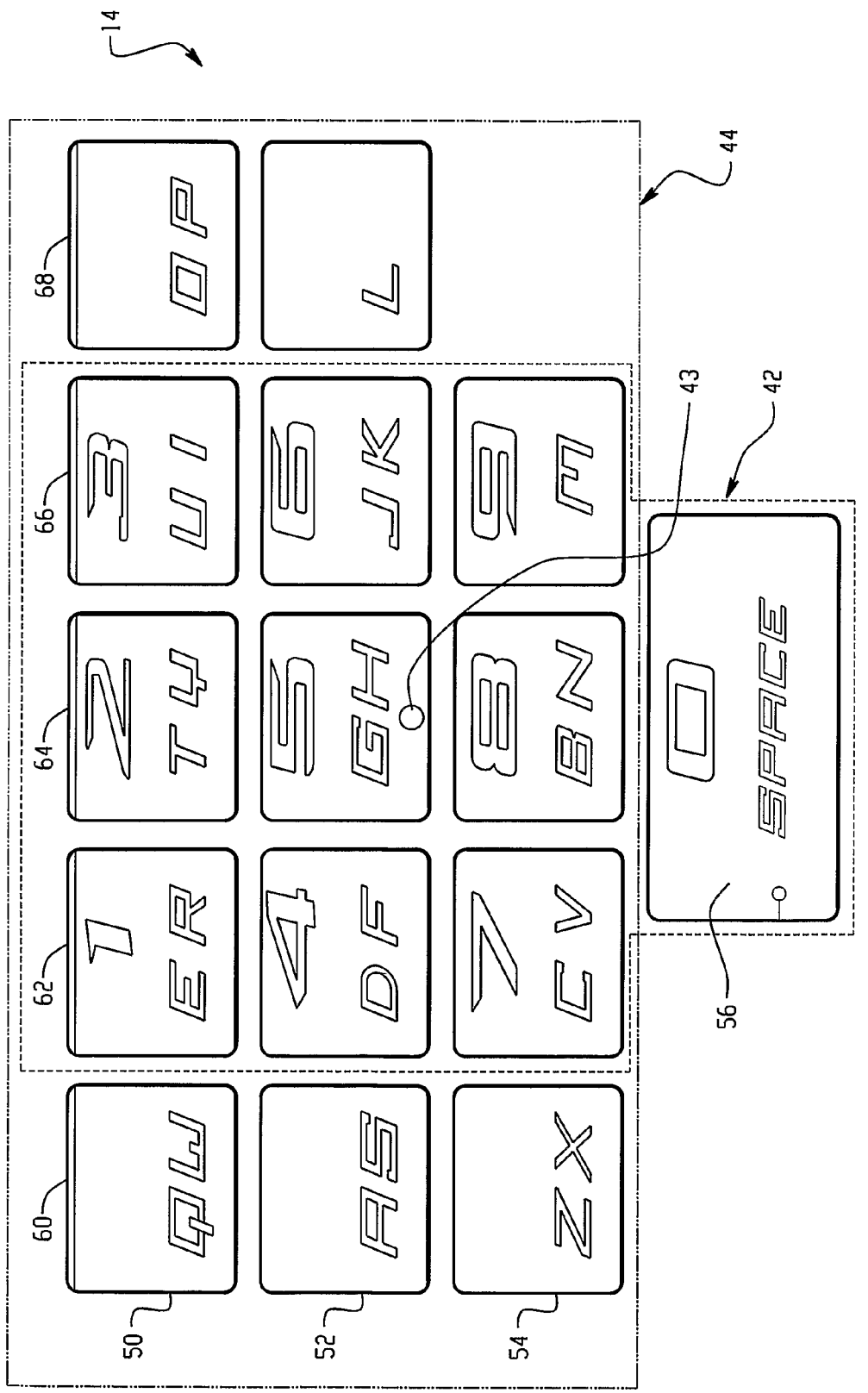
FIG. 21 is an example keyboard arrangement for a reduced QWERTY/numeric keyboard.

FIG. 21 depicts a user interface having a numeric phone key arrangement 42 combined with a QWERTY alphabetic configuration 44. The total number of keys is 15, with alphabetic characters being associated with 14 of the keys and numbers being associated with ten of the keys. In this particular embodiment, the numeric phone key arrangement 42 is centered across the second, third, and fourth columns 62, 64, 66. Nine of the keys share alphabetic and numeric input. For example, the "ER/1" key may be used to input the letters "E" or "R", or the number "1". Additional navigational (i.e., backspace, return/enter, exit), symbolic, and functional (i.e., alt, control) keys may be added to the keyboard 14, as illustrated in FIG. 22.

Indicia is positioned on each key to indicate which alphabetic characters, numbers, symbols and functions are associated with each key. In order to differentiate the alphabetic characters and numbers from one another, the font size of the numerical indicia on the keys shown in FIG. 21 is larger than the font size of the alphabetic character indicia. In an alternate embodiment, the font types may be different between the numeric and alphabetic indicia. Other embodiments may utilize different font size and different font type to further differentiate between alphabetic and numeric indicia. A further method for differentiating between numeric and alphabetic indicia is to use different colors for the indicia. For example, the numeric indicia may have a first color, the alphabetic indicia may have a second color, and the remaining non-alphabetic or numeric keys may have a third color, such as shown in FIG. 22. Alternatively, as previously discussed in connection with FIG. 11A, the background color of the keys themselves may be different in order to differentiate between the types of keys. Different textures and/or surface treatments may also be used, among other differentiating indicia.

Figure 22:
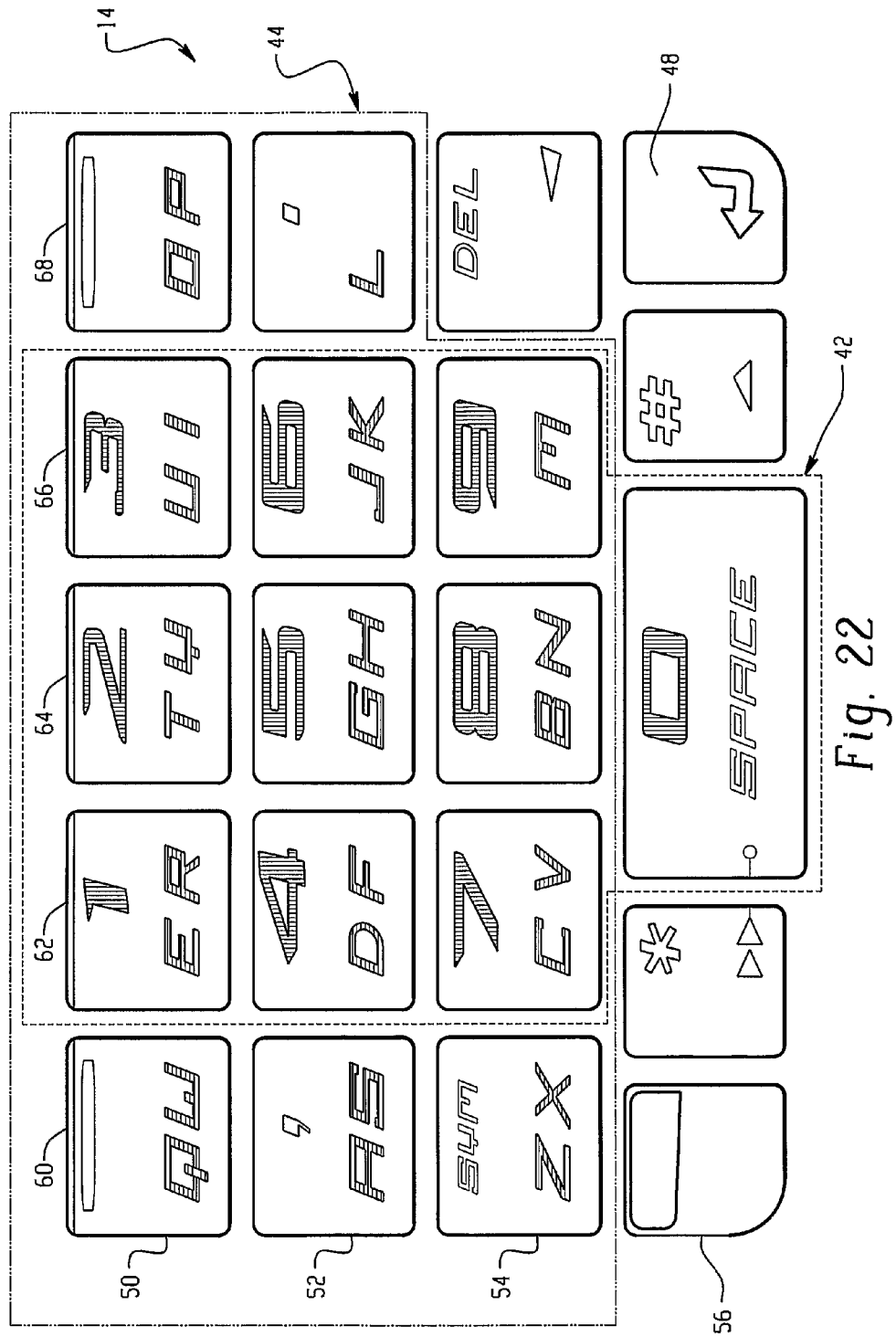
FIG. 22 is another example keyboard arrangement for a reduced key QWERTY/numeric keyboard.

FIG. 22 depicts a twenty key physical keyboard 14 where the numeric phone key arrangement 42 is centered between the five columns. The first row 50 of keys includes in order the following key combinations for the text entry and telephony mode: "QW", "EFR/1", "TY/2", "UI/3", and "OP". The second row 52 includes the following key combinations in order: "AS/,", "DF/4", "GH/5", "JK/6", and "L/.". The third row 54 includes the following key combinations in order: "ZX/sym", "CV/7", "BN/8", "M/9" and "backspace/delete." The "sym" function key pulls up a list of symbols that the user may input. The fourth row 56 includes the following key combinations in order: "alt", "next/*", "space/0", "shift/#", and "return/enter". The keys in the top three rows 50, 52, 54 are of uniform size while the keys in the fourth row 56 have a size that is different from the keys in the top three rows. In particular, the center "space" key 84 is larger than the other four keys in the row, with the other four keys having a similar size. The outermost keys in the fourth row 56 also have a more rounded shape, for aesthetic and other reasons. Each of the rows is straight and each of the columns is straight, with the keys in the fourth row 56 being misaligned with the five columns due to their different sizes. The "0" of the numeric phone key arrangement 42 coincides with the "space" bar. In another embodiment of the fourth row 56, the center "space" key contains multiple functions, symbols, characters or numbers, such as the key combination "next/*", "space/0", "shift/#", or some combination thereof. The selection of a particular function, character, symbol or number may be derived from predictive text software residing on the mobile communication device and/or multiple switches associated with the "space" key.

Figure 23:
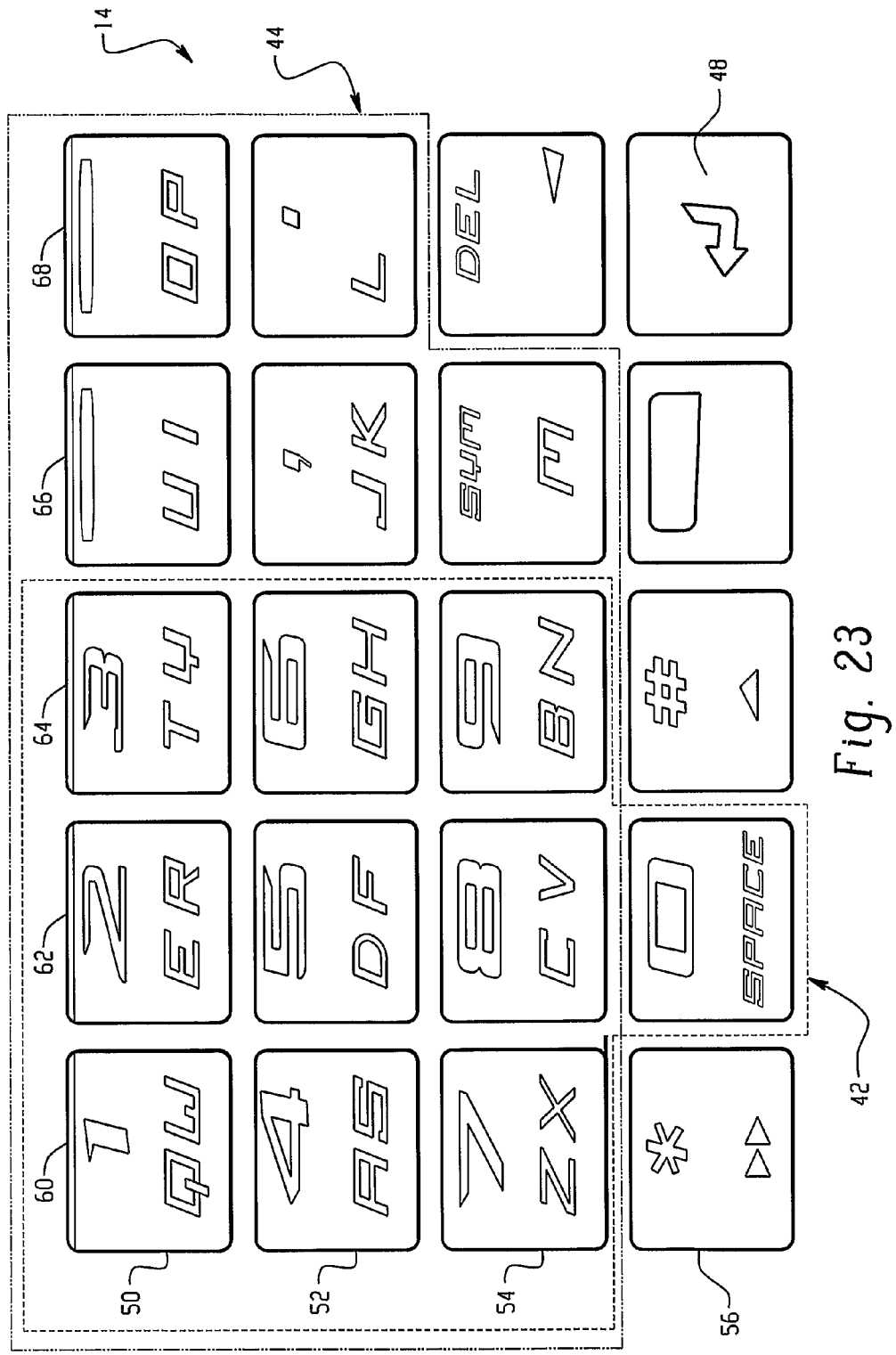
FIG. 23 is an alternative example keyboard arrangement for a reduced key QWERTY/numeric keyboard.

FIG. 23 shows a similar format for the reduced QWERTY arrangement of alphabetic characters 44 as presented in FIG. 22, but the numeric phone key arrangement 42 is positioned in the first 60, second 62, and third 64 columns instead of being centered on the keyboard 14. The first row 50 of keys includes in order the following key combinations for the text entry and telephony mode: "QW/1", "ER/2", "TY/3", "UI", and "OP". The second row 52 includes the following key combinations in order: "AS/4", "DF/5", "GH/6", "JK/,", and "L/.". The third row 54 includes the following key combinations in order: "ZX/7", "CV/8", "BN/9", "M/sym" and "backspace/delete". The fourth row 56 includes the following key combinations in order: "next/*", "space/0", "shift/#", "alt" and "return/enter". The keys in each of the rows is of uniform size and the rows and columns are straight.

Figure 24:
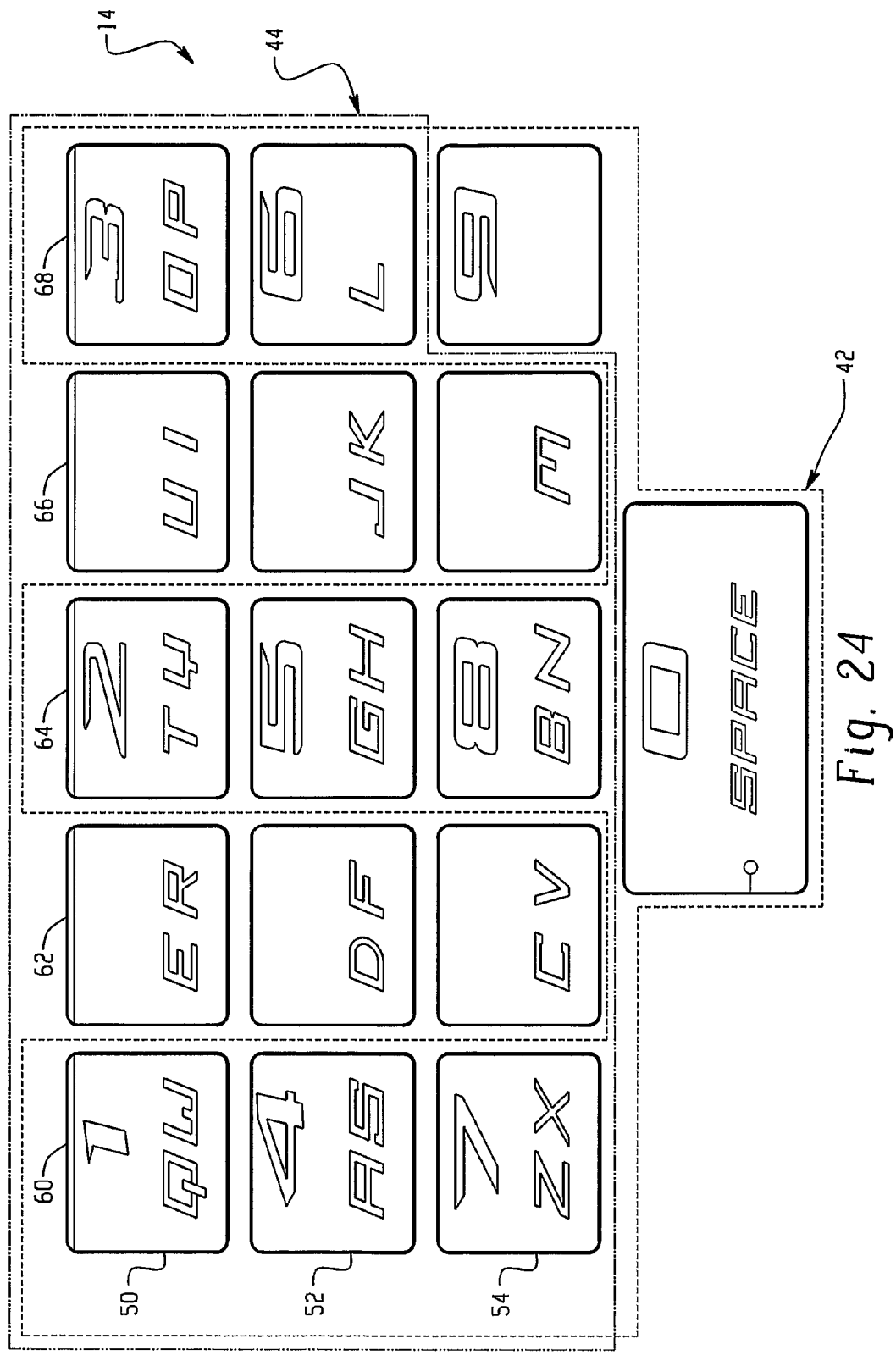
FIG. 24 is yet another example keyboard arrangement for a reduced key QWERTY/numeric keyboard.

FIG. 24 illustrates a combined QWERTY alphabetic arrangement 44 and a numeric phone key pad arrangement 42 where the keys associated with the numeric input are spaced across the physical keyboard 14. As shown, numbers are associated with the first, third, and fifth columns 60, 64, 68 and are spaced from each other by one column width. In particular, the numeric "1" indicia is positioned on the "QW" key, the "2" indicia is positioned on the "TY" key, and the "3" indicia is positioned on the "OP" key. Other embodiments of the layout include having the numeric and alphabetic indicia represented by alternate key configurations. For example, one alternate configuration includes the "1" indicia overlaid on the "OP" key, the "2" indicia on the "UI" key, and the "3" indicia on the "TY" key. In all cases, the "0" key is centered beneath the remainder of the numeric 1-9 keys.

Figure 25:
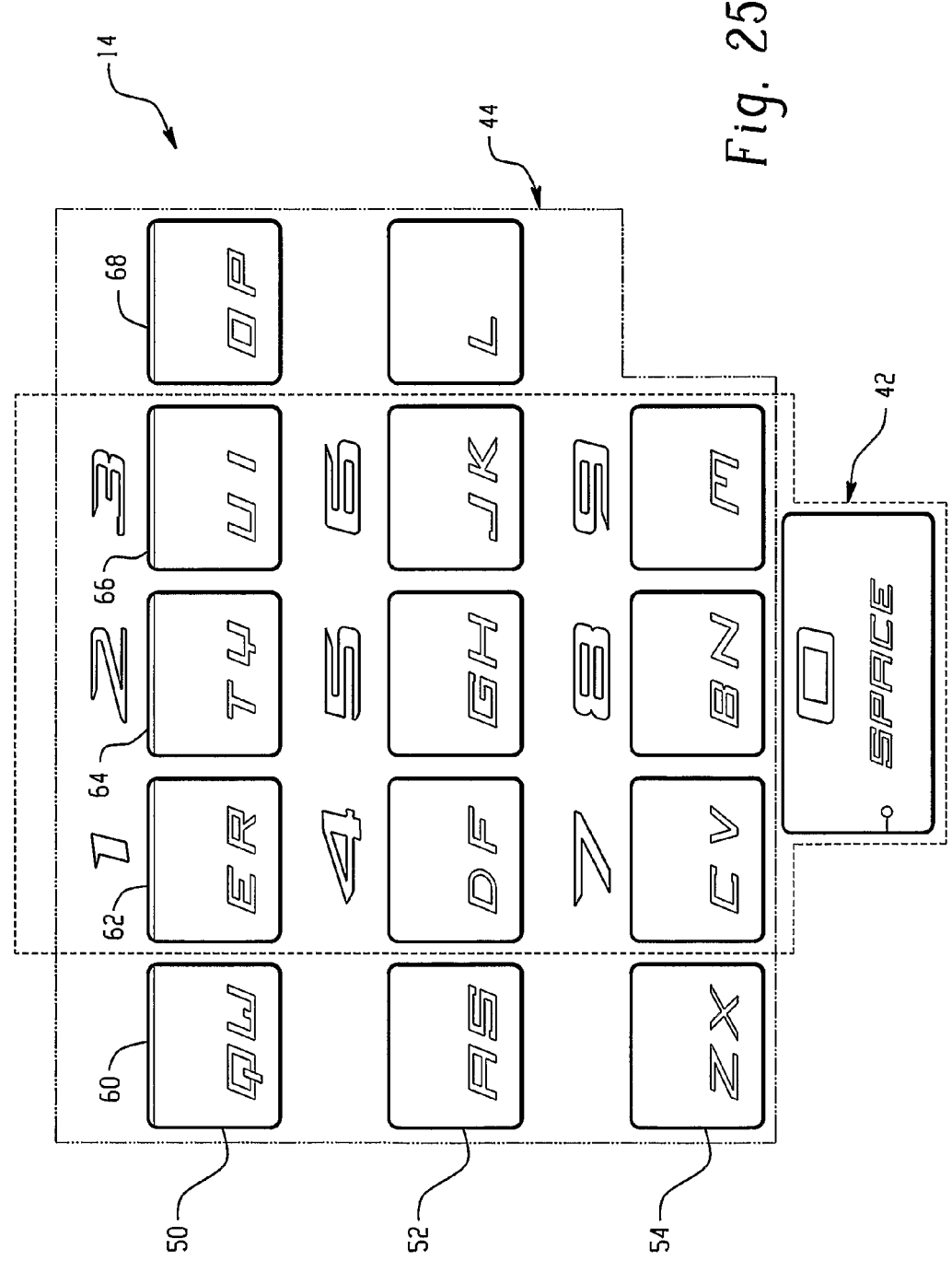
FIG. 25 is a further example keyboard arrangement for a reduced key QWERTY/numeric keyboard.

FIG. 25 illustrates another embodiment of a combined reduced QWERTY alphabetic arrangement 44 and a numeric phone keypad arrangement 42, where the indicia for the numeric arrangement is positioned on the surface of the housing, not on the keys. In this embodiment, the numeric "1" indicia is positioned directly above the "ER" key on the second column 62, first row 50; the numeric "2" indicia is located above the "TY" key on the third column 64, first row 50; and numeric "3" indicia is located above the "UI" key on the fourth column 66, first row 50. Furthermore, the numeric "4" indicia is located between the "DF" key on the second column 62, second row 52 and the "ER" key, and the numeric "7" indicia is located between the "DF" key and the "CV" key on the second column 62, third row 54.

Figure 26:
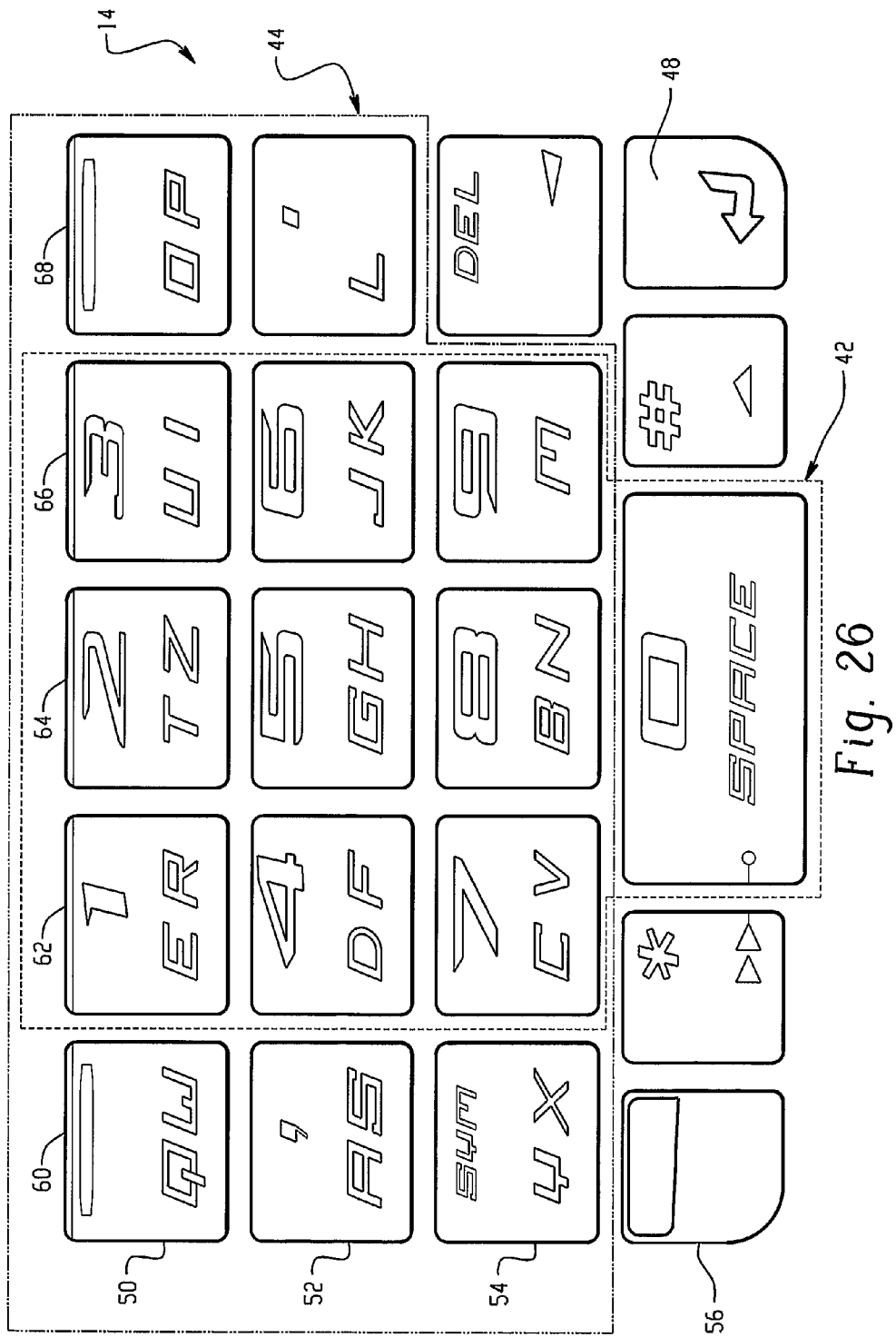
FIG. 26 is an example keyboard arrangement for a reduced key QWERTZ/numeric keyboard.
Figure 27:
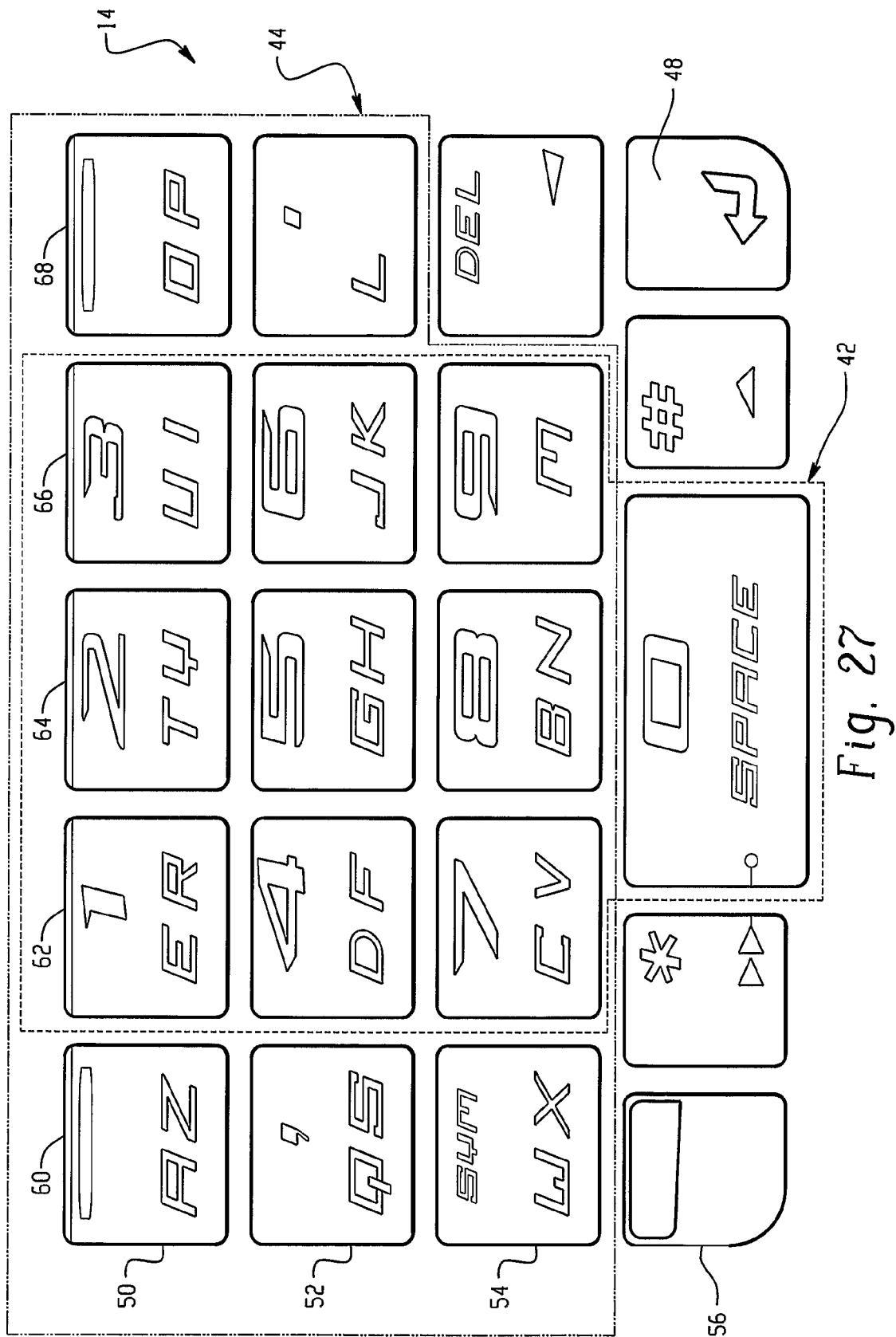
FIG. 27 is an example keyboard arrangement for a reduced key AZERTY/numeric keyboard.

FIG. 26 shows another key arrangement similar to that shown in FIG. 22, but for a reduced QWERTZ keyboard arrangement. FIG. 27 shows a key arrangement similar to that shown in FIG. 22, but for a reduced AZERTY keyboard arrangement. In each of the embodiments described above, the return/enter key 48 is positioned in the vicinity of the right, bottom corner of the keyboard 14. In a preferred embodiment, the return/enter key 48 is positioned in the fifth column 68 or in the fourth row 56.

Figure 28:
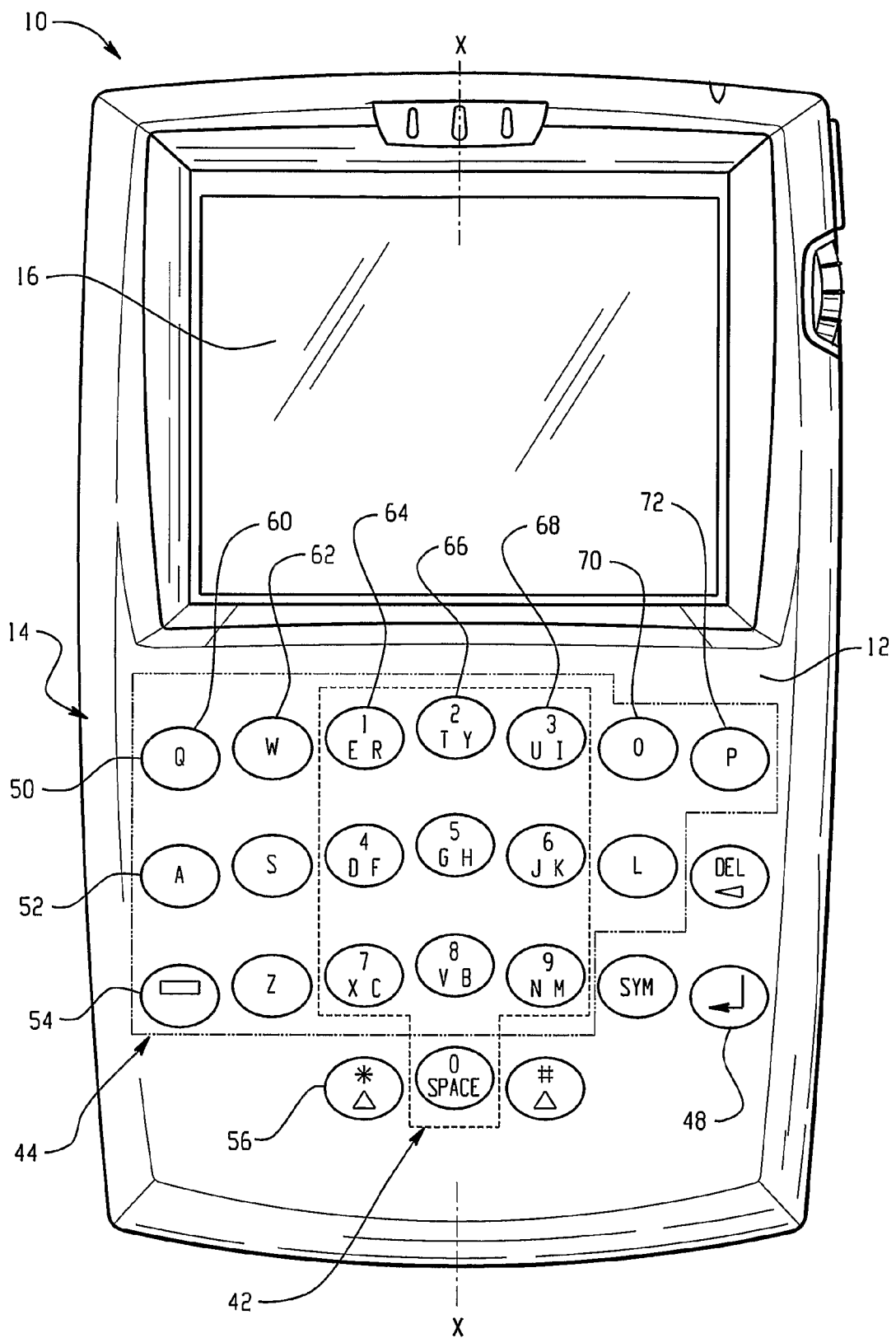
FIG. 28 is a front view of a handheld mobile communication device incorporating another example keyboard arrangement for a reduced key QWERTY/numeric keyboard.

FIG. 28 illustrates a handheld device 10 similar to that shown in FIG. 20, but with a seven column by four row reduced key arrangement. The four rows include a first row 50, a second row 52, a third row 54, and a fourth row 56. The seven columns include a first column 60, a second column 62, a third column 64, a fourth column 66, a fifth column 68, a sixth column 70, and a seventh column 72. The first, uppermost row 50 includes seven keys. The second row 52 includes seven keys and the third row 54 includes seven keys. The fourth, lowermost row 56 includes only three keys, which are shown aligned with the third 64, fourth 66, and fifth 68 columns. Alphabetic characters are associated with 17 of the total 24 keys. Numbers are associated with ten keys, nine of which share an association with alphabetic characters. The alphabetic characters are associated with keys in the first, second, and third rows and numbers are associated with keys in each of the four rows. The columns are generally straight and the rows are arcuate, with the arc being centered in the fourth column 66. Each of the columns is straight and aligned with a longitudinal axis X-X of the device 10. The keys are oval shaped and multi-functional.

Figure 29:
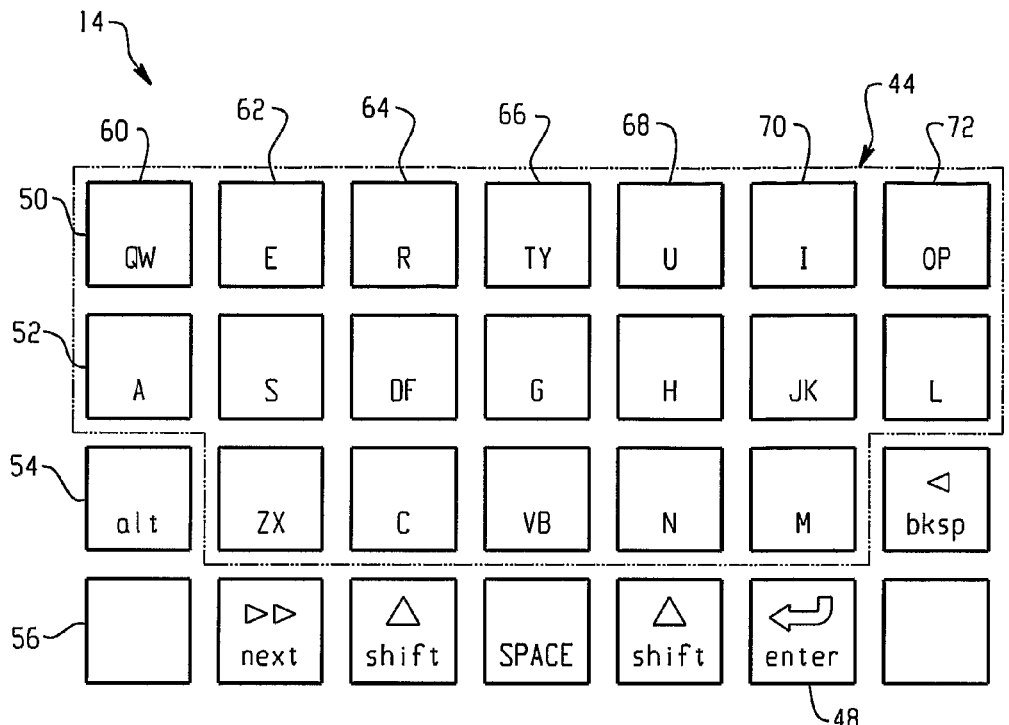
FIG. 29 is an example keyboard arrangement for a reduced key QWERTY keyboard.

FIG. 29 shows a physical keyboard 14 arrangement similar to that shown in FIG. 28, but with rectangular shaped keys and columns and rows that are straight. In particular, the keyboard 14 arrangement of FIG. 29 includes four rows and seven columns. The four rows include a first row 50, a second row 52, a third row 54, and a fourth row 56. The seven columns include a first column 60, a second column 62, a third column 64, a fourth column 66, a fifth column 68, a sixth column 70, and a seventh column 72. Alphabetic characters 44 are associated with 19 of the total 28 keys. FIG. 29 does not depict a telephony key mode, but could include a telephony mode if desired, as shown in FIGS. 33-37. The first row 50 of keys includes in order the following key combinations for the text entry mode: "QW", "E", "R", "TY", "U", "I", and "OP". The second row 52 includes the following key combinations in order: "A", "S", "DF", "G", "H", "JK", and "L". The third row 54 includes the following key combinations in order: "alt", "ZX", "C", "VB", "N", "M" and "backspace/delete". The fourth row 56 includes the following key combinations in order: "next", "shift", "space", "shift", and "return/enter". The keys in each of the rows are of uniform size and the rows and columns are straight. The first and last keys of the fourth row 56 are shown as being blank, but may be installed with any type of function or symbol key, among other types of keys. Alternatively, these keys may not be present in the keyboard 14.

Figure 30:
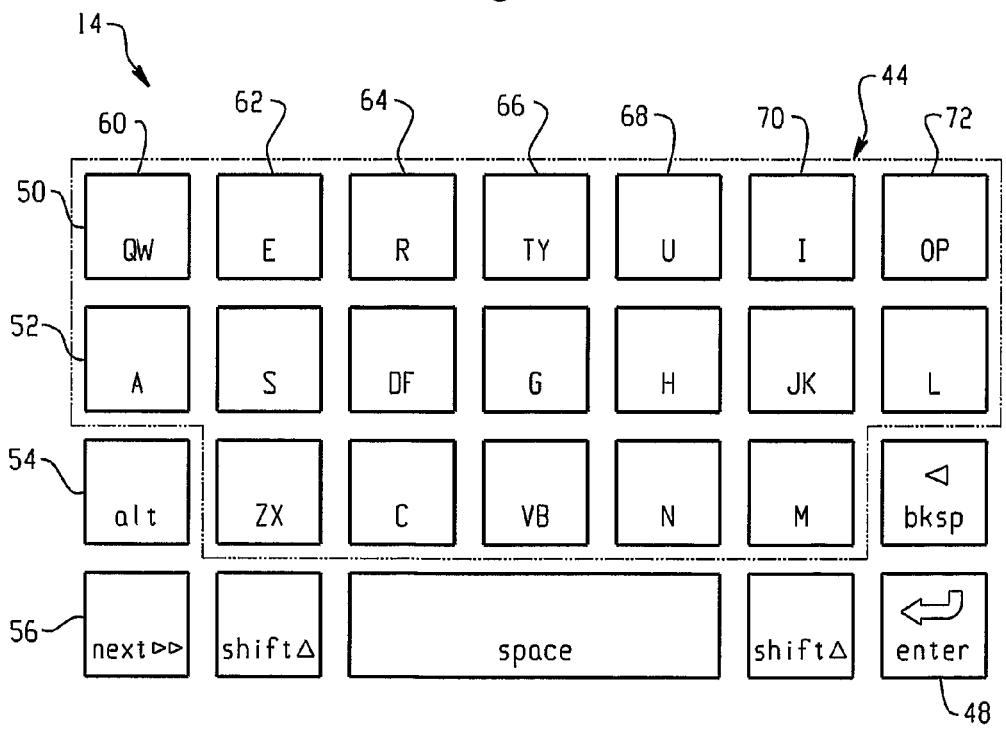
FIG. 30 is another example keyboard arrangement for a reduced key QWERTY keyboard.

FIG. 30 shows a physical keyboard 14 arrangement similar to that shown in FIG. 29, but with only five keys in the fourth row 56. In particular, the keyboard 14 arrangement of FIG. 30 includes four rows and seven columns, but with the fourth row 56 only including five keys. The four rows include a first row 50, a second row 52, a third row 54, and a fourth row 56. The seven columns include a first column 60, a second column 62, a third column 64, a fourth column 66, a fifth column 68, a sixth column 70, and a seventh column 72. Alphabetic characters 44 are associated with 19 of the total 28 keys. FIG. 30 does not depict a telephony key mode, but could include a telephony mode if desired, as shown in FIGS. 33-37. The first row 50 of keys includes in order the following key combinations for the text entry mode: "QW", "E", "R", "TY", "U", "I", and "OP". The second row 52 includes the following key combinations in order: "A", "S", "DF", "G", "H", "JK", and "L". The third row 54 includes the following key combinations in order: "alt", "ZX", "C", "VB", "N", "M" and "backspace/delete". The fourth row 56 includes the following key combinations in order: "next", "shift", "space", "shift", and "return/enter". The keys in each of the rows are of uniform size, other than the keys in the fourth row 56, which have a size that is different from the keys in the first through third rows 50, 52, 54. In particular, the "space" key is larger than other keys on the keyboard 14. The rows and columns are straight, although the keys in the fourth row 56 are misaligned with the seven columns. The keys in the fourth row 56, although fewer than seven, span the entire width of all seven columns.

Figure 31:
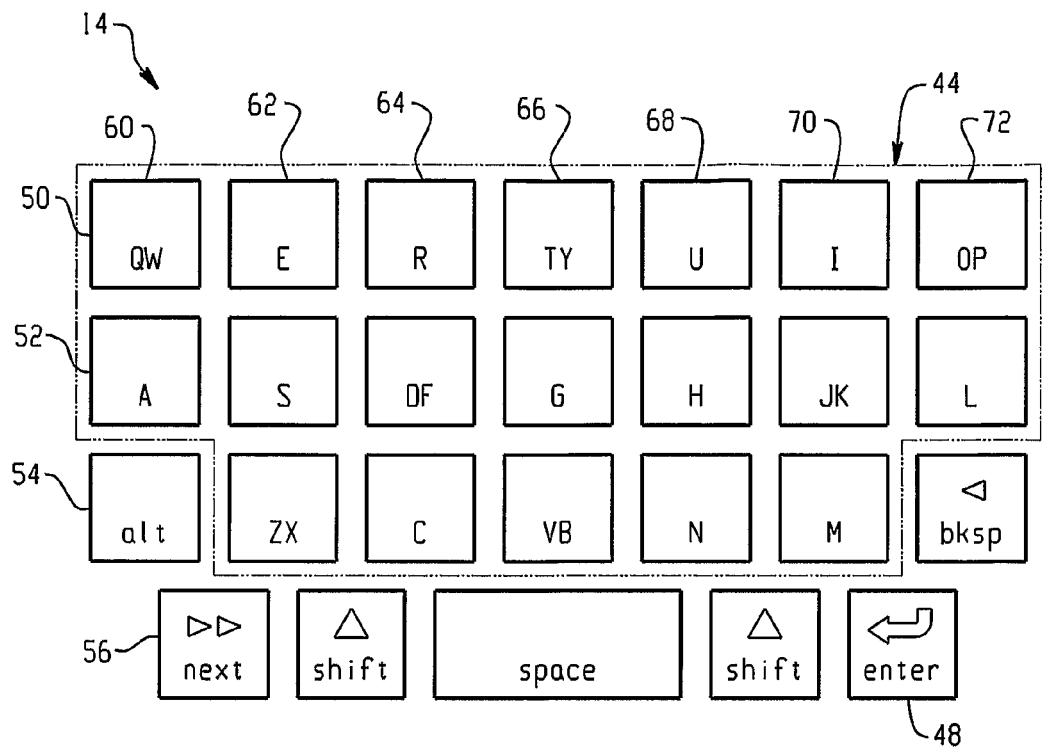
FIG. 31 is yet another example keyboard arrangement for a reduced key QWERTY keyboard.
Figure 32:
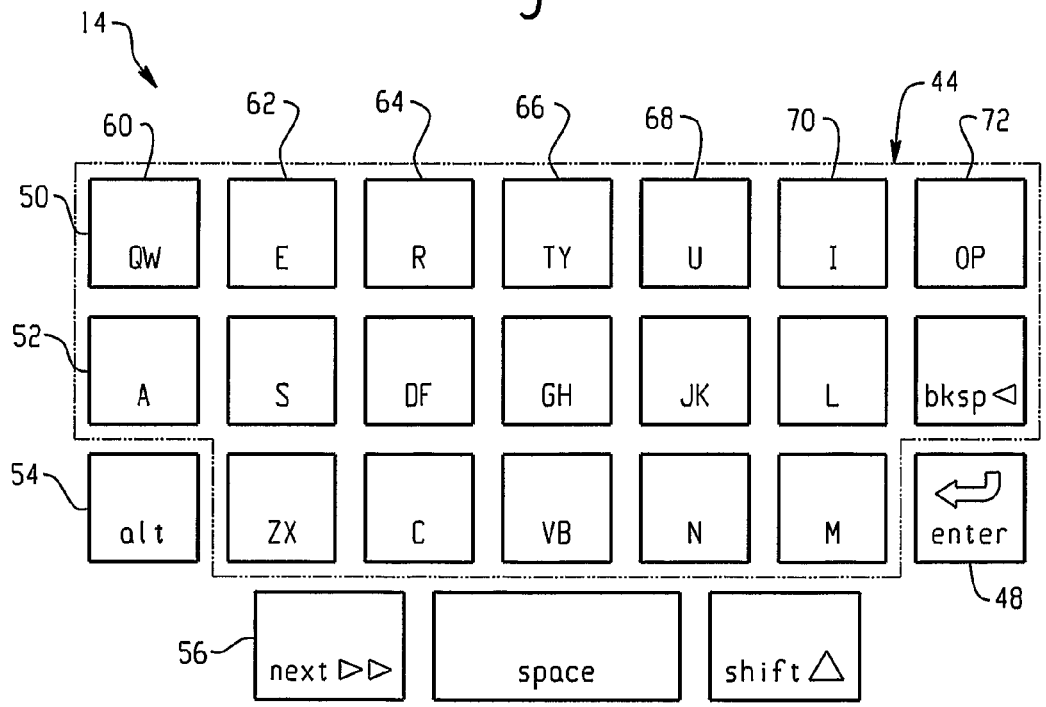
FIG. 32 is a further example keyboard arrangement for a reduced key QWERTY keyboard.

FIG. 31 shows a physical keyboard 14 arrangement similar to that shown in FIG. 30, but with the keys in the fourth row 56 having a combined width that is less than the width of the seven columns of keys. FIG. 32 shows a keyboard 14 arrangement similar to that shown in FIG. 30, but with a fourth row 56 that includes only three keys and with the fourth row 56 having a width that does not span the entire width of the seven columns of keys. The fourth row 56 in FIG. 32 includes the following key combinations: "next", "space", and "shift."

Figure 33:
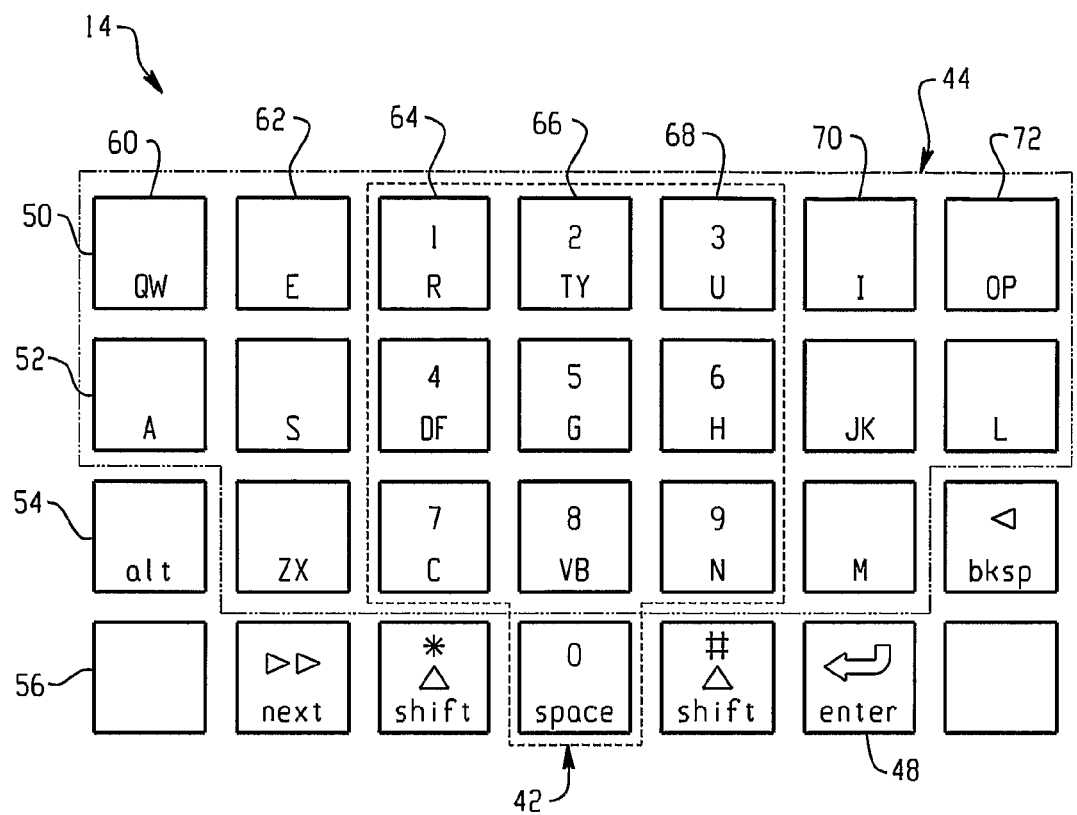
FIG. 33 is an example keyboard arrangement for a reduced key QWERTY/numeric keyboard.

FIG. 33 shows a physical keyboard 14 arrangement similar to that shown in FIG. 29, but with a numeric phone key arrangement 42 overlaid on the reduced QWERTY alphabetic arrangement 44 of keys. The indicia for the keys is positioned directly on the keys. The four rows include a first row 50, a second row 52, a third row 54, and a fourth row 56. The seven columns include a first column 60, a second column 62, a third column 64, a fourth column 66, a fifth column 68, a sixth column 70, and a seventh column 72. In this embodiment, the numeric phone key arrangement 42 is centered on the keypad in the third 64, fourth 66, and fifth 68 columns. Alphabetic characters 44 are associated with 19 of the total 28 keys. Numbers are associated with ten of the keys, some of which share an association with alphabetic characters. The first row 50 of keys includes in order the following key combinations for the text entry and telephony mode: "QW", "E", "R/1", "TY/2", "U/3", "I", and "OP". The second row 52 includes the following key combinations in order: "A", "S", "DF/4", "G/5", "H/6", "JK", and "L". The third row 54 includes the following key combinations in order: "alt", "ZX", "C/7", "VB/8", "N/9", "M" and "backspace/delete". The fourth row 56 includes the following key combinations in order: "next", "shift/*", "space/0", "shift/#", and "return/enter". The keys in each of the rows are of uniform size and the rows and columns are straight. The first and last keys of the fourth row 56 are shown as being blank, but may be installed with any type of function or symbol key, among other types of keys.

Figure 34:
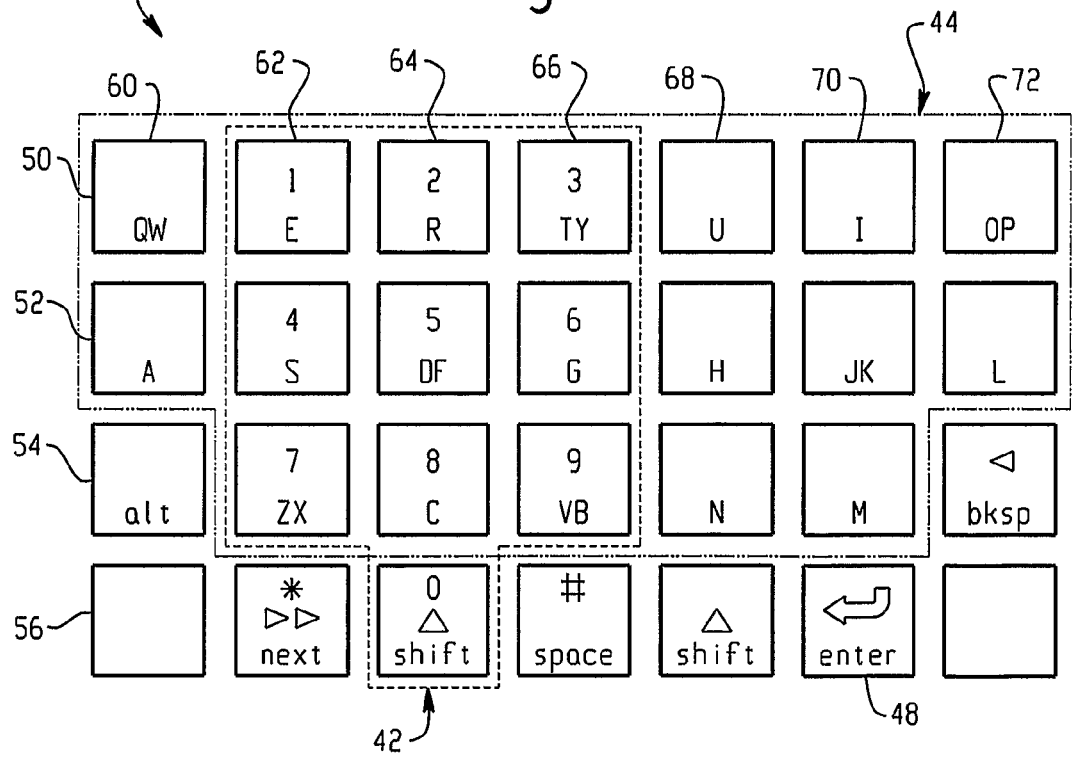
FIG. 34 is another example keyboard arrangement for a reduced key QWERTY/numeric keyboard.

FIG. 34 shows a physical keyboard 14 arrangement similar to that shown in FIG. 33, but with a numeric phone key arrangement 42 positioned in the second 62, third 64 and fourth 66 columns. The first row 50 of keys includes in order the following key combinations for the text entry and telephony mode: "QW", "E/1", "R/2", "TY/3", "U", "I", and "OP". The second row 52 includes the following key combinations in order: "A", "S/4", "DF/5", "G/6", "H", "JK", and "L". The third row 54 includes the following key combinations in order: "alt", "ZX/7", "C/8", "VB/9", "N", "M" and "backspace/delete". The fourth row 56 includes the following key combinations in order: "next/*", "shift/0", "space/#", "shift", and "return/enter". The keys in each of the rows are of uniform size and the rows and columns are straight. The first and last keys of the fourth row 56 are shown as being blank, but may be installed with any type of function or symbol key, among other types of keys.

Figure 35:
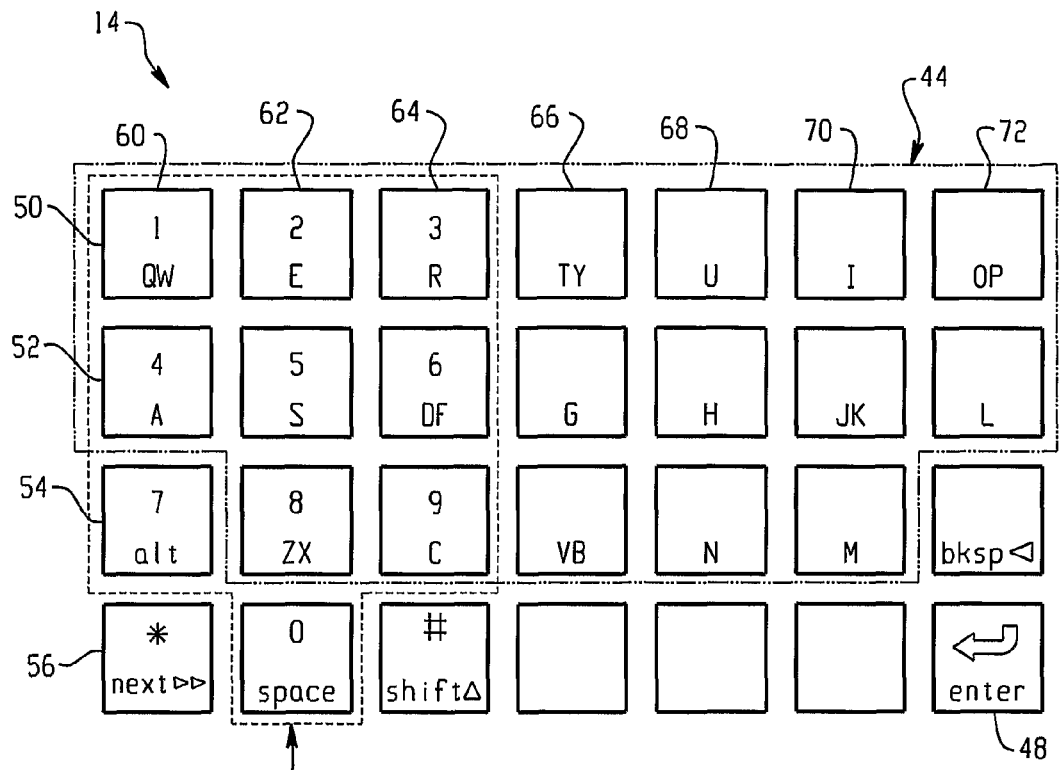
FIG. 35 is a further example keyboard arrangement for a reduced key QWERTY/numeric keyboard.

FIG. 35 shows a physical keyboard 14 arrangement similar to that shown in FIG. 33, but with a numeric phone key arrangement 42 positioned in the first 60, second 62, and third 64 columns. The first row 50 of keys includes in order the following key combinations for the text entry and telephony mode: "QW/1", "E/2", "R/3", "TY", "U", "I", and "OP". The second row 52 includes the following key combinations in order: "A/4", "S/5", "DF/6", "G", "H", "JK", and "L". The third row 54 includes the following key combinations in order: "alt/7", "ZX/8", "C/9", "VB", "N", "M" and "backspace/delete". The fourth row 56 includes the following key combinations in order: "next/*", "space/0", "shift/#", and "return/enter". The keys in each of the rows are of uniform size and the rows and columns are straight. The keys in the fourth 66, fifth 68, and sixth 70 columns of the fourth row 56 are shown as being blank, but may be installed with any type of function or symbol key, among other types of keys. While a numeric phone key arrangement 42 is preferred to be centered on the keyboard 14, it may be positioned in any of the columns of the keyboard 14.

Figure 36:
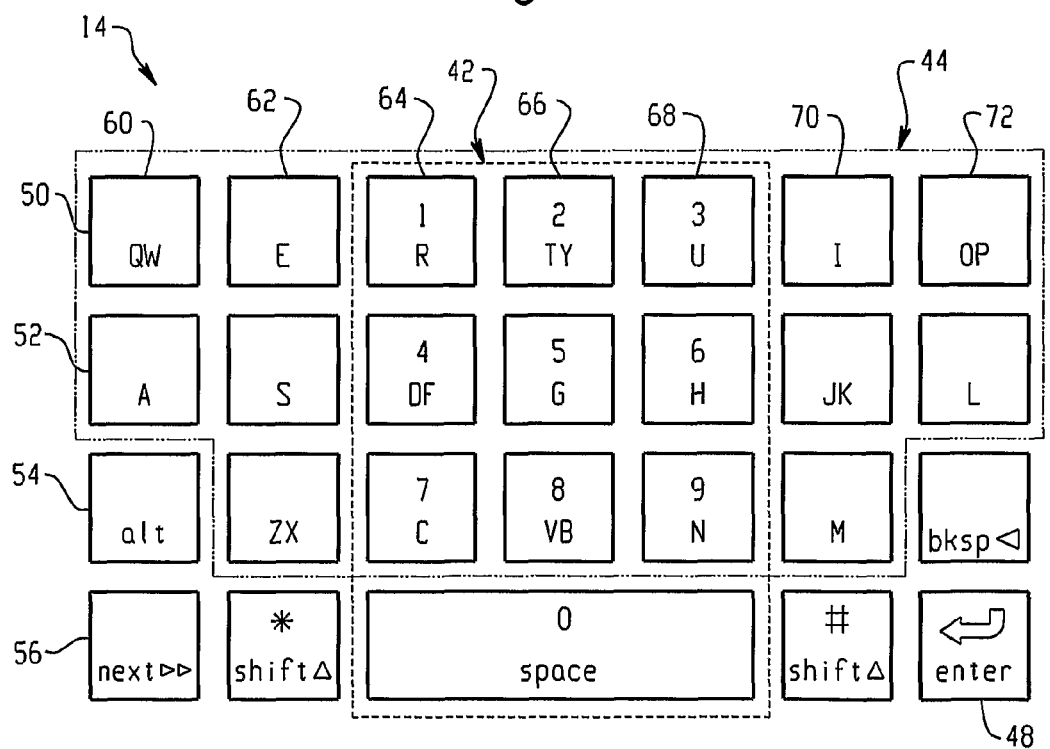
FIG. 36 is another example keyboard arrangement for a reduced key QWERTY/numeric keyboard.

FIG. 36 shows a physical keyboard 14 arrangement similar to that shown in FIG. 33, but with the fourth row 56 having only five keys. The "space" bar is oversized compared to the other keys and includes the number "0". In addition, the "space" bar is centered on the keyboard 14 and beneath the remainder of the numeric phone key arrangement 42. The rows and columns are straight, although the keys in the fourth row 56 are misaligned with the seven columns. The keys in the fourth row 56, although fewer than seven, span the entire width of all seven columns.

Figure 37:
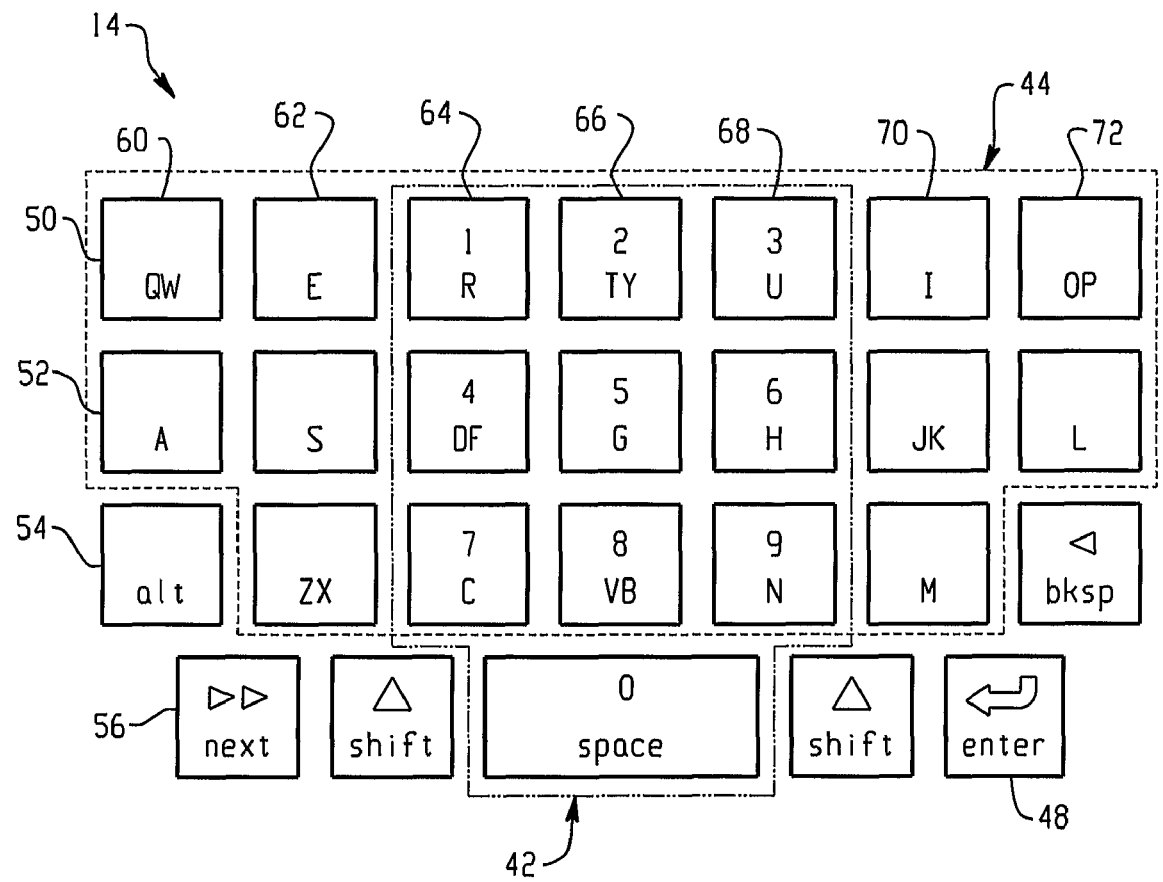
FIG. 37 is yet another example keyboard arrangement for a reduced key QWERTY/numeric keyboard.

FIG. 37 is similar to FIG. 36, except the keys in the fourth row 56 do not span the entire width of the seven columns. Other key arrangements may also be utilized, without limitation.

Figure 38:
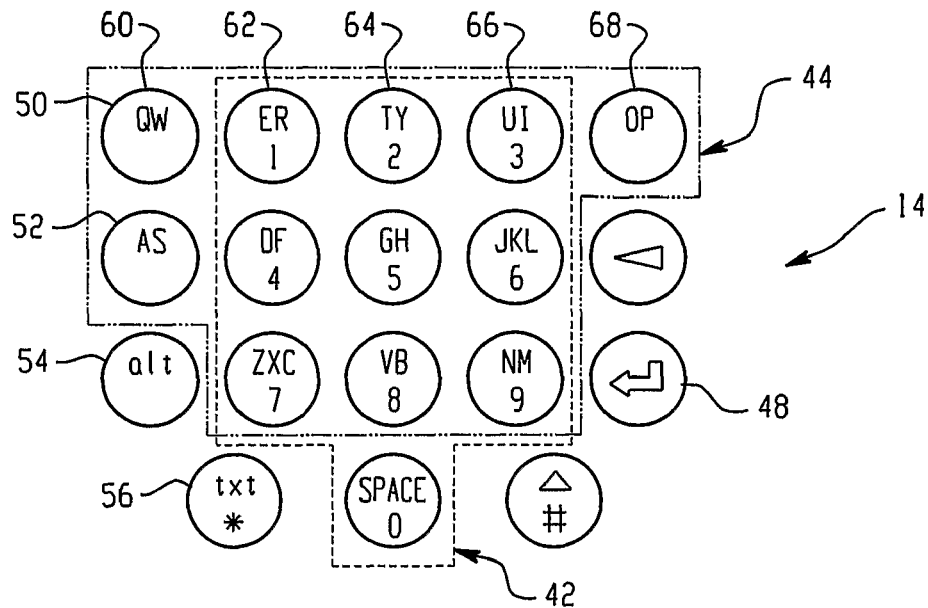
FIG. 38 is a further example keyboard arrangement for a reduced key QWERTY/numeric keyboard.
Figure 39:
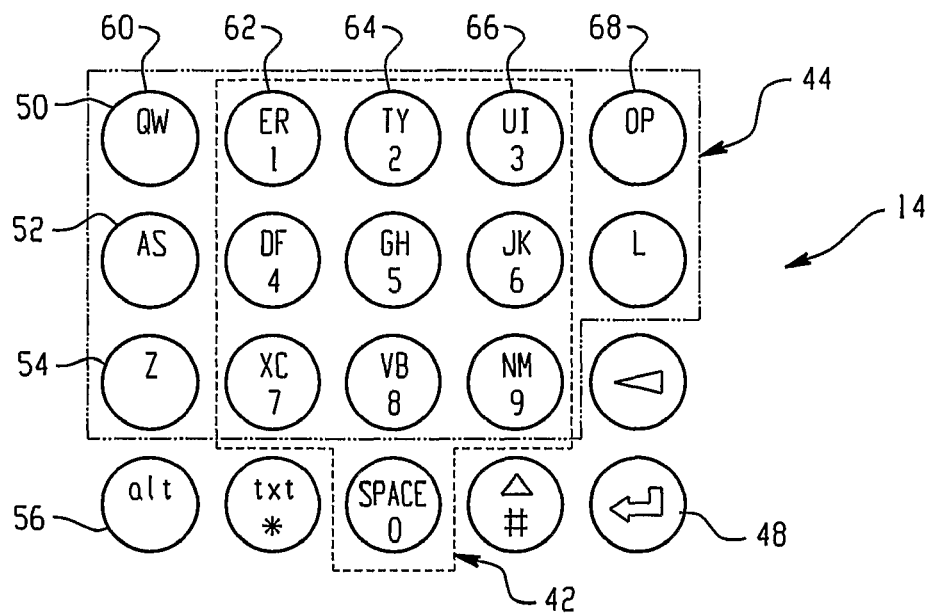
FIG. 39 is another example keyboard arrangement for a reduced key QWERTY/numeric keyboard.

FIGS. 38 and 39 depict five column, four row key reduced QWERTY alphabetic key arrangements 44 that are similar to the keyboard arrangements presented in FIGS. 20-27, but with different key designations. FIG. 38 utilizes a total of 18 keys, with alphabetic characters 44 being associated with 12 of the total keys. FIG. 39 includes a total of 20 keys and 14 of the keys are associated with alphabetic characters 44. In each of FIGS. 38 and 39, the numeric phone key arrangement 42 is preferably positioned in the center three columns 52, 54, 56, although it could be positioned in other columns, if desired.

Figure 41:
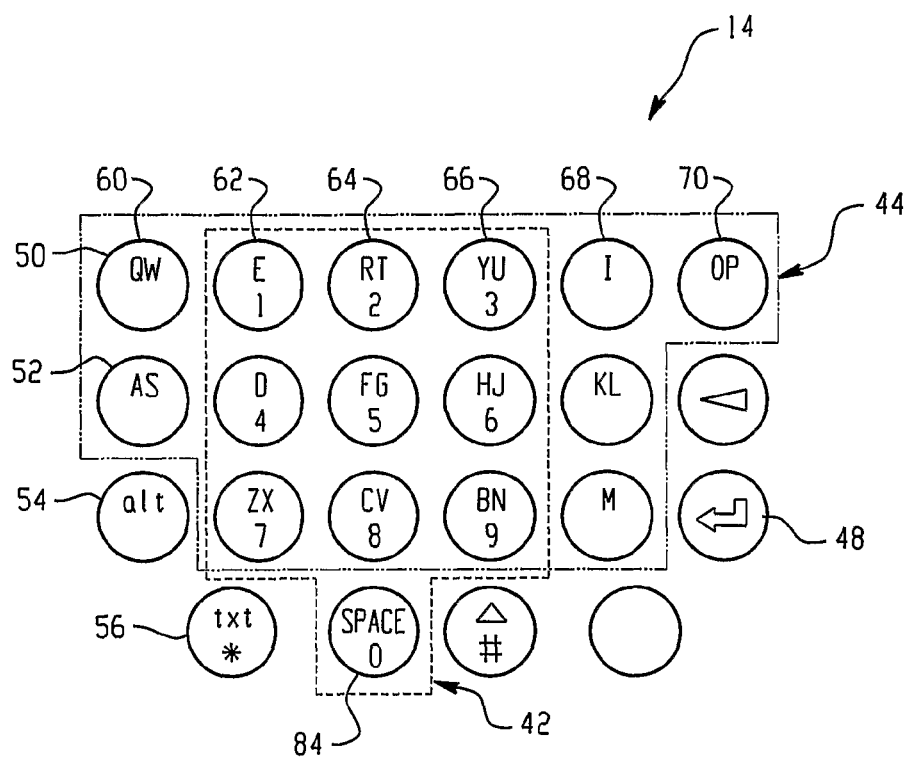
FIG. 41 is a further example keyboard arrangement for a reduced key QWERTY/numeric keyboard.

FIGS. 40 and 41 depict a six column, four row reduced QWERTY alphabetic key arrangements 44. The four rows include a first row 50, a second row 52, a third row 54, and a fourth row 56. The six columns include a first column 60, a second column 62, a third column 64, a fourth column 66, a fifth column 68, and a sixth column 70. FIG. 40 utilizes a total of 25 keys. Alphabetic characters 44 are associated with 17 of the keys. The numeric phone key arrangement 42 is associated with the keys in the first, second, and third columns 60, 62, 64. FIG. 40 has five keys in the fourth row 56 instead of six, and also utilizes additional "select" 88 and "cancel" 86 keys in the center of the keyboard 14 arrangement, such that three of the columns 60, 62, 64 are positioned to the left of the "select" key 88 and three of the columns 66, 68, 70 are positioned to the right of the "select" key 88. The "space" key 84 is centered below the "select" key 88. The "select" key 88 is preferably a toggle key.

FIG. 41 includes a total of 22 keys. Alphabetic characters 44 are associated with 15 of the keys. The numeric phone key arrangement 42 is associated with keys in the second, third and fourth 62, 64, 66 columns. FIG. 41 utilizes four keys in the fourth row 56. In both of FIGS. 40 and 41, the "0" key is centered beneath the remainder of the numeric phone key arrangement 42. In FIG. 40, the "*" and "#" keys are not positioned next to the "0" key. Instead, they are associated with alphabetic keys, shown positioned to the right of the "select" 88 key. They may be positioned at other locations, if desired, although a preferred location is directly on either side of the "0" key so that the numeric phone key arrangement is more familiar to the user.

Figure 42:
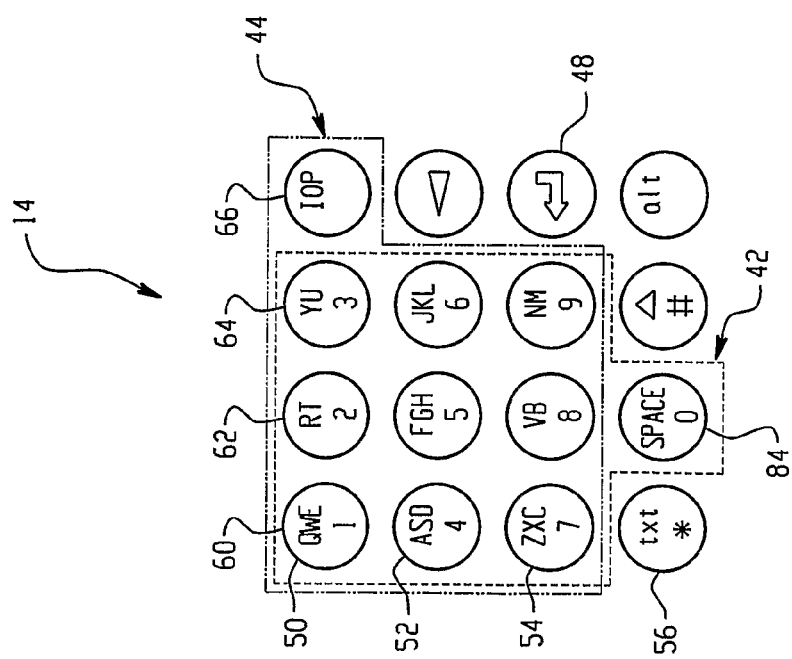
FIG. 42 is another example keyboard arrangement for a reduced key QWERTY/numeric keyboard.

FIG. 42 depicts a four column, four row reduced QWERTY arrangement of alphabetic characters 44, with a numeric phone key arrangement 42 overlaid on the alphabetic characters of the QWERTY arrangement 44. The numeric phone keys 42 are positioned in the first, second, and third columns 60, 62, 64 of the keyboard arrangement and the "space/0" key is centered beneath the remainder of the numbers 1-9. Alphabetic characters are associated with ten of the total 16 keys and numbers are associated with nine of the alphabetic keys.

Figure 43:
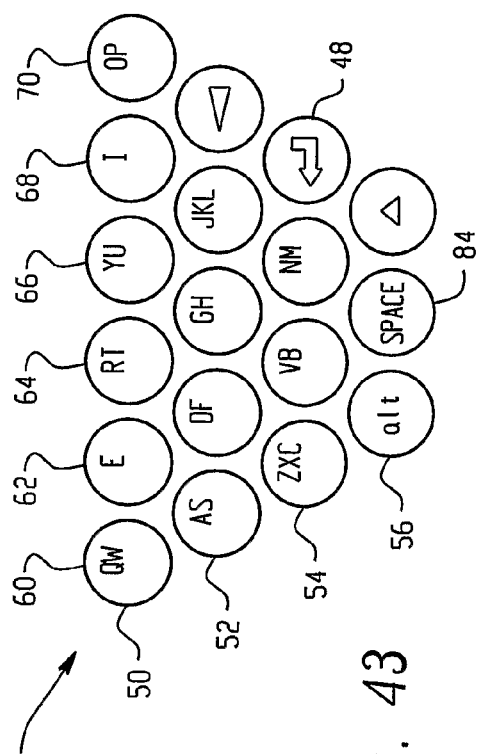
FIG. 43 is another example keyboard arrangement for a reduced key QWERTY/numeric keyboard.
Figure 44:
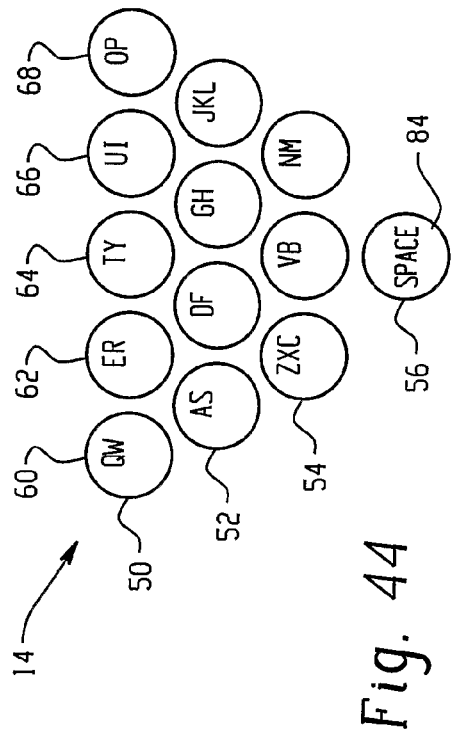
FIG. 44 is another example keyboard arrangement for a reduced key QWERTY/numeric keyboard.

FIGS. 43 and 44 depict reduced QWERTY alphabetic key arrangements 44, with four rows of keys, where the first row 50 has a greater number of keys than the fourth row 56 of keys. Each intermediate row has fewer keys than the row positioned above it. In FIG. 43, the first row 50 includes six keys, the second row 52 includes five keys, the third row 54 includes four keys and the fourth row 56 includes three keys. Thus, each row below the first row 50 has one less key than the row positioned directly above it. FIG. 44 has five keys in the first row 50, four keys in the second row 52, three keys in the third row 54, and one key in the fourth row 56. Other similar non-uniform arrangements may also be utilized, if desired. While numbers are not depicted in FIGS. 43 and 44, they could be overlaid on the keys, as with any of the prior or later embodiments.

Figure 45:
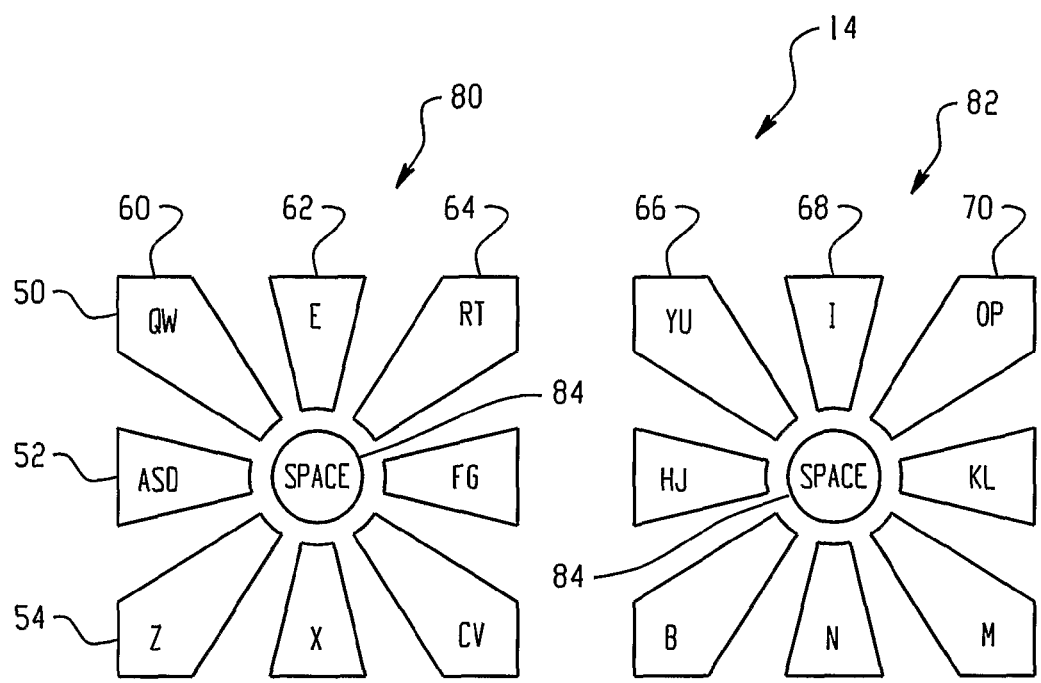
FIG. 45 is another example keyboard arrangement for a reduced key QWERTY/numeric keyboard.
Figure 46:
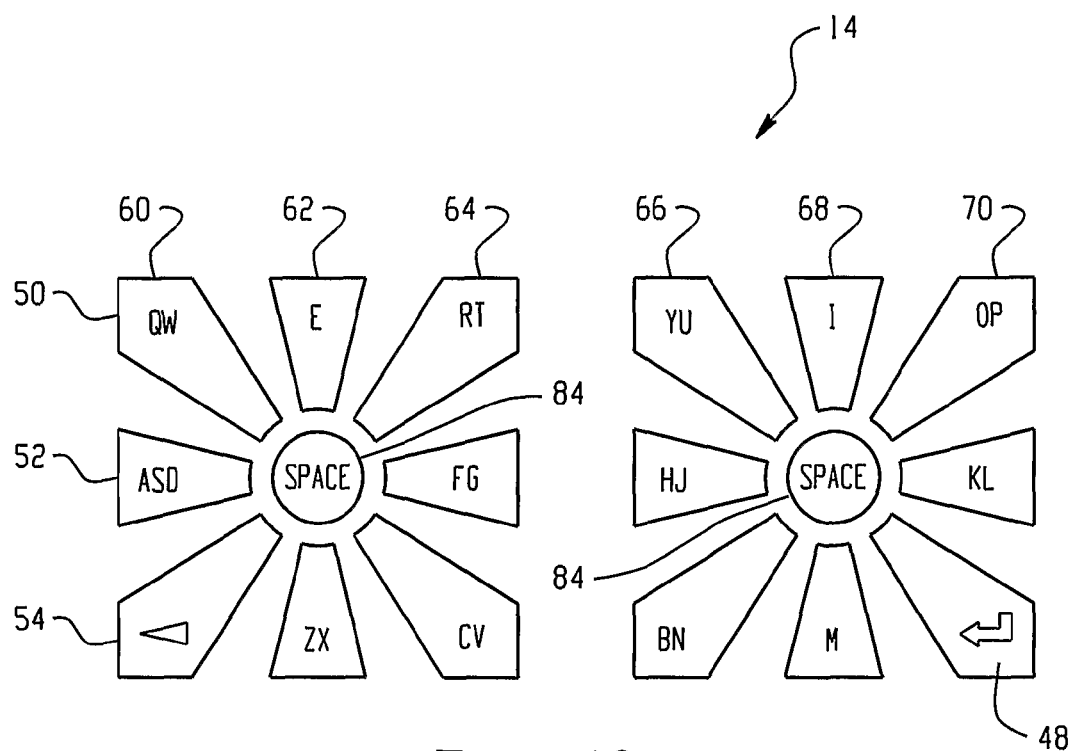
FIG. 46 is another example keyboard arrangement for a reduced key QWERTY/numeric keyboard.

FIGS. 45 and 46 depict alternative embodiments of a reduced QWERTY physical keyboard, showing three rows and six columns. The keys are separated into left side 80 and right side 82 keys, with the left side keys 80 being centered on a "space" key 84 and the right side keys 82 being centered on a "space" key 84. The keys are depicted as having an oblong shape, but may take on other shapes. In addition, numbers may be included, if desired.

Figure 47:
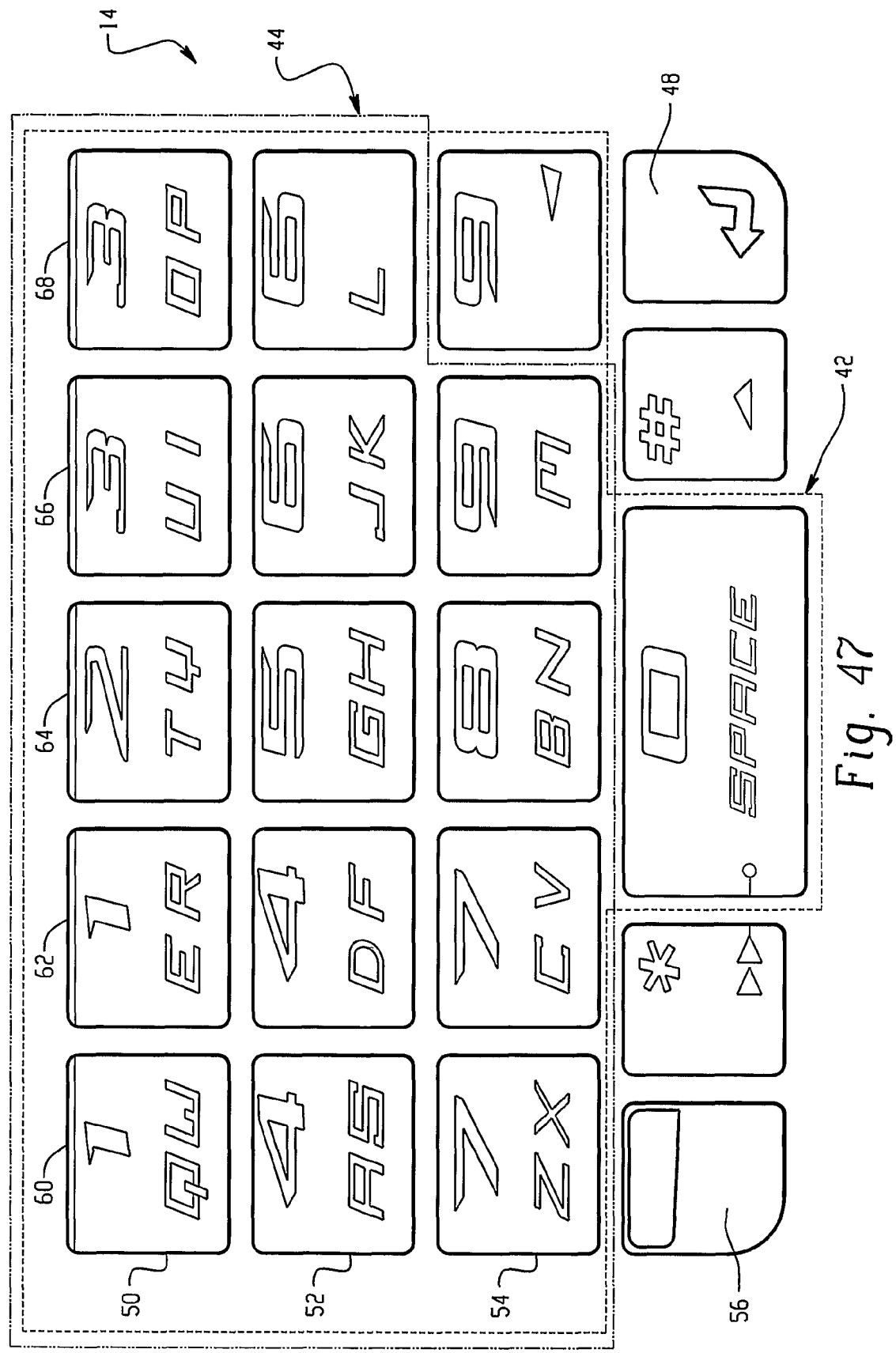
FIG. 47 is an alternative example keyboard arrangement for a reduced key QWERTY/numeric keyboard.
Figure 48:
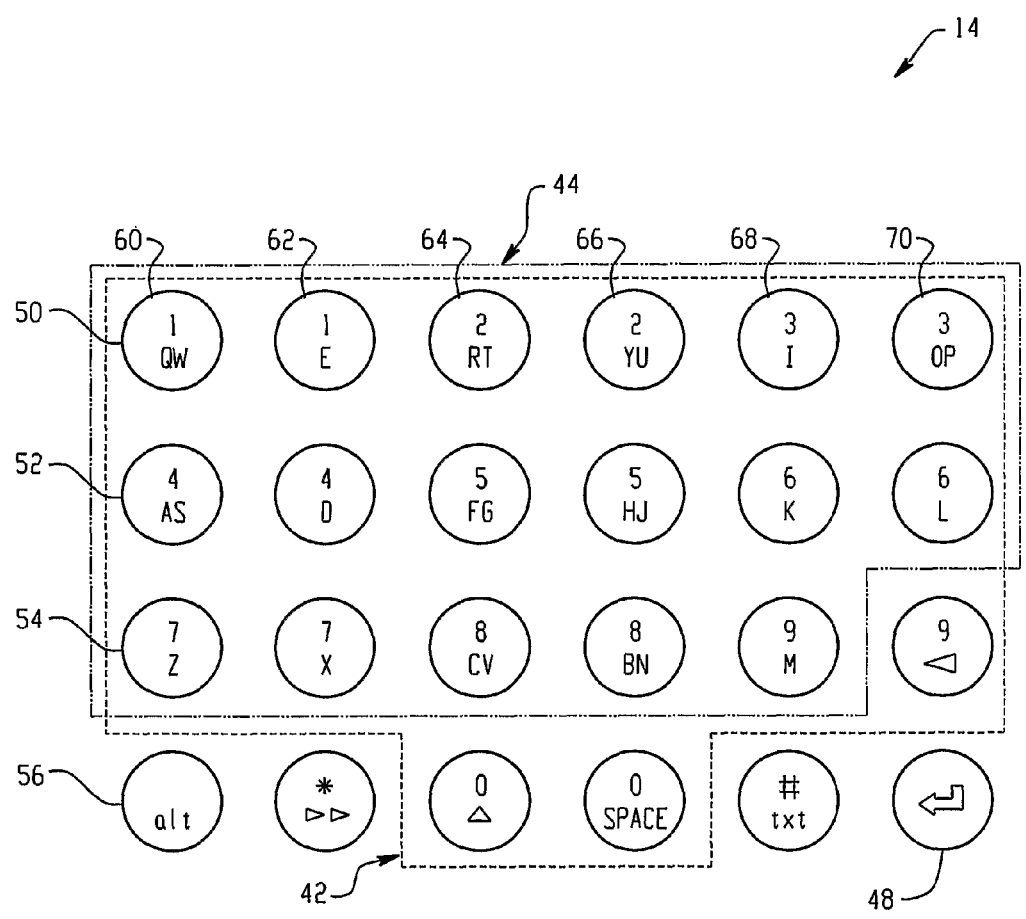
FIG. 48 is another alternative example keyboard arrangement for a reduced key QWERTY/numeric keyboard.
Figure 49:
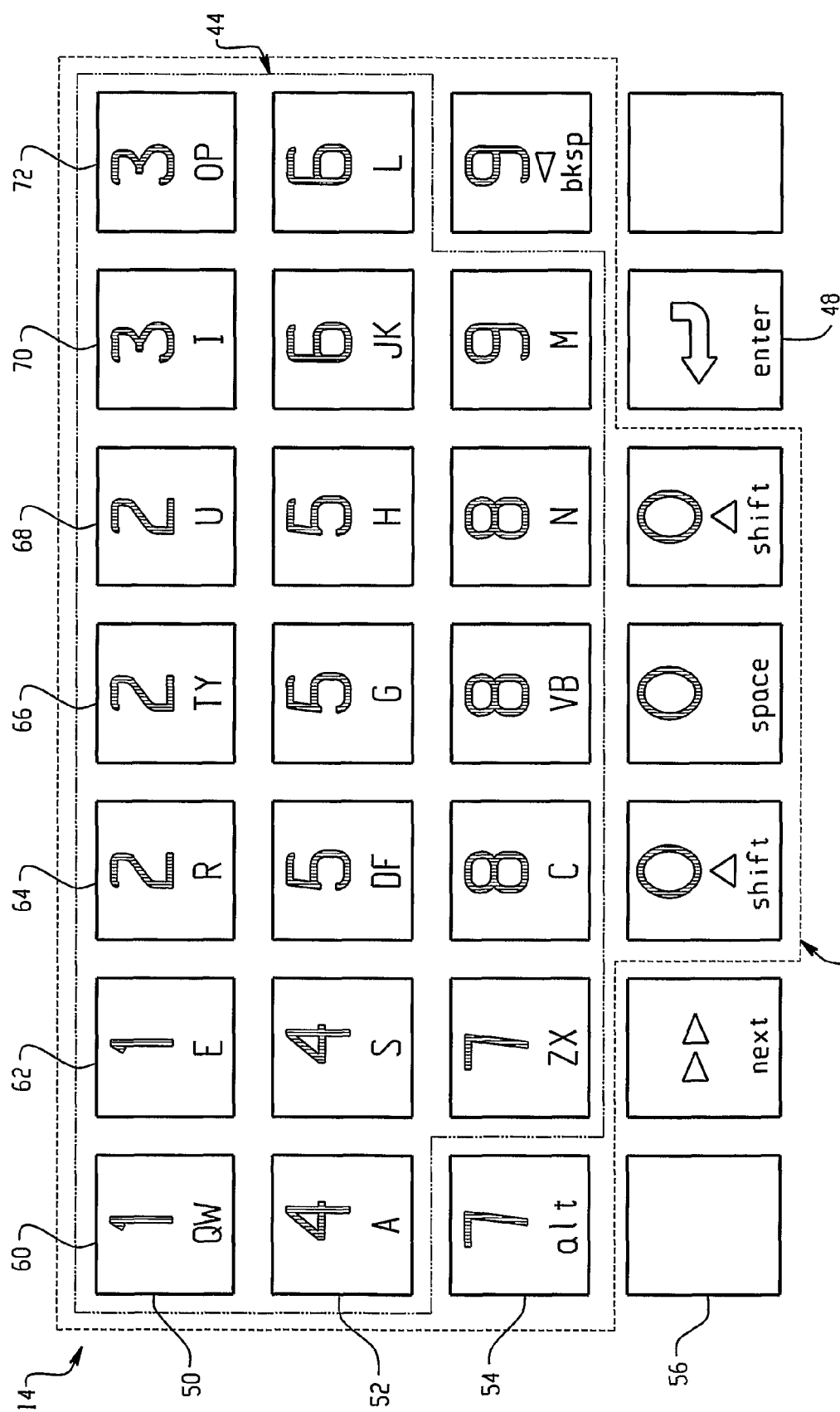
FIG. 49 is yet another alternative example keyboard arrangement for a reduced key QWERTY/numeric keyboard.

FIGS. 47-49 depict alternative embodiments of a physical keyboard 14 having keys associated with a reduced QWERTY arrangement of alphabetic characters 44 overlaid with a numeric phone key arrangement 42. In these embodiments, some of the numbers are associated with more than one key. For example, FIG. 47 illustrates a five column keyboard 14 where the outermost rows of the numeric phone key arrangement 42 are duplicated, such that if a user strikes any of the keys in the top three rows 50, 52, 54, a number will be selected in telephony mode. In particular, the numbers "1, 4, 7" are associated with both the first and second columns 60, 62 while the numbers "3, 6, 9" are associated with both the fourth and fifth columns 66, 68. The numeric phone key arrangement 42 remains centered on the key board 14 and the "space" function shares the "0" key, which remains centered under the remainder of the numbers and centered on the keyboard 14.

FIG. 48 depicts a six column reduced QWERTY physical keyboard 14 where the numeric phone key arrangement 42 is associated with keys in each of the six columns. The numbers "1, 4, 7" are associated with the first and second columns 60, 62; the numbers "2, 5, 8, 0" are associated with the third and fourth columns 64, 66; and the numbers "3, 6, 9" are associated with the fifth and six columns 68, 70. The numeric phone key arrangement is again centered on the keyboard 14. The "space" function shares a key with one of the "0" keys.

FIG. 49 is similar to FIGS. 47-48, but utilizes seven columns for a reduced QWERTY key arrangement. The numbers "1, 4, 7" are associated with keys in the first and second columns 60, 62; the numbers "2, 5, 8, 0" are associated with keys in the third, fourth and fifth columns 64, 66, 68; and the numbers "3, 6, 9" are associated with the keys in the sixth and seventh columns 70, 72. In addition, FIG. 49 shows indicia for the numeric phone key arrangement 42 positioned on each of the keys. The indicia has a different font size and color for the alphabetic character indicia than for the numeric indicia.

FIG. 50 depicts an alternative embodiment of a reduced key QWERTY physical keyboard 14 that is combined with a numeric key pad 46, such as that shown in FIG. 5. In this embodiment, the numbers "7, 8, 9" are positioned in the first row 50, the numbers "4, 5, 6" are positioned in the second row 52, the numbers "1, 2, 3" are positioned in the third row 54, and the number "0" is positioned in the fourth row 56 centered under the remainder of the numbers. As with prior embodiments, the numbers of the numeric key pad 46 may be positioned in other columns, or may be provided in multiple columns, such as shown in FIGS. 47-49 or 51-52.

Figure 51:
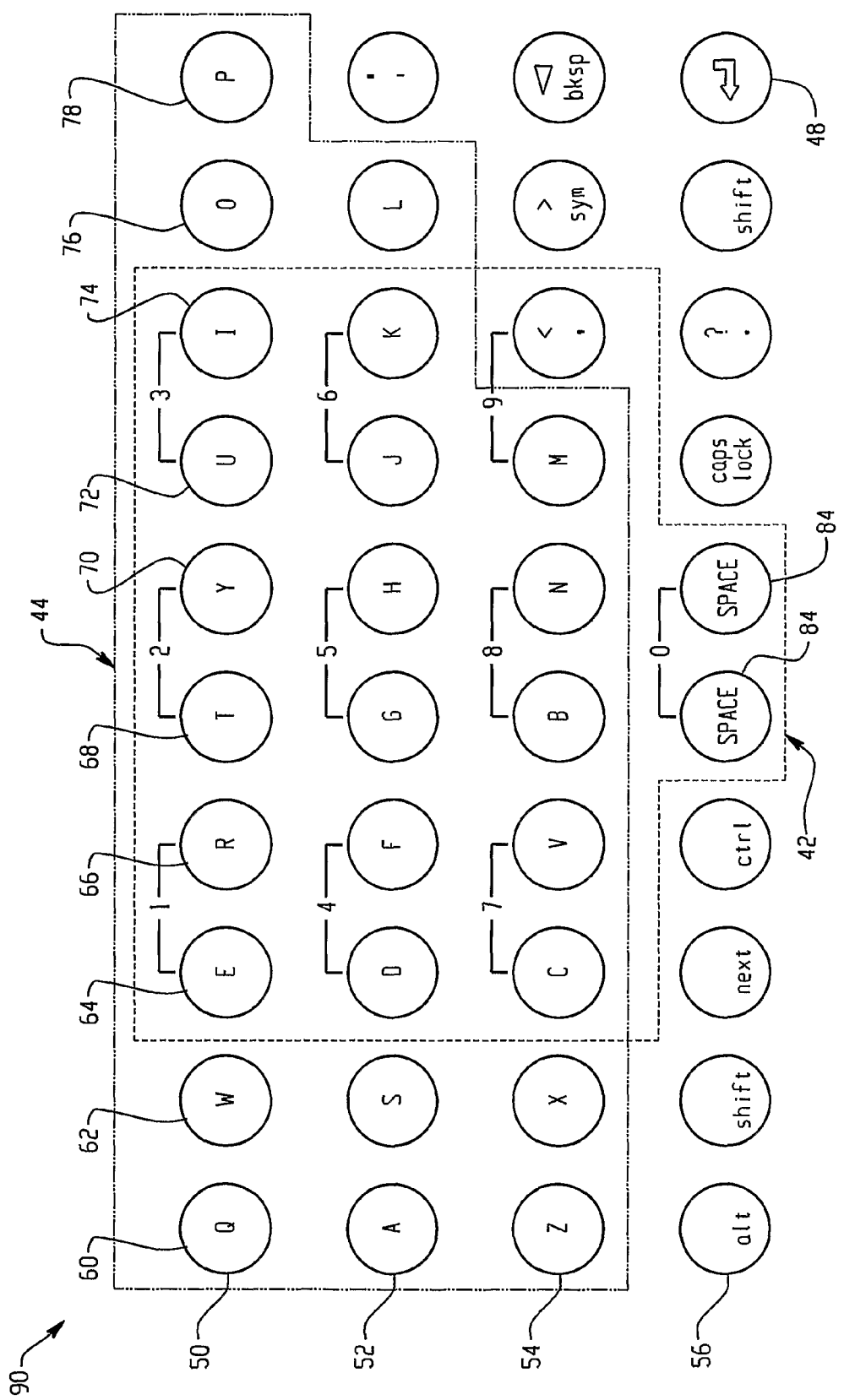
FIG. 51 is an alternative example keyboard arrangement for a non-reduced key QWERTY/numeric keyboard.
Figure 52:
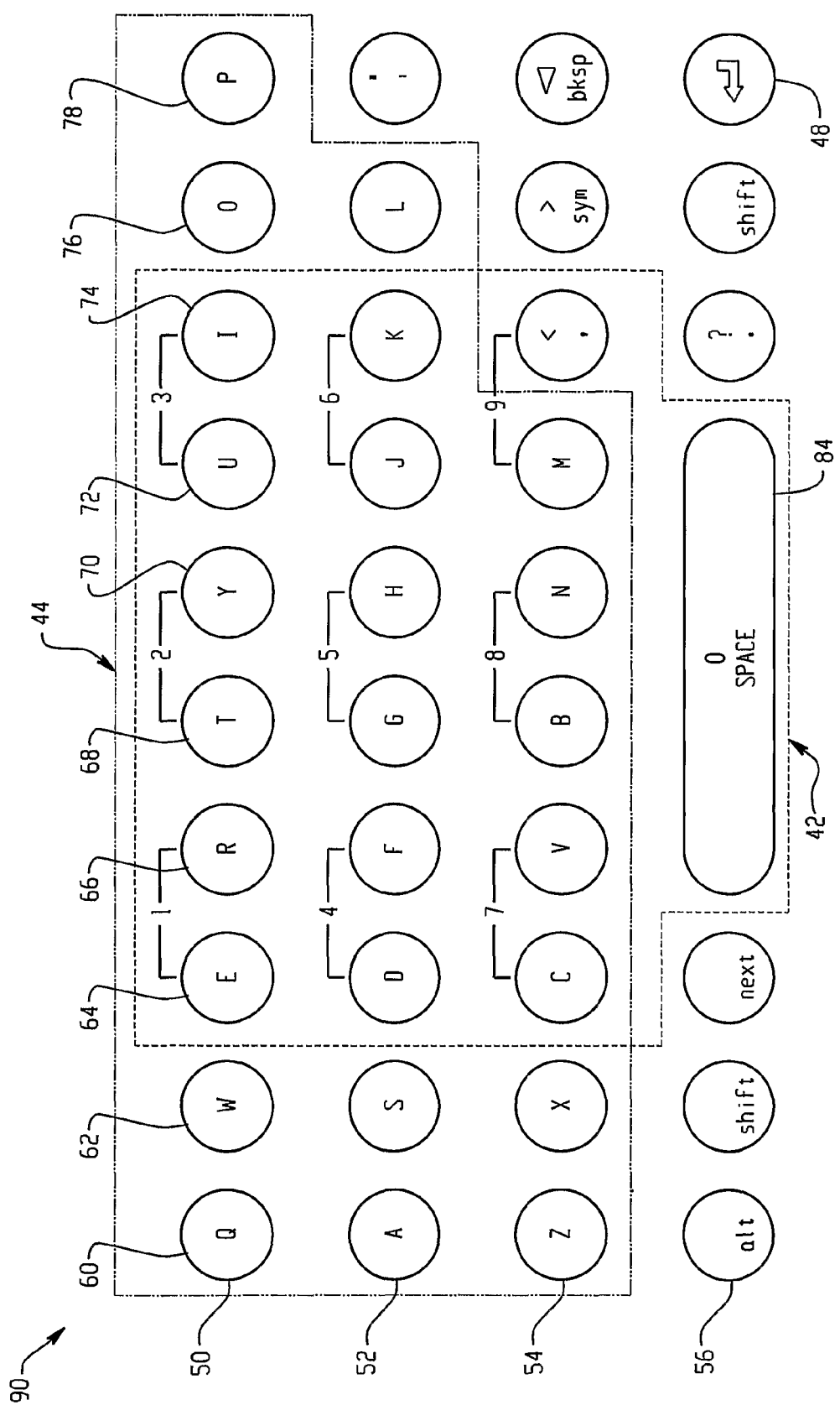
FIG. 52 is another alternative example keyboard arrangement for a non-reduced key QWERTY/numeric keyboard.

FIGS. 51 and 52 present yet another example physical keyboard 90. This keyboard is a full QWERTY alphabetic arrangement that has a numeric phone key arrangement 42 overlaid on the alphabetic characters such that many of the keys are multi-functional. In this embodiment, like FIGS. 47-49, the numbers of the numeric phone key arrangement 42 are associated with more than one key. For example, the numbers "1, 4, 7" are associated with keys in both the third and fourth columns 64, 66; the numbers "2, 5, 8, 0" are associated with keys in both the fifth and sixth columns 68, 70; and the numbers "3, 6, 9" are associated with keys in both the seventh and eighth columns 2, 74. The indicia associated with the numbers is provided on the face of the keyboard 14 instead of directly on the keys, and brackets or other instructional markings may be provided on the keyboard 14 to identify which keys are associated with numbers, if desired. FIG. 51 utilizes a "space" function associated with the two "0" keys. FIG. 52 is similar to FIG. 51 except the center four keys of row 56 are combined as a single key that is associated with both a "0" and the "space" functions.

Symbols, where not shown, may also be included on the keys shown in the figures. In each of the embodiments shown in FIGS. 20, 22-23, 26-43, 46-52, and 54, the "return/enter" 48 key is positioned in the vicinity of the right, bottom corner of the keyboard 14. In a preferred embodiment, the "return/enter" 48 is positioned in the right most column or in the fourth row 56.

The physical keyboard 14 includes hardware and software associated with each of the keys for entry of a character, as indicated by indicia on or near the key. An example of a mobile communication device having a keyboard assembly with hardware and software associated with key entry is described in U.S. patent application Ser. Nos. 09/967,537 and 10/302,242 and U.S. Pat. No. 6,278,442, the disclosures of which are incorporated herein by reference in their entirety, and depicted in FIGS. 53 and 54.

Figure 53:
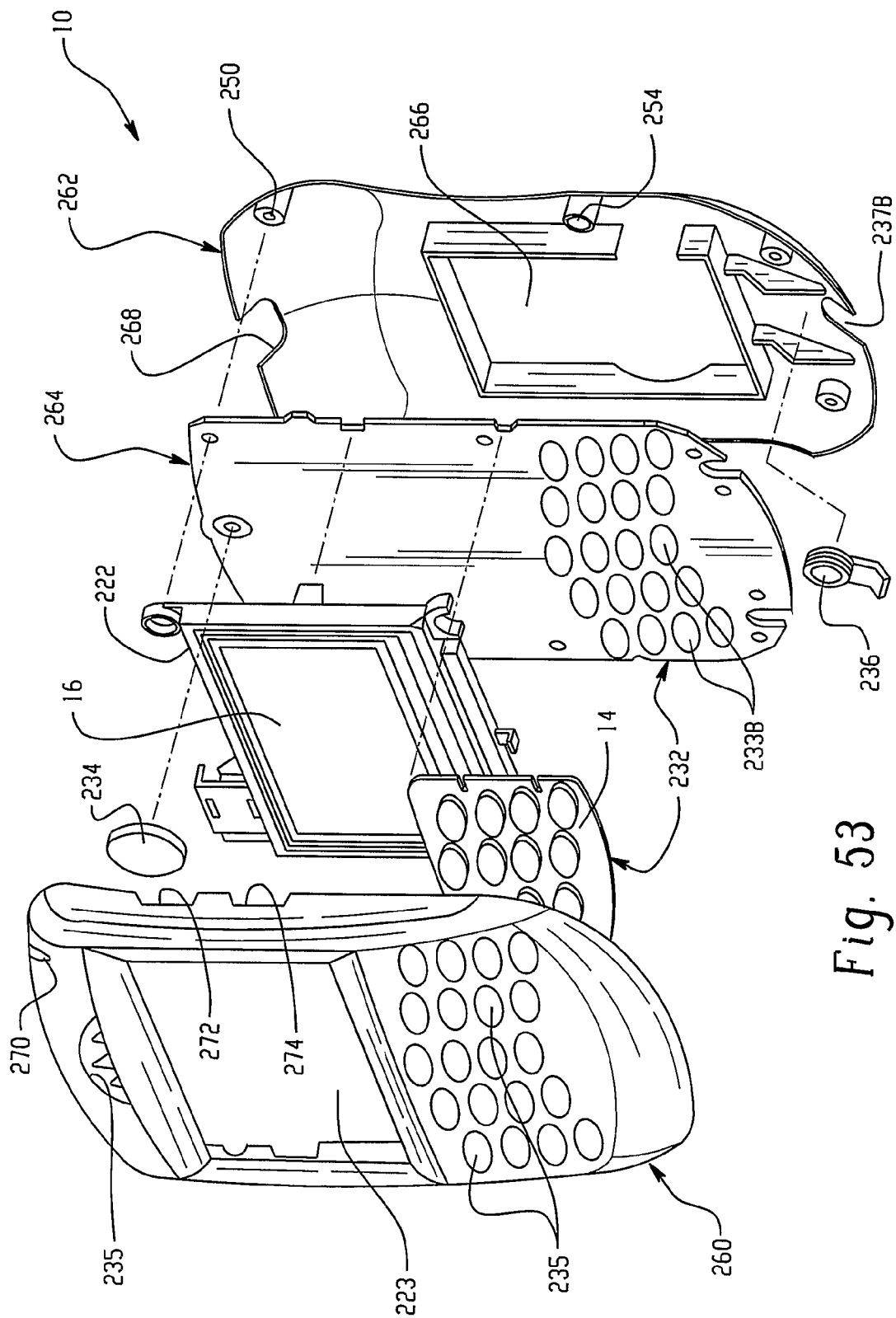
FIG. 53 is an exploded view of a handheld mobile communication device incorporating an example keyboard arrangement.

FIG. 53 is an exploded view of the hardware of a mobile communication device 10 incorporating an example keyboard arrangement 14. The device includes a first device housing section 260 and a second device housing section 262. The housing sections are connected together with fasteners (not shown) that engage a plurality of holes 250, 254 to form a single integrated device housing that encloses the internal components of the mobile communication device 10. The fasteners may be screws, rivets or the like. Fasteners are but one example of possible components that may be used to couple the device housing sections together. Other components include flexible or rigid but deformable members, possibly integral with one of the device housing sections, which engage cooperating structures on the other or each device housing section or are deformed to hold the device housing sections together. The device housing sections might also or instead be coupled together by bonding, with adhesive, for example. However, the device housing sections are preferably coupled together using releasable fasteners such as screws.

Referring to FIG. 53, the device 10 includes a PCB (printed circuit board) 264. Most of the internal components of the mobile communication device are preferably mounted on the PCB 264. The keyboard 14 is preferably formed by positioning a key web 233A over a plurality of switches 233B on the PCB 264. The key web 233A and plurality of switches 233B are preferably configured such that each key in the key web 233A contacts and operates one of the switches 233B when the key is depressed. Other configurations may also be implemented, in which the number of switches 233B may be less than the number of keys on the key web 233A, or the number of switches 233B may be greater than the number of keys on the key web 233A. The key web 233A and switches 233B are also positioned such that the apertures 235 on the first device housing section 260 at least partially expose the keyboard 14. Portions of the key web 233A are exposed by the apertures 235 to provide key surfaces that may be depressed by a user to provide data input to the device 10. Such data input may, for example, be used to generate data communications on the device 10.

A display 16 is preferably mounted on the PCB 264, as shown in FIG. 53. When the first device housing section 260 and second device housing section 262 are coupled together, an aperture 223 in the first device housing section 260 at least partially exposes the display 16. The aperture 223 in the first device housing section 260 and the display 16 on the PCB 264 may be positioned such that a viewing area 225 of the display 16 is exposed. The frame and other components associated with the display 16 are preferably hidden from view when the first and second device housing sections 260, 262 are coupled together.

A speaker 234 is preferably mounted at or near the top of the PCB 264. One or more apertures 235 in the first device housing section 260 are positioned to at least partially expose the speaker 234 when the first and second device housing sections 260, 262 are coupled together. A microphone 236 is mounted in the second device housing section 262. The microphone 236 is at least partially exposed by the aperture 237B in the second device housing section, and coupled to the PCB and other device components. Audio or voice inputs to the microphone 236 may be used, for example, to generate voice communications. When the microphone 236 is positioned in the housing, an aperture (not shown) is provided in the first device housing section 260 to at least partially expose the microphone 236. The microphone 236 may alternatively be mounted in the first device housing section 260 or on the PCB 264.

The device housing sections 260, 262 may include further apertures to expose or partially expose other device components. In the first device housing section 260, apertures 270, 272 and 274 are configured to partially expose the auxiliary I/O devices. An aperture 268 is similarly positioned in the second device housing section 262 to at least partially expose an auxiliary I/O device 228D. An aperture 266 in the second device housing section 262 may be provided to accommodate a power supply such as a battery. Other apertures may also be provided in the device housing as necessary.

Other internal components of the device 10 may also be mounted on the PCB 264. The device components are interconnected to provide at least data and voice communication functionality, possibly in addition to further local non-communication functions and short-range communication functions. Although these other internal components are not shown in FIG. 53, most of them are preferably mounted on the rear side of the PCB 264, opposite the side on which the keyboard 14, display 16 and speaker 234 are mounted, but some components may be mounted adjacent to the display 16 and/or keyboard 14 or on or along an edge of the PCB 264. The internal components of the device 10 are interconnected as necessary, through wired connections, PCB tracks, other types of connectors or connections, or possibly combinations thereof.

The first and second device housing sections 260, 262, when coupled together, form a handheld mobile communication device housing 10 enclosing the PCB 264 and internal components. The apertures 235, 223, 235 and 237B at least partially expose the speaker 234, display 16, keyboard 14 and microphone 236 as described above. Partial exposure of these components allows a user to make use of these components while at the same time protecting the components from damage. Apertures 268, 270, 272, 274 similarly expose and protect auxiliary I/O devices. When access to a component will normally be required relatively infrequently, a removable cover element may be provided for a corresponding device housing aperture. In the above example of a device power supply, a cover (not shown) is preferably provided for the aperture 266. Access to the power supply is thereby possible when required, yet the battery remains protected when access thereto is not necessary.

The assembly in FIG. 53 offers significant manufacturing advantages for the device 10. Mounting of most internal device components on a single PCB 264 simplifies manufacture of the PCB in that only a single PCB must be built and positioned in a device housing section. Interconnections between different PCBs and problems associated with accurate relative placement of multiple PCBs are thereby avoided. During manufacture, the PCB 264 may be positioned on or in either the first device housing section 260 or the second device housing section 262. The other device section is then moved into place and the housing sections are coupled together to enclose the PCB and other internal device components in a single integrated device housing. Once assembled, the device housing is static, and device housing sections need not be moved relative to each other to provide for voice and data communication or other functions. Advantageously, breakage of movable device housing sections and typically problematic hinge arrangements and connections are thereby avoided.

The mobile communication device 10 may also include a predictive text computer program that is used in conjunction with the keyboard. Predictive test software is useful in reduced format keyboards, such as the example keyboard, in order to identify the desired input from the combination of keystrokes of a user. A predictive text computer program may, for example, be used to predict a complete word or phrase from one or more keystrokes. If the predictive text computer program does not successfully predict a desired word or phrase, then text-entry characters may be entered more precisely, albeit more slowly, by selecting the appropriate characters on the keys. An example predictive text computer program is described in the following co-owned patent applications, which are incorporated herein by reference in their entireties: "Customizable Predictive Text Method For Reduced Keyboards," U.S. Provisional Patent Application No. 60/397,680, filed Jul. 23, 2002; "Systems and Methods of Building and Using Custom Word Lists," International Patent Application No. PCT/CA03/01103, filed Jul. 23, 2003, and "Portable Electronic Device With Keyboard", International Patent Application No. PCT/CA02/00862, filed Jun. 10, 2002.

A number of different predictive text technologies are known and may be utilized with the example keyboard. In a multi-tap methodology, the user taps a key multiple times until a desired letter, number, symbol, or function is selected. This technology has been utilized on cell phones and touch screen devices, among other devices. Companies that offer solutions for the multi-tap method include Motorola (e.g., iTAP); Zi (e.g., eZiText); AOL (Tegic) (e.g., T9); and Eatoni (e.g., LetterWise). A related method is the long tap method, where a user depresses the key until the desired character appears on the display.

Another technology involves predictive text methodologies. These methodologies utilize database software to predict the entered text. One method involves automatically correcting common spelling mistakes (e.g., "teh" corrected to "the"). Predictive text methodologies use known spellings of words in combination with their probabilities and frequencies of use to determine a preferred word based upon input commands by a user. Disambiguation engines and predictive editor applications may be used to establish a single grammatical or semantic interpretation of the keystrokes entered by a user. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard arrangement and keyboard described herein, without limitation.

Figure 54:
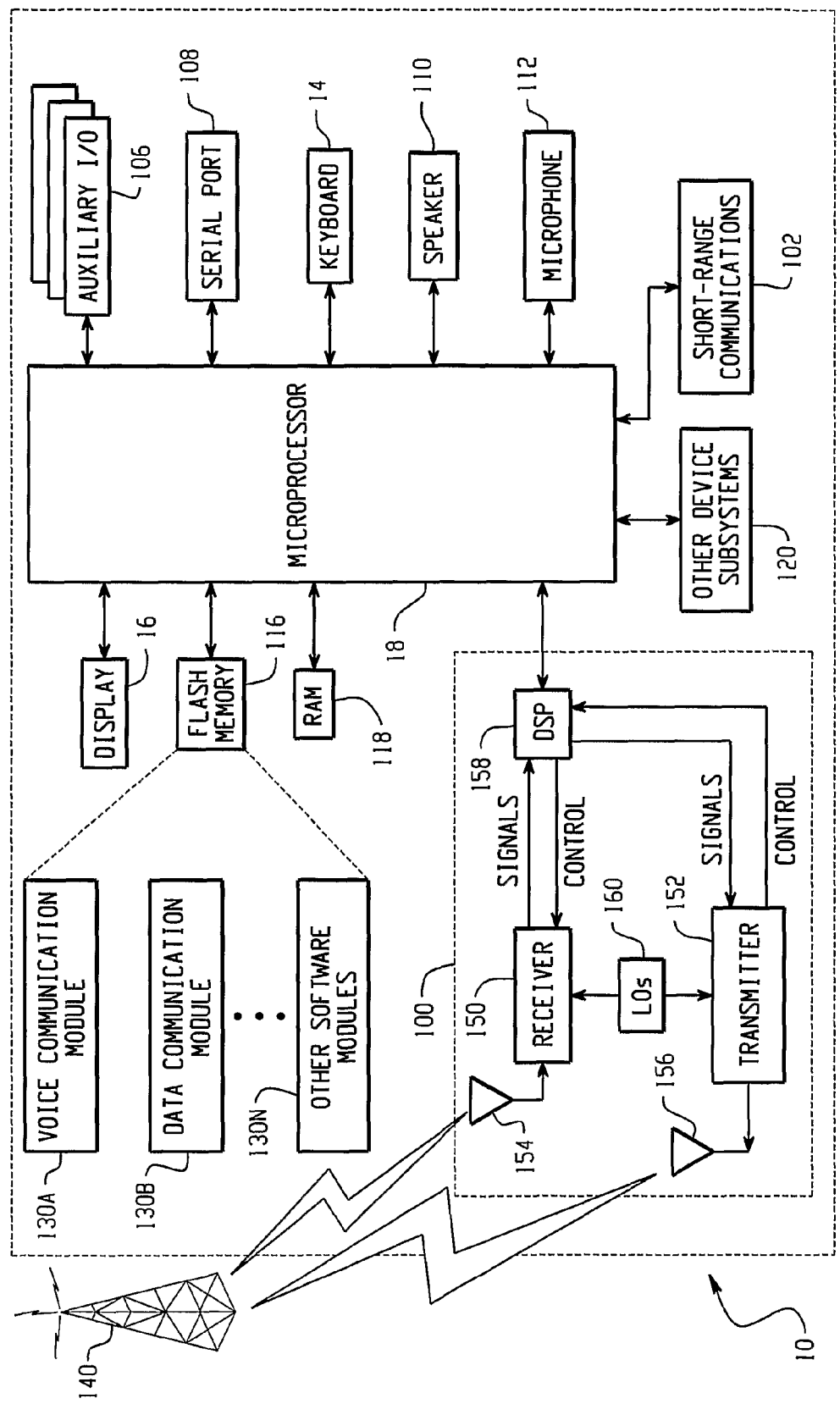
FIG. 54 is a block diagram illustrating an example mobile communication device.

The handheld mobile communication devices 10, presented in FIGS. 10-20, 28, and 53-54 include similar features, such as a housing 12, a keyboard 14 and an output device 16. The output device shown is a display 16, which is preferably a full graphic LCD. Other types of output devices may alternatively be utilized. A processing device 18, which is shown schematically in FIG. 54, is contained within the housing 12 and is coupled between the physical keyboard 14 and the display 16. The processing device 18 controls the operation of the display 16, as well as the overall operation of the mobile communication device 10, in response to actuation of keys on the keyboard 14 by the user.

The housing 12 may be elongated vertically, or may take on other sizes and shapes, including a clamshell housing structure, among other structures. The keyboard may include a mode selection key, or other hardware or software for switching between text entry and telephony entry.

In addition to the processing device 18, other parts of the mobile communication device 10 are shown schematically in FIG. 54. These include a communications subsystem 100; a short-range communications subsystem; the keyboard 14 and the display 16, along with other input/output devices 106, 108, 110 and 112; as well as memory devices 116, 118 and various other device subsystems 120. The mobile communication device 10 is preferably a two-way RF communication device having voice and data communication capabilities. In addition, the mobile communication device 10 preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication functions, including data and voice communications, are performed through the communication subsystem 100, and possibly through the short-range communications subsystem. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 10 is intended to operate. For example, a mobile communication device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

As described above, a preferred example keyboard represents a marriage of a text entry keyboard with a telephony keypad, but in a reduced key format. The example keyboard can be used in two modes. In a first mode, the user utilizes two hands to input text characters, similar to the use of a standard 26 key keyboard. In a second mode, the user utilizes a single hand to input numeric characters in telephony mode. Thus, the example keyboard provides two different methods for input, both of which are already familiar separately to a user.

Accordingly, the example keyboard also concerns a method for operating a keyboard and for inputting text and telephony commands on a keyboard. The method includes inputting numbers into a mobile communication device utilizing a single hand and inputting text into a mobile communication device utilizing two hands. The method further includes inputting functional commands and symbols utilizing two hands. Alternatively, functional commands and symbols may be input utilizing one hand.

The keys may be toggle keys or non-toggle keys, if desired. Additional or fewer rows and columns, above and beyond the number shown herein, may also be provided to position functional and other keys, if desired. Furthermore, the keys may be aligned in columns, or may be staggered, in some embodiments.

While most of the examples depict a QWERTY arrangement of alphabetic characters, the examples are equally applicable to other standard arrangements. Moreover, the QWERTY keyboard has been presented with certain combinations of alphabetic characters on each key. Other combinations may alternatively be utilized, without limitation, as long as the alphabetic characters are presented in the same order as their standard arrangement.

The word "substantially" is used herein as an estimation term.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

INDUSTRIAL APPLICABILITY

The present invention provides a keyboard arrangement for a handheld mobile communication device.

The invention claimed is:

1. A handheld mobile communication device with a physical keyboard, said device comprising:
a housing with a plurality of keys located at a front surface of the housing;
said plurality of keys comprising a first subset of at least twelve keys having indicia of letters A to Z, said letters being arranged in a standard alphabetic keyboard arrangement, and a second subset of keys having indicia of numerals 0 to 9, said numerals being arranged in a numeric phone key arrangement that is at least partially overlaid on said standard alphabetic keyboard arrangement; and
said second subset of keys are differentiated, based on color, from keys of said first subset of keys that are not overlaid by said second subset of keys
wherein said physical keyboard comprises a total of twenty keys, with the keys being arranged in four rows and five columns;
wherein one of a QWERTY, QWERTZ, AZERTY, and DVORAK array of letters is arranged in three of the four rows and said second subset of keys is associated with each of the four rows;
wherein said four rows comprise in order a first, second, third and fourth row, and the five columns comprising in order a first, second, third, fourth, and fifth column; and
wherein each key is configured to cause data corresponding to one of the indicia on that key to be entered in response to the key being pressed.

2. The handheld mobile communication device as recited in claim 1, wherein numeric indicia of said second subset of keys is a first color and alphabetic indicia of said first subset of keys is a second color.

3. The handheld mobile communication device as recited in claim 1, wherein said first subset of keys having indicia of letters A to Z number fourteen.

4. The handheld mobile communication device as recited in claim 1, further comprising said indicia of letters A to Z being positioned directly on keys of said first subset of keys in a first color and said indicia of numerals 0 to 9 being positioned directly on keys of said second subset of keys in a second color.

5. The handheld mobile communication device as recited in claim 1, wherein the keys of said second subset of keys have a two tone appearance.

6. The handheld mobile communication device as recited in claim 5, wherein each key of said second subset of keys has a first portion of a first color and a second portion of a second color.

7. The handheld mobile communication device as recited in claim 6, wherein said first portion of each key of said second subset of keys has numeric indicia of a first different color to the first color.

8. The handheld mobile communication device as recited in claim 7, wherein the first different color comprises the second color.

9. The handheld mobile communication device as recited in claim 6, wherein said second portion of each key of said second subset of keys has alphabetic indicia of a second different color to the second color.

10. The handheld mobile communication device as recited in claim 9, wherein the second different color comprises the first color.

11. The handheld mobile communication device as recited in claim 5, wherein each key of said second subset of keys has a first portion having numeric indicia and a second portion having alphabetic indicia.

12. The handheld mobile communication device as recited in claim 11, wherein at least one of (i) font size, (ii) font type and (iii) indicia color of the numeric indicia of the first portion of each key of the said second subset of keys is different to that of the alphabetic indicia of the second portion of said key.

13. The handheld mobile communication device as recited in claim 12, wherein indicia of at least a portion of said first subset of keys that are not overlaid by said second subset of keys comprise a third color.

14. The handheld mobile communication device as recited in claim 1, wherein the standard alphabetic keyboard arrangement comprises one of QWERTY, QWERTZ, AZERTY, and DVORAK layouts.

15. The handheld mobile communication device as recited in claim 1, wherein said first subset of keys associated with the alphabetic keyboard arrangement number fourteen.

16. The handheld mobile communication device as recited in claim 1, wherein said second subset of keys is associated with three of the five columns.

17. The handheld mobile communication device as recited in claim 1, wherein said second subset of keys is associated with the second, third and fourth columns.

18. The handheld mobile communication device as recited in claim 1, wherein said second subset of keys comprises keys in the first, second, third, and fourth rows and wherein keys in the first row comprise a number "1" in the second column, a number "2" in the third column, and a number "3" in the fourth column, keys in the second row comprise a number "4" in the second column, a number "5" in the third column, and a number "6" in the fourth column, keys in the third row comprise a number "7" in the second column, a number "8" in the third column, and a number "9" in the fourth column, and keys in the fourth row comprise a "*" in the second column, a number "0" in the third column, and a "#" in the fourth column.

19. The handheld mobile communication device as recited in claim 1, wherein the fourth row of keys comprises an "alt" function key in the first column, a "next" function key in the second column, a "space" function key in the third column, a "shift" function key in the fourth column, and a "return/enter" function key in the fifth column.

20. The handheld mobile communication device as recited in claim 1, wherein the first row comprises keys corresponding in order to letters "QW", "ER", "TY", "UI", and "OP".

21. The handheld mobile communication device as recited in claim 1, wherein the first row comprises keys corresponding in order to letters "QW", "ER", "TY", "UI", and "OP", the second row comprises keys corresponding in order to letters "AS", "DF", "GH", "JK", and "L", the third row comprises keys corresponding in order to letters "ZX", "CV", "BN", and "M".

22. The handheld mobile communication device as recited in claim 1, wherein one of the keys comprises a "return/enter" key associated with a return/enter function.

23. The handheld mobile communication device as recited in claim 22, wherein the "return/enter" key is positioned in the fifth column.

24. The handheld mobile communication device as recited in claim 22, wherein the "return/enter" key is positioned in the fourth row.

25. The handheld mobile communication device as recited in claim 1, further comprising a function associated with at least one of the plurality of keys.

26. The handheld mobile communication device as recited in claim 1, wherein said second subset of keys is arranged symmetrically about a center line.

27. The handheld mobile communication device as recited in claim 1, wherein said plurality of keys is arranged symmetrically about a center line.

28. The handheld mobile communication device as recited in claim 1, wherein said second subset of keys is centered within the five columns of key.

29. The handheld mobile communication device as recited in claim 1, wherein said second subset of keys is centered on the front surface of the housing.

30. The handheld mobile communication device as recited in claim 1, wherein said handheld mobile communication device has a telephony mode and a text-entry mode.

31. The handheld mobile communication device as recited in claim 1, further comprising an auxiliary I/O device.

32. The handheld mobile communication device as recited in claim 31, wherein said auxiliary I/O device being one of a touchpad, a rocker switch, and a thumb-wheel.

33. The handheld mobile communication device as recited in claim 1, further comprising a "*" associated with one of the plurality of keys and a "#" associated with another of the plurality of keys, wherein the "*" key is positioned directly adjacent one side of the key with which the numeral "0" is associated and the "#" key is positioned directly adjacent the other side of the key with which the numeral "0" is associated.

34. The handheld mobile communication device as recited in claim 1, wherein at least one key of said second subset of keys includes an identifying portion in the form of one of a raised bump or a recessed dimple.

35. The handheld mobile communication device as recited in claim 1, further comprising a first and a second color on the first subset of keys, wherein the first color dominates a top portion of each of the first subset of keys and the second color dominates a bottom portion of each of the first subset of keys.

36. The handheld mobile communication device as recited in claim 1, wherein said second subset of keys further comprises the symbols "*" and "#".

37. The handheld mobile communication device as recited in claim 1, further comprising a space key centered at a bottom of said plurality of keys.

* * * * *